United States Patent
Koseki

(10) Patent No.: US 9,665,286 B2
(45) Date of Patent: May 30, 2017

(54) STORAGE DEVICE

(71) Applicant: Hitachi, Ltd., Tokyo (JP)

(72) Inventor: Hideyuki Koseki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 14/767,048

(22) PCT Filed: May 17, 2013

(86) PCT No.: PCT/JP2013/063740
§ 371 (c)(1),
(2) Date: Aug. 11, 2015

(87) PCT Pub. No.: WO2014/184941
PCT Pub. Date: Nov. 20, 2014

(65) Prior Publication Data
US 2015/0378613 A1 Dec. 31, 2015

(51) Int. Cl.
*G06F 12/02* (2006.01)
*G06F 3/06* (2006.01)

(52) U.S. Cl.
CPC .............. *G06F 3/0608* (2013.01); *G06F 3/06* (2013.01); *G06F 3/067* (2013.01); *G06F 3/0619* (2013.01);
(Continued)

(58) Field of Classification Search
CPC .... G06F 3/0689; G06F 3/0608; G06F 3/0662; G06F 3/067; G06F 3/0679; G06F 3/068;
(Continued)

(56) References Cited

U.S. PATENT DOCUMENTS 8,307,187 B2 * 11/2012 Chawla ................. G06F 9/5077
711/173
8,850,114 B2 * 9/2014 Rosenband ........... G06F 3/0613
711/114
(Continued)

FOREIGN PATENT DOCUMENTS

JP 08-249128 A 9/1996
JP 2013-506886 A 2/2013
(Continued)

OTHER PUBLICATIONS

International Search Report of PCT/JP2013/063740.
International Search Report of PCT/JP2013/075977.

*Primary Examiner* — Hiep Nguyen
(74) *Attorney, Agent, or Firm* — Mattingly & Malur, PC

(57) ABSTRACT

A storage device comprises plural memory units and a storage controller that controls the memory units as a RAID group. Each memory unit is provided with a nonvolatile semiconductor memory (e.g. flash memory) chip and a memory controller that compresses data and stores the compressed data into the nonvolatile semiconductor memory chips. The memory controller makes a logical memory area available to the storage controller. The storage controller divides the logical memory area into plural entries each of which is a logical memory area of a prescribed size, acquires from respective memory unit capacity information on the data capacity stored into the nonvolatile semiconductor memory, and exchanges data of entries between semiconductor memory units on the basis of the capacity information.

9 Claims, 40 Drawing Sheets

(52) U.S. Cl.
CPC .......... *G06F 3/0635* (2013.01); *G06F 3/0641* (2013.01); *G06F 3/0655* (2013.01); *G06F 3/0665* (2013.01); *G06F 3/0688* (2013.01); *G06F 3/0689* (2013.01)

(58) Field of Classification Search
CPC .... G06F 3/0685; G06F 3/0688; G06F 3/0619; G06F 3/0665; G06F 3/0641; G06F 12/023; G06F 12/0246
See application file for complete search history.

(56) References Cited

U.S. PATENT DOCUMENTS

| | | | |
|---|---|---|---|
| 9,063,663 B2* | 6/2015 | Suzuki | G06F 3/0608 |
| 2003/0220985 A1* | 11/2003 | Kawamoto | G06F 3/0611 |
| | | | 709/219 |
| 2010/0281214 A1* | 11/2010 | Jernigan, IV | G06F 3/0608 |
| | | | 711/114 |
| 2011/0191537 A1* | 8/2011 | Kawaguchi | G06F 3/0605 |
| | | | 711/114 |
| 2011/0283046 A1 | 11/2011 | Koseki | |
| 2012/0011315 A1 | 1/2012 | Ishizaki et al. | |
| 2012/0017127 A1* | 1/2012 | Nagai | G06F 11/0727 |
| | | | 714/57 |
| 2013/0151770 A1* | 6/2013 | Hara | G06F 3/0632 |
| | | | 711/114 |
| 2013/0205070 A1* | 8/2013 | Koseki | G06F 3/0616 |
| | | | 711/103 |

FOREIGN PATENT DOCUMENTS

| | | |
|---|---|---|
| JP | 2013-515979 A | 5/2013 |
| WO | 2012/168962 A1 | 12/2012 |

\* cited by examiner

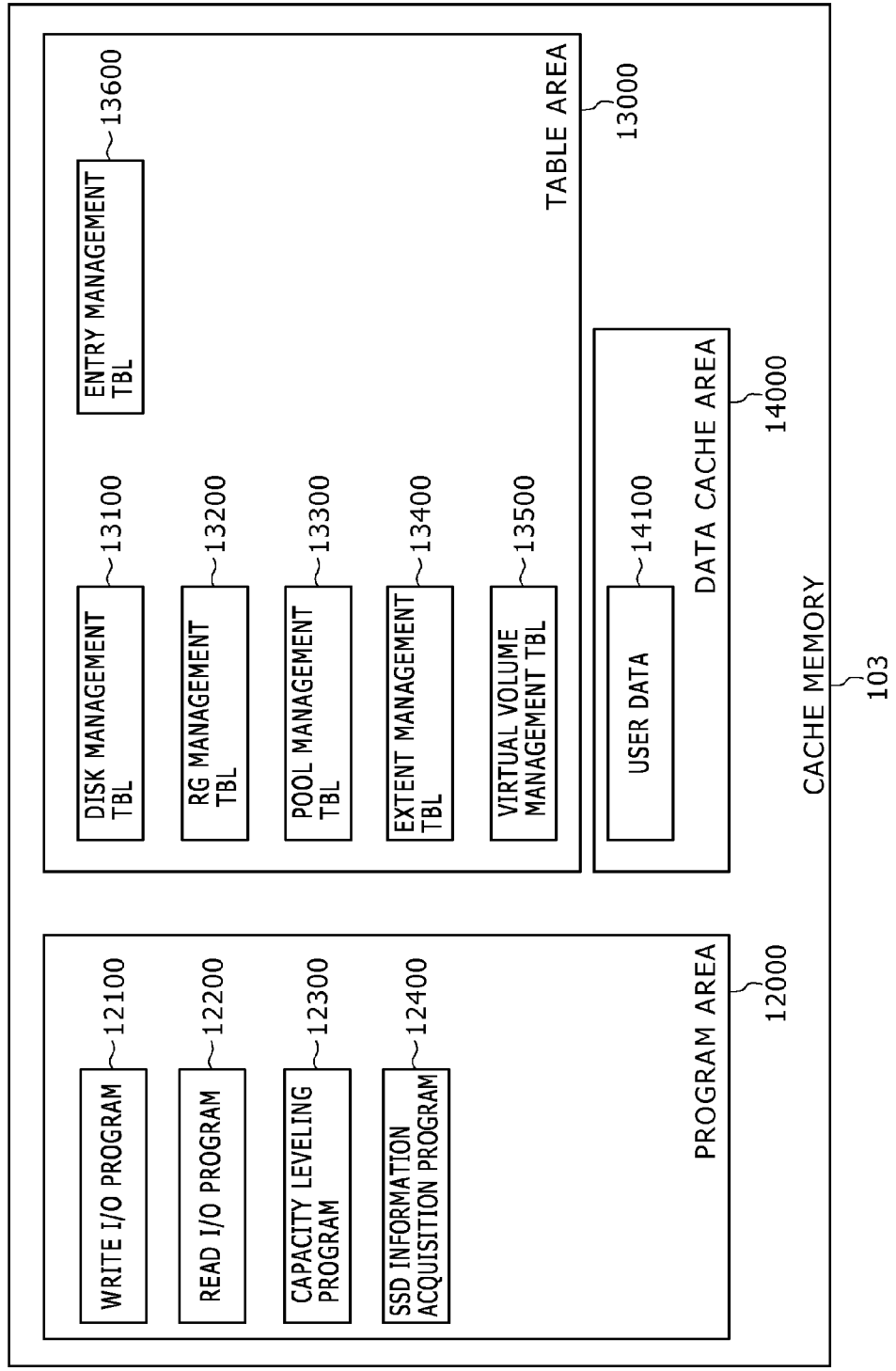

FIG.11

| 13101 | 13102 | 13103 | 13104 | 13105 | 13106 | 13107 | 13108 | 13109 | 13110 | 13111 | 13112 |
|---|---|---|---|---|---|---|---|---|---|---|---|
| DISK # | DISK TYPE | MAXIMUM LOGICAL CAPACITY | USABLE LOGICAL CAPACITY | IN-USE LOGICAL CAPACITY | FREE LOGICAL CAPACITY | MAXIMUM PHYSICAL CAPACITY | IN-USE PHYSICAL CAPACITY | FREE PHYSICAL CAPACITY | MAXIMUM COMPRESSION RATE | AVERAGE COMPRESSION RATE | COMPRESSION MODE |
| 0 | SSD (SLC) | 800 GB | 650 GB | 250 GB | 400 GB | 100 GB | 50 GB | 50 GB | 12.5 % | 20 % | SYNCHRONIZED |
| 1 | SSD (MLC) | 800 GB | 260 GB | 180 GB | 80 GB | 100 GB | 90 GB | 10 GB | 12.5 % | 50 % | NON-SYNCHRONIZED |
| ... | ... | ... | ... | ... | ... | ... | ... | ... | ... | ... | ... |
| n | HDD | 500 GB | 300 GB | 200 GB | — | 500 GB | 300 GB | 200 GB | — | — | — |

DISK MANAGEMENT TBL 13100

FIG.12

| 13201 | 13202 | 13203 | 13204 | 13205 | 13206 |
|---|---|---|---|---|---|
| RG # | DISK TYPE | RAID LEVEL | RAID COMPOSITION | DISK # | COMPRESSION MODE |
| 0 | SSD (MLC) | RAID 5 | 3D + 1P | 1 | ON (NON-SYNCHRONIZED) |
| | | | | 2 | ON (NON-SYNCHRONIZED) |
| | | | | 10 | ON (NON-SYNCHRONIZED) |
| | | | | 14 | ON (NON-SYNCHRONIZED) |

RG MANAGEMENT TBL 13200

FIG.13

| POOL VOLUME # | RG # |
|---|---|
| | 0 |
| | 1 |
| 0 | 2 |
| | 3 |
| | n |

13301, 13302

POOL MANAGEMENT TBL
13300

FIG.14

| DISK # 13601 | ENTRY # 13602 | SIZE 13603 | START-LBA 13604 | LENGTH 13605 | STATUS 13606 | ALLOCATION DESTINATION EXTENT # 13607 | PHYSICALLY USED QUANTITY 13608 |
|---|---|---|---|---|---|---|---|
| 0 | 0 | 12 MB | 0 | 24576 | ALLOCATED | 100 | 10 MB |
| | 1 | 12 MB | 24576 | 24576 | ALLOCATED | 220 | 8 MB |
| | 2 | 12 MB | 49152 | 24576 | ALLOCATED | 102 | 12 MB |
| | 3 | 12 MB | 73728 | 24576 | UNALLOCATED (USABLE) | N/A | N/A |
| | n | 12 MB | n | 24576 | UNUSABLE | N/A | N/A |

ENTRY MANAGEMENT TBL 13600

FIG.15

| RG # | EXTENT # | SIZE | STATUS | STRIPE ROW # | DISK # | ENTRY # |
|---|---|---|---|---|---|---|
| 0 | 1 | 1 GB | ALLOCATED | 1 | 0 | 0 |
| | | | | | ... | ... |
| | | | | n | k | k |
| | | | | | ... | ... |
| | | | | | n | n |
| m | m | m | UNALLOCATED | m | N/A | N/A |

EXTENT MANAGEMENT TBL 13400

FIG. 16

| VIRTUAL VOLUME # | VIRTUAL CAPACITY | ALLOCATED CAPACITY | VIRTUAL EXTENT # | ALLOCATED EXTENT # |
|---|---|---|---|---|
| 0 | 800 GB | 150 GB | 0 | 0 |
| | | | 1 | 100 |
| | | | 2 | n |
| | | | 3 | — |
| | | | ... | ... |
| | | | n | — |

13501 — VIRTUAL VOLUME #
13502 — VIRTUAL CAPACITY
13503 — ALLOCATED CAPACITY
13504 — VIRTUAL EXTENT #
13505 — ALLOCATED EXTENT #
13500 — VIRTUAL VOLUME MANAGEMENT TBL

FIG.18

| 23101 | 23102 | 23103 | 23104 | 23105 | 23106 | 23107 CW POSITIONS | | | | | | 23108 | 23109 |
|---|---|---|---|---|---|---|---|---|---|---|---|---|---|
| LBA | LOGICAL PAGE # | LOGICAL PAGE SIZE | STATUS | BLOCK # | PAGE # | 1 | 2 | 3 | 4 | 5 | n | PHYSICALLY USED QUANTITY | NOTIFICATION NEEDED-OR-NOT FLAG |
| 0 | 0 | 16 KB | IN USE | 0 | 0 | 1 | 1 | 1 | 0 | 0 | 0 | 3 KB | ON |
| 8192 | 1 | 16 KB | IN USE | 0 | 1 | 0 | 1 | 1 | 1 | 1 | 0 | 4 KB | OFF |
| 16384 | 2 | 16 KB | UNUSED | N/A | N/A | 0 | 0 | 0 | 0 | 0 | 0 | 0 KB | OFF |
| ... | ... | ... | ... | ... | ... | ... | ... | ... | ... | ... | ... | ... | ... |
| n | n | 16 KB | UNUSABLE | n | n | 0 | 0 | 0 | 0 | 0 | 0 | 0 KB | OFF |

LOGICAL-TO-PHYSICAL CONVERSION TBL 23100

FIG.19

| BLOCK # 23201 | PAGE # 23202 | PAGE STATUS 23203 | CW # 23204 | CW STATUS 23205 | LOGICAL PAGE # 23206 |
|---|---|---|---|---|---|
| 0 | 1 | IN USE (VALID) | 1 | VALID | 233 |
| | | | 2 | INVALID | 56 |
| | | | n | VALID | 123 |
| | n | IN USE (INVALID) | 1 | INVALID | N/a |
| | | | 2 | INVALID | N/a |
| | | | n | INVALID | N/a |
| 1 | 0 | FREE | 1 | FREE | N/a |
| | | | 2 | FREE | N/a |
| | | | n | FREE | N/a |
| | n | FREE | 1 | FREE | N/a |
| | | | 2 | FREE | N/a |
| | | | n | FREE | N/a |
| n | 1 | IN USE (VALID) | 1 | VALID | 56 |
| | | | 2 | VALID | 789 |
| | | | n | VALID | 21 |
| | n | FREE | 1 | FREE | N/a |
| | | | 2 | FREE | N/a |
| | | | n | FREE | N/a |

BLOCK MANAGEMENT TBL 23200

FIG. 20

| 23301 | 23302 | 23303 | 23304 | 23305 | 23306 | 23307 | 23308 | 23309 |
|---|---|---|---|---|---|---|---|---|
| MAXIMUM LOGICAL CAPACITY | USABLE LOGICAL CAPACITY | IN-USE LOGICAL CAPACITY | FREE LOGICAL CAPACITY | MAXIMUM PHYSICAL CAPACITY | IN-USE PHYSICAL CAPACITY | FREE PHYSICAL CAPACITY | MAXIMUM COMPRESSION RATE | AVERAGE COMPRESSION RATE |
| 800 GB | 650 GB | 250 GB | 400 GB | 100 GB | 50 GB | 50 GB | 12.5 % | 20 % |

CAPACITY MANAGEMENT TBL
23300

FIG.37

| RG # | DISK TYPE | RAID LEVEL | RAID COMPOSITION | DISK # | COMPRESSION MODE | LEVEL # |
|---|---|---|---|---|---|---|
| 0 | SSD (MLC) | RAID 5 | 3D + 1P | 1 | ON (NON-SYNCHRONIZED) | 0 |
|  |  |  |  | 2 | ON (NON-SYNCHRONIZED) |  |
|  |  |  |  | 10 | ON (NON-SYNCHRONIZED) |  |
|  |  |  |  | 14 | ON (NON-SYNCHRONIZED) |  |

13201  13202  13203  13204  13205  13206  13207

RG MANAGEMENT TBL  13200

FIG.38

VIRTUAL VOLUME MANAGEMENT TBL 13500

| VIRTUAL VOLUME # 13501 | VIRTUAL CAPACITY 13502 | ALLOCATED CAPACITY 13503 | VIRTUAL EXTENT # 13504 | ALLOCATED EXTENT # 13505 | RD IOPS 13506 | WR IOPS 13507 |
|---|---|---|---|---|---|---|
| 0 | 800 GB | 150 GB | 0 | 0 | 1235 | 447 |
| | | | 1 | 100 | 0 | 1485 |
| | | | 2 | n | n | n |
| | | | 3 | — | — | — |
| | | | ... | ... | ... | ... |
| | | | n | — | — | — |

STORAGE DEVICE

BACKGROUND

The present invention relates to a storage device provided with memory units having a data compressing function.

A storage device usually has physical memory units for storing data and a controller for controlling the physical memory units. The controller makes data storage spaces (generally logical volumes) available to a computer (e.g. a host computer) connected to the storage device.

A storage device, by using plural physical memory units in a RAID (redundant array of independent (or inexpensive) disks) configuration, increases the speed of I/O processing and achieves high resistance to troubles with physical memory units.

Whereas a storage device usually has a large number of hard disk drives (HDDs) as physical memory units, today physical memory units having flash memories (FMs) as physical memory media, such as solid state drives (SSDs), in place of HDDs are attracting note. The SSD has an advantage of being capable of I/O processing far faster than HDDs.

Over the recent years, the volume of data stored into a storage device has kept on increasing. Reflecting this trend, data compression technology to reduce the volume of data to be stored and thereby to save the cost of storage devices is attracting note. As SSDs, in particular, are higher than HDDs in cost per bit, there is a keen need for reducing the volume of stored data and increasing the apparent storage capacity by using appropriate compression technology.

Japanese Unexamined Patent Application Publication No. Hei 8(1996)-249128 (Patent document 1) discloses a technique by which data received from a host computer by the controller of a storage device (hereinafter referred to as storage controller) are compressed within the storage controller and compressed data are stored into an HDD.

PCT/JP2011/003204 (Patent document 2) discloses a technique regarding a flash memory storage (hereinafter referred to as SSD) in which a controller within an SSD (hereinafter referred to as SSD controller) has a data compressing function and whose virtual logical capacity made available to an external device (storage controller) varies with the data compression rate. Namely, the smaller the data size after compression, the greater the virtual logical capacity available from the SSD to the external device. As the data size after compression depends on the pattern of the data to be compressed, it is not constant. For this reason, where the storage device is mounted with plural SSDs, the virtual logical capacity that can be made available to external devices can differ from one SSD to another.

SUMMARY

In data compression by a storage controller used in a known storage device, such as the one described in Patent document 1, as the storage controller first compresses data, divides the compressed data into sets of a fixed size, and stores the sets into various memories including SSDs and HDDs (striping), the logical capacity of the memories constituting the RAID group is always uniform.

The storage controller according to Patent document 2 stripes data and stores sets of data into the plural SSDs in the RAID group. Storing striped data into requires each SSD in the RAID group to have an equal free space. In other words, once an SSD in the RAID group loses its free space, even if other SDDs have free spaces, no further data can be stored anew.

Thus, when data compression is compressed within SSDs, even if the storage controller stores the same quantities of data into the plural SSDs making up a RAID group, the data quantity actually stored into a flash memory, which is a storage medium, differs from one SSD to another because the compression rate is dependent on the data pattern. As a consequence, when free capacities become uneven among SSDs making up a RAID group as a result of compression, if one SSD runs out of free capacity, it is no longer possible to store data anew even if other SSDs have free capacities, which therefore become unusable.

In this way, there arises a problem for the storage device that, if each of the memory units making up a RAID group executes data compression, the utilization rate of the memory capacities of the memory devices drops.

With a view to addressing the problem noted above, the invention provides a storage device which includes plural semiconductor memory units each having plural nonvolatile semiconductor memory chips and a memory controller that compresses data and stores the compressed data into the plural nonvolatile semiconductor memory chips; and a storage controller that controls plural RAID groups including a prescribed number of semiconductor memory units contained in the plural semiconductor memory units, and controls data writing and reading into and out of the plural semiconductor memory units.

The memory controller associates memory areas of the plural nonvolatile semiconductor memory chips with logical memory areas and makes the same available to the storage controller. The storage controller divides the logical memory area made available by each of the plural semiconductor memory units into plural entries, each of which is a logical memory area of a prescribed size, acquires from each of the plural semiconductor memory units capacity information regarding data capacity stored in the plural nonvolatile semiconductor memory chips; selects, on the basis of the capacity information, a first semiconductor memory unit and a second semiconductor memory unit having a data storage quantity larger by at least a prescribed value than the first semiconductor memory unit out of the plural semiconductor memory units, and exchanges, on the basis of the capacity information, data of entries smaller in data storage quantity out of plural entries belonging to the first semiconductor memory unit with data of entries larger in data storage quantity out of plural entries belonging to the second semiconductor memory unit.

The differences in free physical capacity among memory units making up a RAID group can be reduced. The reduction of differences in free physical capacity results in a reduction of differences in maximum physical capacity. As a result, the usable logical capacities of the RAID group can be expanded. It is therefore made possible to architect a system involving the storage device at low cost by data compression within the memory units, and to architect the system at even lower cost by expanding the usable logical capacities of the RAID group.

BRIEF DESCRIPTION OF THE DRAWINGS

FIG. 10 shows an example of configuration of a cache memory provided in the storage controller in the first embodiment.

FIG. 11 shows an example of configuration of a disk management TBL in the first embodiment.

FIG. 12 shows an example of configuration of an RG management TBL in the first embodiment.

FIG. 13 shows an example of configuration of a pool management TBL in the first embodiment.

FIG. 14 shows an example of configuration of an entry management TBL in the first embodiment.

FIG. 15 shows an example of configuration of an extent management TBL in the first embodiment.

FIG. 16 shows an example of configuration of a virtual volume management TBL in the first embodiment.

FIG. 18 shows an example of configuration of a logical-to-physical conversion TBL in the first embodiment.

FIG. 19 shows an example of configuration of a block management TBL in the first embodiment.

FIG. 20 shows an example of configuration of a capacity management table in the first embodiment.

FIG. 37 shows an example of configuration of an RG management TBL in the third embodiment.

FIG. 38 shows an example of configuration of the virtual volume management TBL in the third embodiment.

DETAILED DESCRIPTION

A number of embodiments will be described below with reference to accompanying drawings.

First Embodiment

Figure 1:
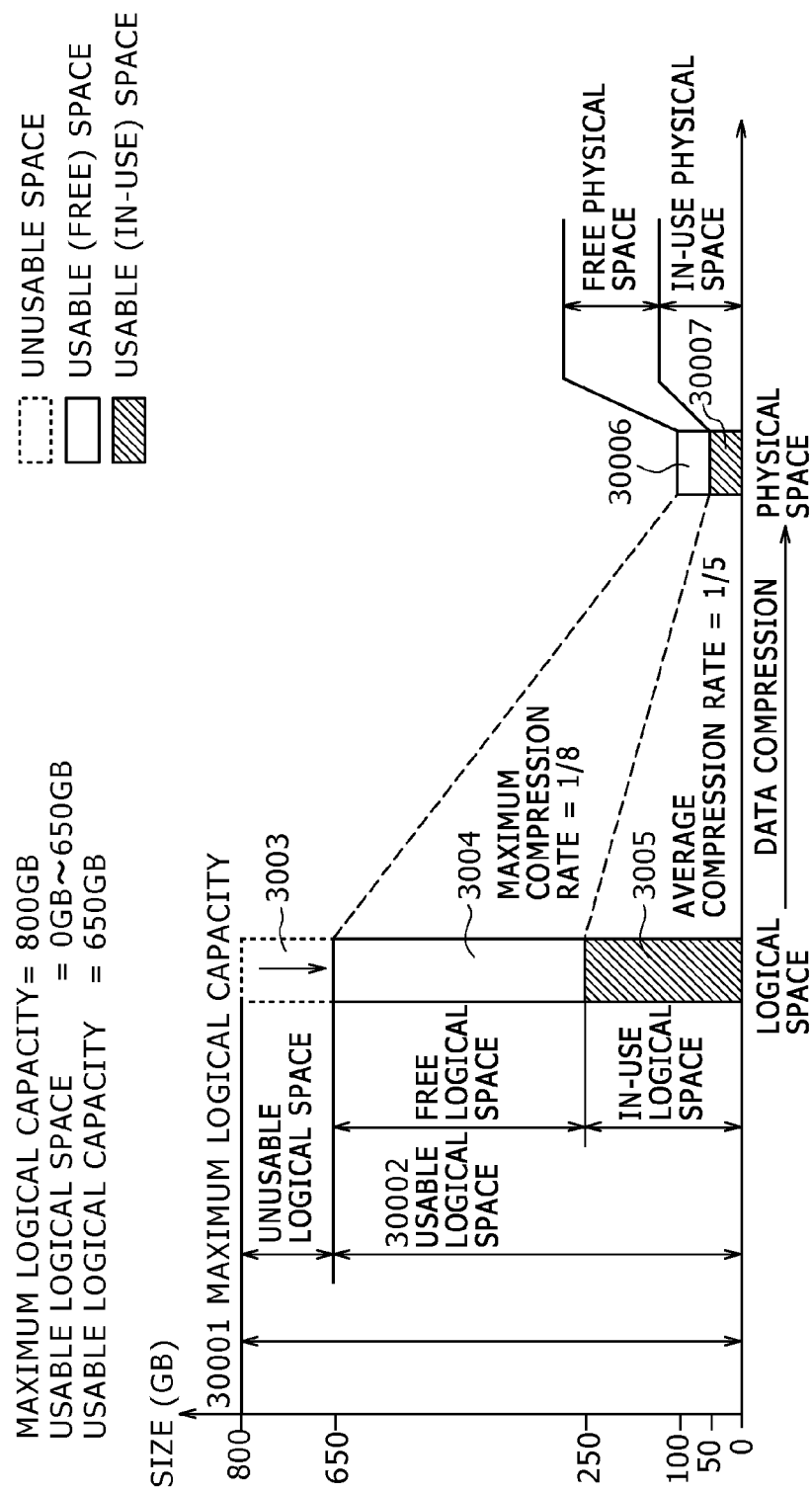
FIG. 1 shows an outline of address space of an SSD in a first embodiment.
Figure 2:
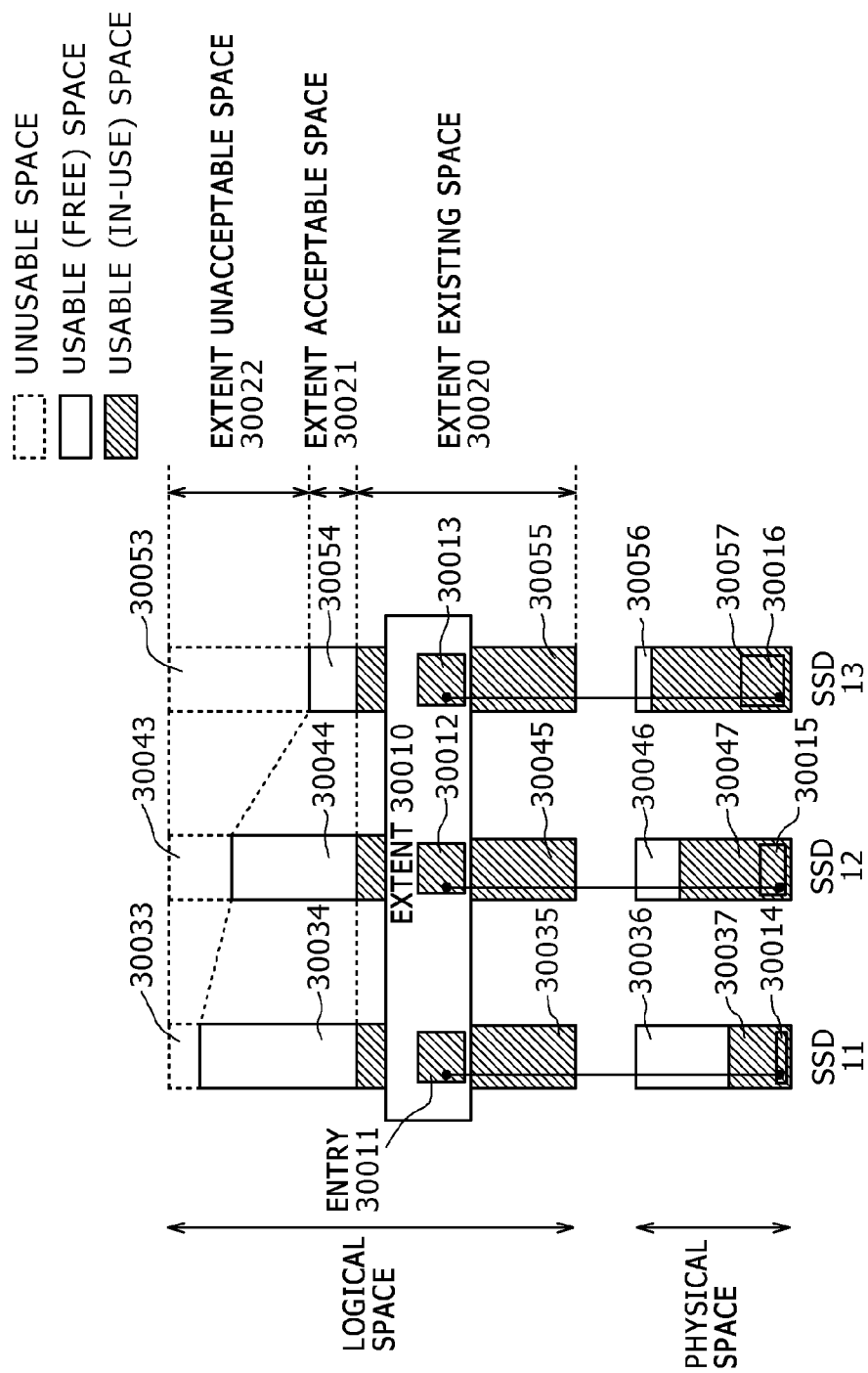
FIG. 2 shows an outline of the first embodiment.
Figure 3:
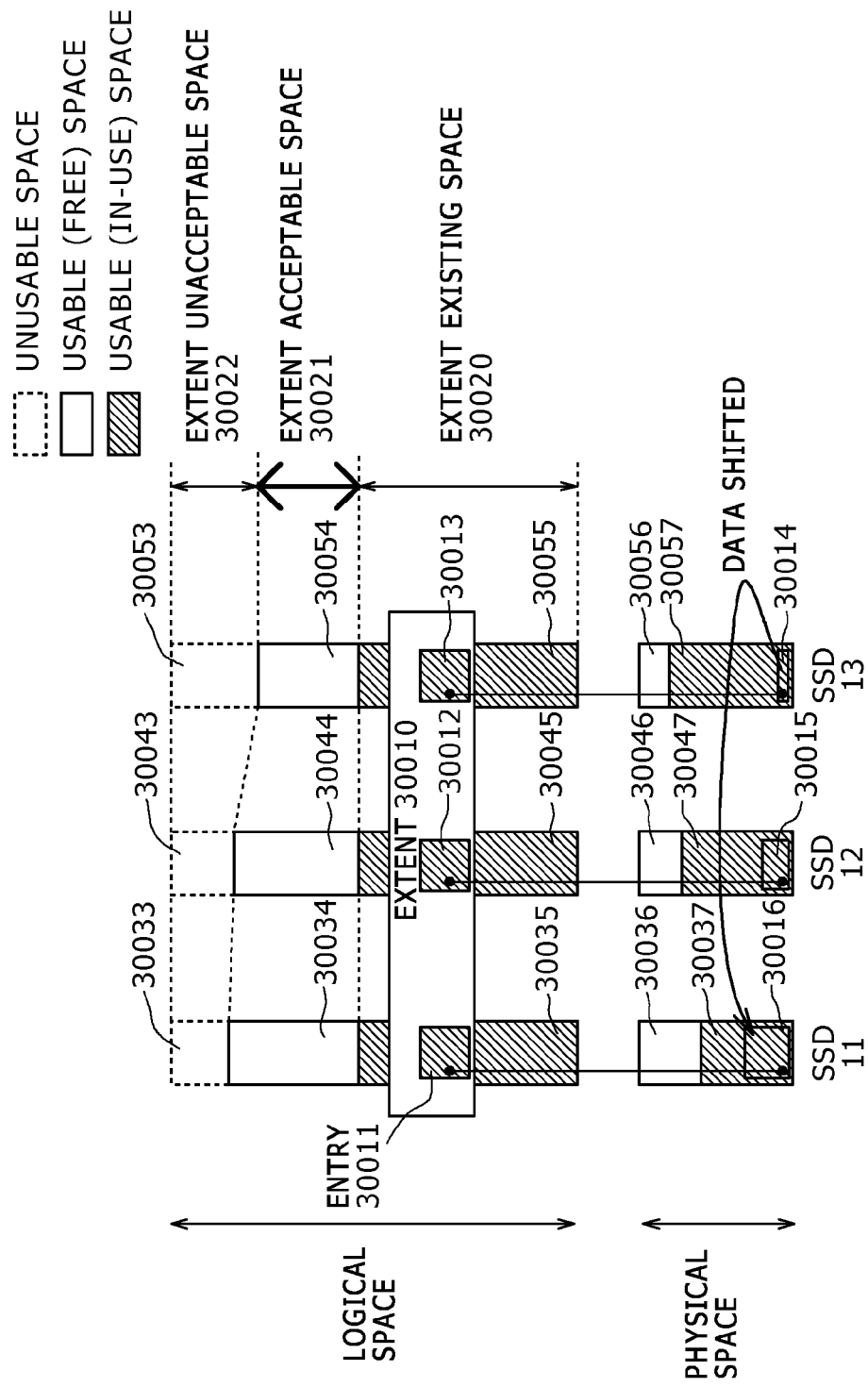
FIG. 3 shows in another way an outline of the first embodiment.

First, this embodiment will be outlined with reference to FIG. 1 through FIG. 3.

FIG. 1 shows an outline of address space of an SSD in the first embodiment.

The SSD as an element of the invention has a logical address space (hereinafter "logical space"), which is a logical address space made available to external devices (including a storage controller using the SSD), and a physical address space (hereinafter "physical space"), which is a physical address space into which data corresponding to the logical address space are actually stored. In the terminology of the following description, the size of the address space is defined to be a "capacity". Thus, the size of a logical address space is a "logical capacity", and that of a physical address space, a "physical capacity".

The SSD as an element of the invention here has a lower level capacity virtualizing function and a data compressing function.

First, with the lower level capacity virtualizing function, the SSD can make available to external devices a logical space larger than the corresponding physical space.

Next, with the data compressing function, the SSD internally compresses data written from external devices, and stores the data after compression (hereinafter "compressed data") into a flash memory (FM), which is a physical memory medium. Thus, when a given set of data is written, the actually consumed physical capacity can be reduced by the compression. However, the consumed quantity of the physical capacity depends on the compression rate of data. To add, the data compression rate can be calculated by dividing the physical capacity consumed for storing the compressed data by the data size resulting from the write request. Thus, if write data of 10 KB are reduced in size to 2 KB by the compression, the data compression rate is 1/5 (20%). In the context of the invention, the smaller the value of the data compression rate (the closer to 0%), the higher the effectiveness of compression.

Here, the upper limit of the data compression rate is defined to be the maximum data compression rate (hereinafter "maximum compression rate"). The maximum compression rate is the data compression rate at which the maximum data compression effect is achieved, a parameter determined or estimated from the compression algorithm and some factors the SSD has. The following description will assume a design that supposes the maximum compression rate to be 1/8 (12.5%). In this way, the data compression rate varies with the pattern of data to be stored in the SSD from the maximum compression rate (12.5%) to no compressive effect (100%).

While the SSD used in the invention can make available to external devices a larger logical capacity than the corresponding logical capacity by tying the capacity virtualizing function with the data compressing function, it has a characteristic that the logical capacity it can make available (namely the capacity the external devices can use) varies with the data compression rate. For instance, if it succeeds in data compression at 1/8, the maximum compression rate, when the data are stored into an SSD of 100 GB in physical capacity, the logical capacity of the SSD will increase eight times to 800 GB. On the other hand, if no compressive effect is achieved, namely if the compression rate is 100%, the logical capacity of the SSD is equal to the physical capacity, i.e. 100 GB.

In this way, the logical capacity that can be made available to external devices can be obtained by an equation "Logical capacity available to external devices=Physical capacity÷Compression rate".

The relationship of correspondence between the logical space and the physical space of an SSD will be described in detail with reference to FIG. 1. FIG. 1 shows the state at a given point of time of the SSD enabled to provide a logical space of 800 GB at the maximum by being specified to have a physical capacity of 100 GB and a maximum compression rate of 1/8.

A maximum logical capacity 30001 is the upper limit of the logical capacity the SSD can make available to external devices, and that capacity in FIG. 1 is 800 GB. However, a logical space of 800 GB cannot always be available to external devices because the available logical space varies with the compression rate of data compression implemented within the SSD. For this reason, some logical spaces in an SSD are usable while others are unusable.

A usable logical space 30002 is the logical space the SSD can make available to external devices, which recognize the size of the space as the logical capacity the SSD can make available to them. In FIG. 1, the size is 650 GB. Next, an unusable logical space 30003 corresponds to the logical space loss that arises when the data stored in the SSD cannot be compressed at the maximum compression rate of 1/8, and its size in FIG. 1 is 150 GB.

Thus, the maximum logical capacity 30001 is equal to the total of the size (capacity) of the usable logical space 30002 and that of the unusable logical space 30003.

Next, the usable logical space 30002 comprises a free logical space 30004 and an in-use logical space 30005.

The in-use logical space 30005 is a space already used by an external device in the usable logical space 30002. More specifically, in that space, data written from the external device are already stored. However, the data stored there are compressed within the SSD, and the compressed data are further stored into an FM constituting a physical space. Incidentally, the size of an in-use physical space 30005 in FIG. 1 is 250 GB.

On the other hand, the free logical space 30004 is a logical space used by no external device in the usable logical space 30002. This area, in which no data from any external device are stored as yet, is in a free state. In FIG. 1, its size is 400 GB.

The next description will concern the physical space of the pertinent SSD.

The physical space comprises an in-use physical space 30007 and a free physical space 30006. The in-use physical space 30007 is a space matching the in-use logical space 30005, a space in which compressed data resulting from compression of the data written into the in-use logical space 30005 are stored. In FIG. 1, its size is 50 GB. In the state shown in FIG. 1, an external device is using a logical space corresponding to 250 GB for storing data, and it is shown that the actually consumed physical capacity is only 50 GB as a result of compression of the data to an average of 1/5 within the SSD.

On the other hand, no data are stored in the free physical space 30006. Namely it is a free physical capacity. In FIG. 1, its size is 50 GB.

The free physical space 30006 is a space matching the free logical space 30004. More specifically, the size of the free logical space 30004 is equal to the quotient of division of the size of the free physical space 30006 by the maximum compression rate. In the drawing, there is a free physical capacity of 50 GB, and there further is a free logical capacity of 400 GB because the maximum compression rate of the SSD is 1/8.

To sum up the foregoing, the SSD shown in FIG. 1 can make a logical capacity of 800 GB at the maximum available to external devices. When the logical capacity that can be made available to meet needs from outside is 800 GB, there holds within the SSD a relationship of Usable logical capacity=Maximum logical capacity 30001. To add, the usable logical capacity means the size of the usable logical space 30002.

The condition required for achieving a usable logical capacity of 800 GB is storage of data compressed at the maximum compression rate of 1/8. However, the compression rate of data varies with the pattern and other factors of the data to be stored, and in an extreme case data cannot be compressed at all. In the case of total impossibility to compress data, the usable logical capacity then is 100 GB, equal to the corresponding physical capacity. As the data compression rate varies all the time, the usable logical capacity also varies from 100 GB to 800 GB along with the compression rate variation.

Thus, in the instance shown in FIG. 1, the SSD size recognized by external devices varies from 100 GB to 800 GB. In the unused state of the SSD, as the whole physical space of 100 GB is in a free state, the SSD size recognized by external devices is 800 GB. However, as the size of the free logical space 30004 is an expected value, this size can as well be obtained by dividing the free physical space 30006 by the average compression rate.

FIG. 2 shows a RAID group (hereinafter abbreviated to "RG") architected by using three SSDs (SSD 11, SSD 12 and SSD 13) of the type described with reference to FIG. 1.

In this configuration, the physical space of the SSD 11 comprises a free physical space 30036 and an in-use physical space 30037, and the matching logical space comprises an unusable logical space 30033, a free logical space 30034 and an in-use logical space 30035. Similarly, the physical space of the SSD 11 comprises a free physical space 30036 and an in-use physical space 30037, and the matching logical space comprises an unusable logical space 30033, a free logical space 30034 and an in-use logical space 30035.

Further in the pertinent RG, plural extents are prepared by a storage controller (not shown). In the drawing, an extent 30010 is one example of configuration of an extent. The storage controller uses the logical space of the SSD to architect the extent.

The extent here is formed of "entries" each prepared by using a logical space of a fixed size out of one SSD or another. Now, in the extent 30010, there are present an entry 30011 prepared from any available logical space in the SSD 11, an entry 30012 prepared from any available logical space in the SSD 12, and an entry 30013 prepared from any available logical space in the SSD 13. Incidentally, the entries 30011, 30012 and 30013 are equal in size. However, data stored in each entry are compressed within the SSD, and stored into the physical space as compressed data. In the state shown in the drawing, the data of the entry 30011 are compressed in the SSD 11, and stored as compressed data 30014. Further, the data of the entry 30013 are compressed in the SSD 13, and stored as compressed data 30016. In this process, differences in compression rate make the sets of compressed data 30014, 30015 and 30016 uneven in size. In the drawing, the differences in quadrangle size represent a relationship of Compressed data 30016>Compressed data 30015>Compressed data 30014. Namely, the compression rate is higher in the order of Compressed data 30014>Compressed data 30015>Compressed data 30016. A higher compression rate in this context means the capability to make the compressed data smaller.

Next, an extent existing space 30020 indicates that extents are already prepared in the pertinent logical space. The size of the space depends on the size of the in-use logical space in each SSD. An extent acceptable space 30021 indicates that extents can be prepared in the pertinent logical space, whose size depends on the size of the free logical space of the SSD whose free logical space is the smallest in the RG. An extent unacceptable space 30022 indicates that no extents can be prepared in the pertinent logical space, whose size depends on the size of the unusable logical space of the SSD whose unusable logical space is the largest in the RG.

As the extents here are striped into an equal size for each SSD, in-use logical spaces 30035, 30045 and 30055 are equal in size among the SSDs. Namely, as the RG is composed of three SSDs, the size of the extent existing space 30020 is equal to three times the size of the in-use logical space in any of these SSDs. However, within each individual SSD, data are compressed and stored into a physical space as compressed data. As the probability that the data stored into the different SSDs have the same data pattern is low, it is very likely for the compressive effects of the SSDs to be uneven. Therefore, the sets of compressed data generated in the SSDs are also very likely to be uneven in size. The diagram shows how the different average compression rates in the SSDs make in-use physical spaces 30037, 30047 and 30057, which are physical use quantities of the SSDs, different from one another in size. As their sizes are in a relationship of in-use physical spaces 30037<30047<30057, it is seen that the average compression rates sizes are in a relationship of 30037>30047>30057.

The differences in physical use quantity entail uneven sizes of the free logical space 30034, 30044 and 30055 in the SSDs. This situation further gives rise to unevenness among the free logical spaces 30034, 30044 and 30055 and unusable logical spaces 30033, 30043 and 30053.

To take note of free logical spaces, as the SSD 11 has the largest free physical space 30036, its free logical space 30034 also is the largest.

When any new extent, which is a stripe volume, is to be newly prepared, a free logical space of an equal volume from each SSD is consumed. Thus, the size of an extent that can be prepared in a given RG is limited by the SSD whose maximum physical capacity is the smallest among the SSDs making up the RG. More specifically, the size of the extent acceptable space 30021 as shown in FIG. 2 is equal to three times the size of the free logical space 30054, which is the smallest in the RG. Conversely, the size of the extent unacceptable space 30022 is equal to three times the size of unusable logical space 30053, the largest in the RG.

Thus, the data compressing function of SSDs invites a situation in which the free physical capacity, which is the physical residual capacity of each SSD, varies from one SSD to another. This further leads to unevenness of the maximum physical capacity among the SSDs. When a new extent is to be architected in such a situation, even if sufficient maximum physical capacities remain in other SSDs, the size of the capacity permitting preparation of any additional extent is limited by the SSD whose maximum physical capacity is the smallest among the SSDs making up the RG.

According to the invention, the size of the extent acceptable space 30021 is expanded or maximized. To achieve this, according to the invention, if the maximum physical capacities of the SSDs making up the RD are uneven as shown in FIG. 2, data shifting is done to reduce differences among the maximum physical capacities of the SSDs.

FIG. 3 shows the state of the SSDs when the state of unevenness shown in FIG. 2 has been resolved by processing capacity leveling. The leveling here is not required to make the free physical capacities strictly equal among the SSDs, but reducing the differences among the free physical capacities of the SSDs would be sufficient. However, if data are so shifted as to equalize the free physical capacities of the SSD, the usable logical capacities will be maximized.

As the size of the free logical space 30054 of the SSD 13 was at the minimum while the free logical space 30034 of the SSD 11 and the free logical space 30044 had sufficient sizes before the execution of leveling (FIG. 2), the size of the extent acceptable space 30021 was three times the maximum physical capacity 30054 in the state of FIG. 2. Incidentally, this unevenness of maximum physical capacities arises from the uneven sizes of free physical spaces among the SSDs resulting from differences in data compression effect (difference in compressed data size) from one SSD to another.

Then, the storage controller shifts data to equalize the free physical space sizes in the SSDs. More specifically, the controller replaces sets of more compressed data (i.e., smaller-sized sets of compressed data) in SSDs with greater free physical spaces (i.e. with smaller physical use quantities) with sets of less compressed data (i.e., greater-sized sets of compressed data) in SSDs with smaller free physical spaces (i.e. with greater physical use quantities).

Referring to FIG. 2, the compressed data 30014, more compressed data in the SSD 11 having a larger free physical space, and the compressed data 30016, less compressed data in the SSD 11 having a less compressed data in the SSD 13 having a smaller free physical space, are exchanged.

Storage of the compressed data 30016 having a larger physical use quantity into the SSD 11 after the execution of leveling (FIG. 3) has resulted in a decrease in the free physical space of the SSD 11. Along with that, the free logical space 30034 is also smaller than in the pre-leveling state shown in FIG. 2. On the other hand, storage of the compressed data 30014 having a smaller physical use quantity into the SSD 13 has resulted in an increase in the free physical space of the SSD 13. Along with that, the free logical space 30054 is also greater than in the pre-leveling state shown in FIG. 2.

This has resulted in narrowed discrepancies between the free logical spaces 30034 and 30044 on one hand and the free logical space 30054 on the other. Of these three, the free logical space smallest in size remains the free logical space 30054, but its size is larger than in the state shown in FIG. 2, which is before the execution of leveling. Along with that, the size of the extent acceptable space 30021 has also expanded. This is an effect attributable to the size leveling of the free physical spaces in the SSDs. Thus, size leveling of free logical spaces is tantamount to size leveling of free physical spaces.

To add, when the size differences among the free logical spaces 30034, 30044 and 30054 have been eliminated, namely, when the size differences among the free physical spaces 30036, 30046 and 30056 have been eliminated, the size of the extent acceptable space 30021 is maximized.

Figure 4:
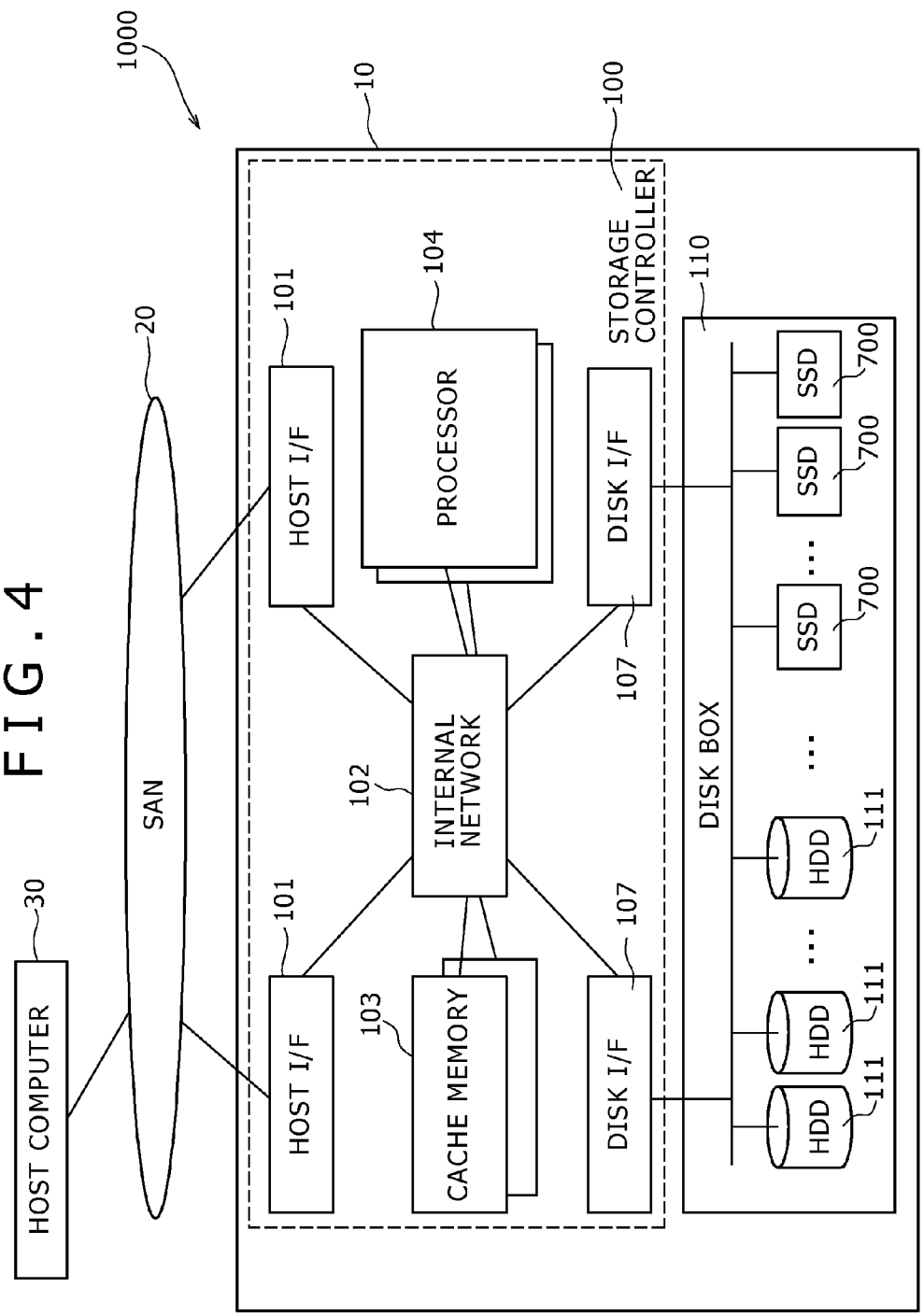
FIG. 4 shows an example of storage system involving the storage device in the first embodiment.

FIG. 4 shows an example of configuration of a storage system 10000 involving a storage device 10 in the first embodiment.

The storage system 10000 comprises the storage device 10 and a host computer 30. The host computer 30 is one example of host device utilizing the storage device 10. The host computer 30 is, for example, an application server. The host computer 30 and the storage device 10 communicate with each other via a storage area network (SAN) 20, for instance. As the SAN 20, for example, a fiber channel, small computer system interface (SCSI), internet small computer system interface (iSCSI), universal serial bus (USB), IEEE 1394 bus or serial attached SCSI (SAS) can be used. In place of the SAN 20, some other type of communication network (e.g. a local area network (LAN)) may be used as well. To add, though one each of the host computer 30 and the storage device 10 are shown in the drawing, at least one of the two constituents may be provided in a plurality.

The host computer 30 issues control commands and the like to the storage device 10 and keeps them under its maintenance by executing a control program (not shown) for issuing control commands and the like to the storage device 10. Execution of the control commands by the storage device 10 enables various tasks to be accomplished, such as altering the RAID level of a RAID group (hereinafter "RG") that the storage device 10 has, adjusting the threshold of actuation of capacity leveling, and ON/OFF setting of the RG-by-RG or pool volume-by-pool volume compressing function. To add, the RAID group, comprising plural SSDs (or HDDs), is a physical memory media group that stores data in accordance with prescribed RAID levels including RAIDs 0, 1, 1+0, 2, 3, 4, 5 and 6. As a computer for issuing control commands to the storage device 10, another computer than the host computer 30 may as well be used.

The storage device 10 has a storage controller 100 and a disk box 110 connected to the storage controller 100.

The storage device 10 controls actions of the storage device 10. The storage device 10 has communication interface devices, memories and control devices connected to them. The communication interface devices include host I/Fs 101, which are front end communication interface devices, and disk I/Fs 107, which are back end communication interface devices. The memories are cache memories 103. The control devices are processors (e.g. central processing units (CPUs)) 104. The host I/Fs 101, the cache memories 103, the processors 104 and the disk I/Fs 107 are connected to an internal network 102 by a dedicated connection bus, such as a peripheral component interconnect (PCI), and can communicate via the internal network 102.

The cache memories 103 are connected to the internal network 102 by a connection bus such as double data rate3 (DDR3).

The host I/Fs 101 are interfaces for connecting the storage device 10 to the SAN 20.

The internal network 102 is a network for connecting devices that are present within the storage device 10 to one another. The internal network 102 includes a switch. In place of the internal network 102, application specific integrated circuits (ASICs) having a switching function and an assisting function for DMA transferring, RAID computation and the like may as well be used.

The processors 104 control the whole storage device 10. The processors 104 are provided in a plurality. In this case, the processors 104 control the storage device 10 jointly or on a function sharing basis.

The cache memories 103 have areas for storing computer programs needed by the processors 104 in controlling the storage device 10 and for temporary storage of data.

The disk I/Fs 107 are interfaces for connecting the storage controller 100 and the disk box 110.

The disk box 110 has plural disks of different types (e.g. nonvolatile physical memory media such as HDDs 111 and SSDs 700). Disks of the same type make up a RAID group. And from each RAID group, a logical volume is provided as a storage space for user data. Incidentally, though the HDDs 111 and the SSDs 700 are shown in the drawing as disks making up the disk box 110, the HDDs 111 are dispensable.

Figure 5:
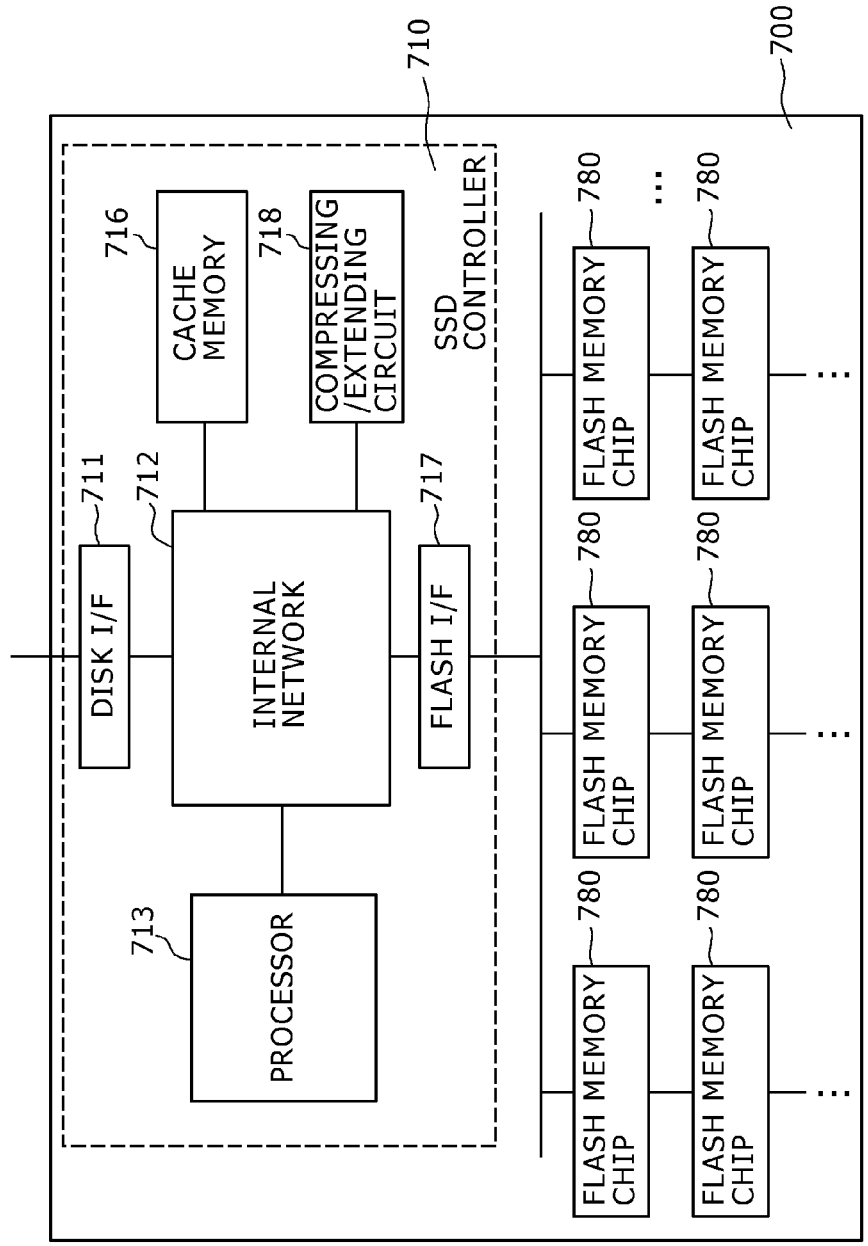
FIG. 5 shows an example of SSD configuration in the first embodiment.

FIG. 5 shows an example of configuration of the SSDs 700.

The SSDs 700 have plural flash memory chips 780 and an SSD controller 710 connected to them. The SSD controller 710 controls actions on the plural flash memory chip including writing/reading and compression/extension of data.

The SSD controller 710 has communication interface devices, a memory, a control device connected to them, and a hardware circuit that executes compression/extension of data. The function of compression/extension may as well be accomplished with software. The communication interface devices include a disk I/F 711, which is a front end communication interface device, and a flash I/F 717, which is a back end communication interface device. A cache memory 716 is provided as the memory, and a processor 713, as the control device. A compressing/extending circuit 718 is provided as a hardware device for executing data compression/extension. The function of data compression/extension may as well be achieved with software by having the processor 713 execute a dedicated program. The disk I/F 711, the processor 713, the cache memory 716, the flash I/F 717 and the compressing/extending circuit 718 are connected to one another via an internal network 712. The internal network 712 is a network for connecting devices to one another. The internal network 712 may include switches. ASICs with a switching function may as well be substituted for the internal network 712. The processor 713 controls the whole SSDs 700. The cache memory 716 is an area for storing computers and data needed by the processor 713 in controlling the SSDs 700. The flash I/F 717 is an interface for connecting the SSD controller 710 and the flash memory chips 780.

Figure 6:
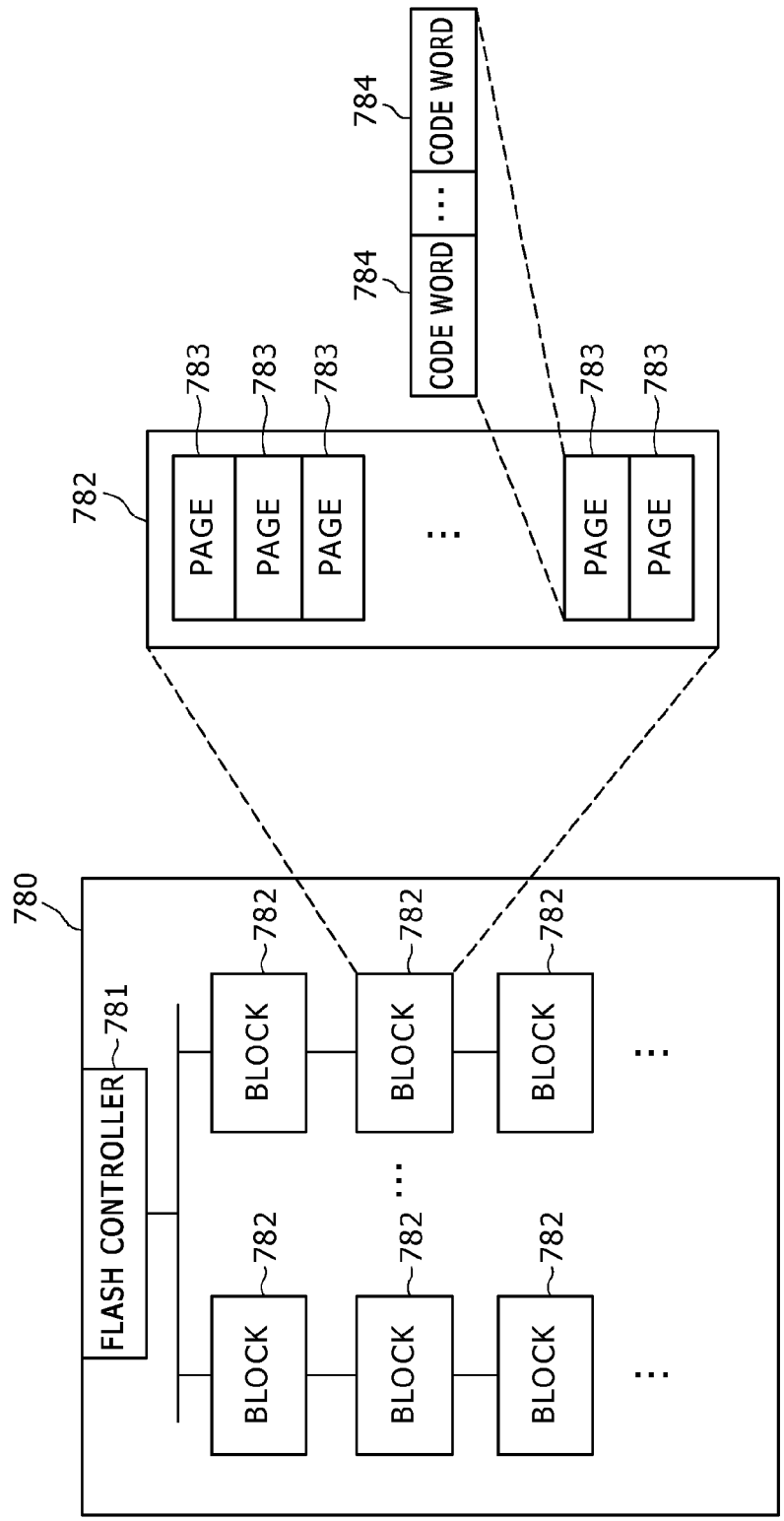
FIG. 6 shows an example of flash memory chip in the first embodiment.

In this embodiment, each SSD is a memory unit provided with plural flash memories and a controller for controlling them, and its external shape or other aspects are not limited by any form factor. As the flash memories, nonvolatile semiconductor memories such as NORs or NANDs may be used. Or in place of the flash memories, semiconductor memories such as magnetoresistive random access memories (MRAMs), resistance random access memories (ReRAMs), which are variable resistance memories, or ferroelectric random access memories (FeRAMs) may be used as well. FIG. 6 shows an example of configuration of the flash memory chips 780.

Each flash memory chip 780 has plural blocks 782 and a flash memory controller (hereinafter "flash controller") 781 connected to them. The flash controller 781 controls the writing/reading of data into or out of the flash memory chips 780. Each of the blocks 782 is formed of plural pages 783, and each of the pages 783 is formed of plural code words 784. The reading of data out of the flash memory chip 780 and the writing of data into the flash memory chip 780 are accomplished on a page-by-page basis. Data deletion is done on a block-by-block basis. Each of the pages 783 is formed of plural code words 784 and, though not shown, data stored from the host computer 30 and an error check and correction (ECC) code, which is an error correction code for protecting the data stored in each of the code words 784.

The flash memory chips 780 are, for instance, NAND type flash memories. In a NAND type flash memory, data cannot be overwritten. For this reason, when new data are to be written into a page where data are already written, another page already cleared of data has to be secured to enable new data to be written into. In that case, the page into which the new data have been written is managed as a valid page, and the page in which the data to be updated were stored is managed as an invalid page.

Since data deletion has to be accomplished block by block, if any valid data are present in the block to be deleted, all the pages in the block the data in which are to be deleted are invalidated by copying any valid data to another block, and data deletion is thereby accomplished. This sequence of processing for generating a cleared block is known as reclamation processing.

The SSD controller 710 carries out wear leveling of the plural blocks 782 in the SSDs 700. The SSD controller 710 levels the number of times of block clearance in the SSDs 700 by storing data to be less frequently updated into blocks to be more frequently cleared and storing data to be more frequently updated into blocks to be less frequently cleared.

The SSD controller 710 may as well perform wear leveling at the time of writing by selecting blocks to be less frequently cleared and storing data into these blocks. In this case, the controller may also divide the plural blocks into plural groups according to the number of times of clearance, and select blocks in the ascending order of the number of times of clearance.

Wear leveling of the plural blocks in each SSD serves to elongate the useful life of the SSD.

Figure 7:
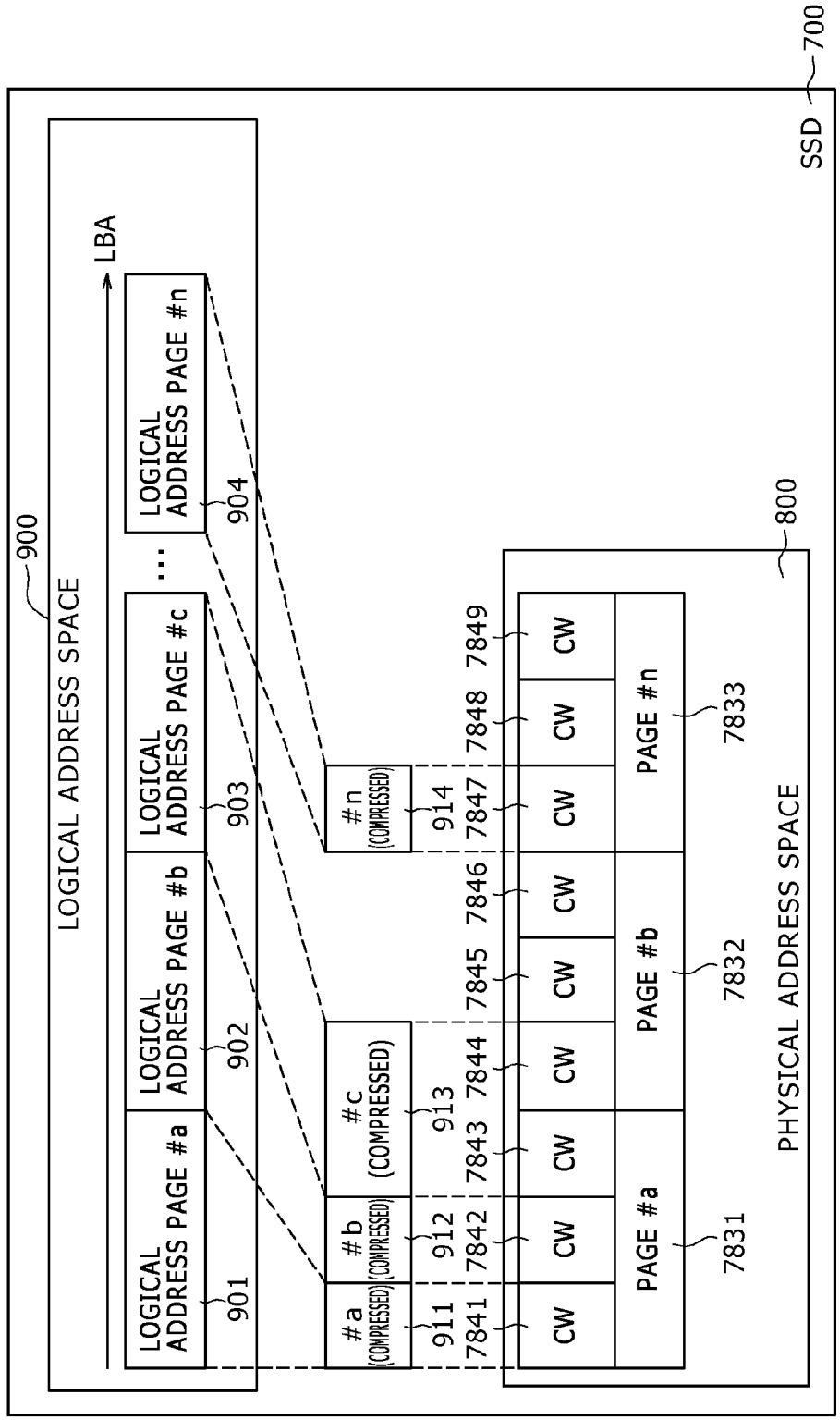
FIG. 7 shows an example of address space of an SSD in the first embodiment.

FIG. 7 shows an example of configuration of address spaces of an SSD.

For each of SSDs 700, there are a logical address space 900 and a physical address space 800. The logical address space 900 is a unique address space which the SSD 700 makes available to the storage controller 100. On the other hand, the physical address space 800 is an address space for identifying a physical storage area into which actual data are to be stored. The SSD controller 710 divides the logical address space 900 into plural areas (hereinafter "logical pages") 901, 902, 903 and 904, each as large as a physical page size, and assigns to each area one or another of physical pages 7831, 7832 and 7833, which are physical address spaces. Here in this embodiment, the SSD 700 has a data compressing function and a lower level capacity virtualizing function.

The data compressing function compresses data logical page by logical page. For instance, data in the logical page 901 are converted into compressed data 911, data in the logical page 902 into compressed data 912, data in the logical page 903 into compressed data 913, and data in the logical page 904 into compressed data 914. Ultimately, the compressed data are stored into physical pages code word (hereinafter "CW") by code word. If compressed data become as small as or smaller than the CW size, the remaining space is padded with zero data or the like.

Referring to the drawing, the compressed data 911 are stored into a CW 7841, the compressed data 912 into a CW 7842, the compressed data 913 into a CW 7843 and a CW 7844, and the compressed data 914 into a CW 7847. As the compression rate varies, compressed data are not always constant in size but may take on any size. In this way, in each of the SSDs 700 having a compressing function, the number of physical pages used can be saved by storing plural logical pages into a single physical page.

Furthermore, the SSDs 700 have a lower level capacity virtualizing function, and makes available to the outside logical spaces larger than the corresponding physical spaces. More specifically, a logical address space has a larger number of logical pages than physical pages. Until the physical address space 800 is filled with compressed data, the logical address space 900 is expanded. That is to say, when every physical address space has been filled with data at the maximum compression rate, the largest logical address space can be made available to the outside.

In this embodiment, the compression rate is supposed to be calculated from the number of CWs contained in the physical page and the number of CWs of compressed data. For instance in the case shown in FIG. 7, as page #a contains three CWs, if compressed data #a are equivalent to one CW, the compression rate is 33.3%. In this case, when data equivalent to one page have been compressed to data of size not larger than 1 CW, the compression rate reaches its maximum.

The SSD controller 710 can achieve wear leveling and the like by dynamically varying the mapping between an address range (area) making up the logical address space 900 and an address range (area) making up the physical address space 800. To add, the correspondence between the logical address space 900 and the physical address space 800 is managed by the processor 713 by using a logical-to-physical conversion table 23100 to be described afterwards. In this embodiment, the storage controller 100 does not manage the logical-to-physical conversion table in the SSD. Therefore, unless the processor 713 notifies the storage controller 100 of any internal information on the SSD, the storage controller 100 cannot keep track of the relationship of correspondence between the logical address space 900 and the physical address space 800.

Next, a higher level capacity virtualization technique will be described in detail.

A higher level capacity virtualization technique (e.g. thin provisioning) is intended for providing the host computer 30 with a larger virtual capacity than the physical capacity that the storage device 10 has. The host computer 30 accesses a virtual logical volume (virtual volume). By the capacity virtualization technique, when the storage device 10 has received a physical storage area is allocated to the virtual storage area (virtual extent) to which the data covered by the write request are destined. In this embodiment, physical storage areas are allocated by the capacity virtualization technique on an extent-by extent basis. The size of each extent can be set to any size, between a few MB to a few gigabytes for example.

The higher level capacity virtualization technique will be described in detail with reference to FIG. 8.

Figure 8:
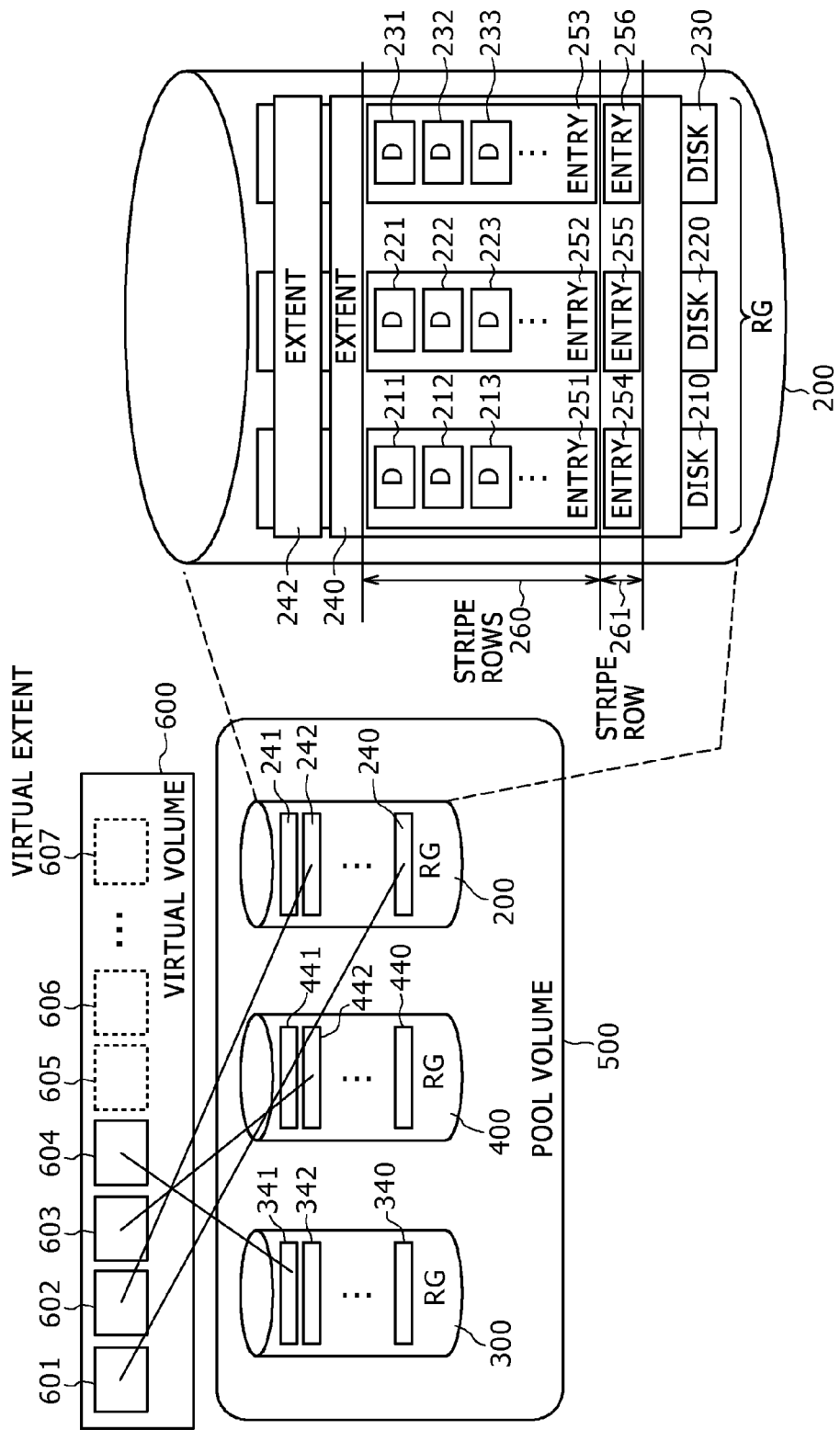
FIG. 8 illustrates an outline of a higher level capacity virtualization technique in the first embodiment.

FIG. 8 illustrates an outline of the higher level capacity virtualization technique.

The RAID group (RG) is configured of disks of the same type (e.g. SSDs). A pool volume 500 is configured on the basis of one or more RGs.

An extent is a memory area obtained by dividing a RAID group. Namely, the pool volume 500 contains plural RAID groups, and contains plural extents configured on the basis of each RAID group. In the drawing, the pool volume 500 is shown to be configured on the basis of three RGs including an RG 200, an RG 300 and an RG 400. The following description will refer to the RG 200.

The RG 200 is configured of a disk1 210, a disk2 220 and a disk3 230. Further, the RG 200 makes up a RAID 5, and Data (D in the diagram) and Parity (P in the diagram) are stored into the disks (210 to 230).

An RG-based memory area is divided into plural extents. The RG-based memory area comprises the logical address space 900 provided by plural SSDs.

Next, the configuration of an extent will be described. The extent is configured of entries, which are logical address spaces present in the disks. In each entry, plural sets of Data and Parities are stored. In the diagram, D211, D212 and P213 are shown to be stored in an entry 251. In an entry 252, D221, D222 and P223 are stored, and further in an entry 253, D231, D232 and P233 are stored. In an entry 254, though not shown, similarly plural sets of Data and Parities are stored. Further, the entries 251 and 254 are built up in the disk 210, the entries 252 and 255 in the disk 220, and the entries 253 and 256, in the disk 230.

Each entry belongs to a stripe row disposed in an extent. Here, the entries 251, 252 and 253 belong to a stripe row 260. The entries 254, 255 and 256 belong to a stripe row 261. In some stripe rows, Data sets and related Parities should be stored into different disks to ensure the redundancy of the RAID. More specifically, as D211 and D221 are protected by P231, D211 and D221 and P231 are stored in the disk 210, the disk 220 and the disk 230, which are different disks. Similarly, D212 and D232 are protected by P222, and D223 and D233 are protected by P213. For instance, P231 is calculated by XOR operation of D211 and D221. In this case, when D211 or D221 is updated, P231 is also updated. In this way, Parity addition enables, when any of the disk 210, the disk 220 and the disk 230 belonging to a RAID group runs into trouble, data in the trouble-ridden disk can be restored from some other normal disk.

In this embodiment, data are shifted entry by entry to process leveling. In this processing, keeping the redundancy of the RAID requires the presence of two or more entries belonging to the same stripe row in the same disk. For instance, supposes that data in the entry 254 and the entry 252 are shifted. Then, theoretically they should be stored into different disks. Otherwise, D211 and D221 would be in the same disk 210. This would mean a drop in the data protecting capability of the RAID. Thus, in order to maintain the redundancy of the RAID, the storage controller should so select the data to be shifted, in the processing of leveling, that no plural entries belonging to the same stripe row become present in the same disk.

An extent is a group of entries; for instance, an extent 240 is configured of the entries 251, 252, 253, 254, 255 and 256.

In FIG. 8, the extent 240, an extent 241 and an extent 242 are shown to be prepared from the RG 200. An extent 340, an extent 341 and an extent 342 are prepared from a memory area of an RG 300, and an extent 440, an extent 441 and an extent 442 are prepared from a memory area of an RG 400.

In the case shown in FIG. 8, extents are memory areas larger in size than blocks. The size of an extent is, for instance, N (N is an integer not smaller than 2) times that of a block. To add, an extent may as well be so set as to contain plural data sets and one or more sets of parities calculated the plural data sets 1.

A virtual volume 600 is a virtual logical volume for the host computer 30 to store user data in. Incidentally, the capacity defined as the capacity of the virtual volume 600 can be made a larger memory capacity than the total of the capacities of memory media that the storage device 10 has. The virtual volume 600 is configured of any desired number of virtual extents 601 to 607. Although one extent is associated with the virtual extent shown in FIG. 6 for instance, plural extents may as well be associated with a single virtual extent. The virtual volume 600 has a virtual address (a logical address constituting a virtual volume), and virtual extents are configured by partitioning the virtual address according to a prescribed range. The host computer 30 issues a read/write request to the virtual address of the virtual volume 600. To add, extents may as well be allocated to plurality of virtual volumes 600 out of one pool volume.

To virtual extents 601 through 604 represented by solid lines, extents are allocated from the RGs 200, 300 and 400. Thus, the extent 240 is allocated to the virtual extent 601, the extent 242 to the virtual extent 602, the extent 442 to the virtual extent 603, and the extent 341 to the virtual extent 604.

Incidentally, as virtual extents 605 through 607 represented by dotted lines are not virtual extents to which the address designated as the destination of data writing belongs, no extents are as yet allocated into the virtual extents 605 through 607.

Figure 9:
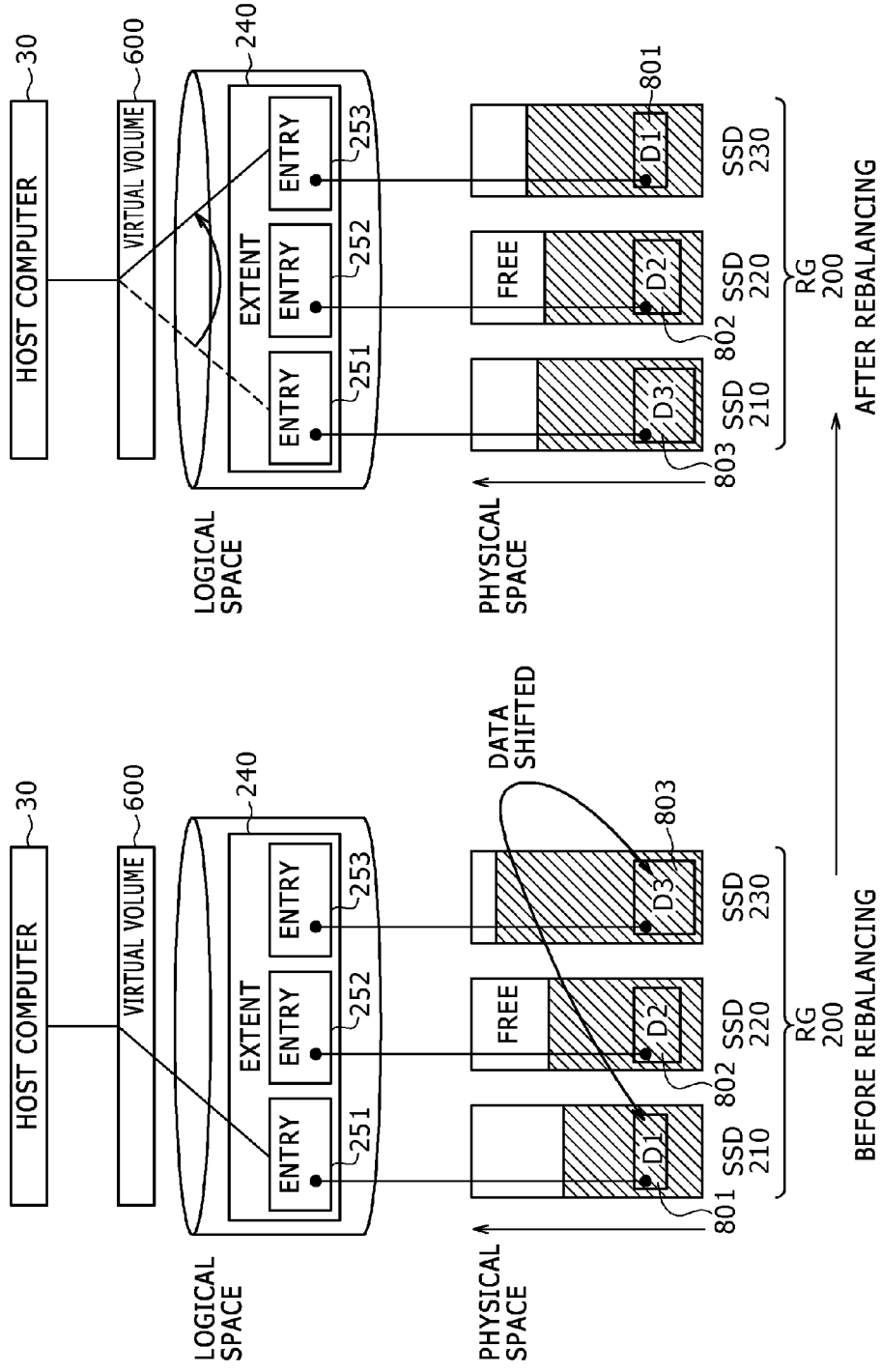
FIG. 9 shows an example of relationship between processing of capacity leveling and a virtual volume in the first embodiment.

FIG. 9 shows an example of relationship between processing of capacity leveling and a virtual volume.

An SSD 210, an SSD 220 and an SSD 230 make up the RG 200, and the entry 251 is mapped in part of the logical address space of the SSD 210. Similarly, the entry 252 is mapped in part of the logical address space of the SSD 220, and the entry 253 is mapped in part of the logical address space of the SSD 230. Incidentally, as the entries 251, 252 and 253 match logical address spaces in SSDs, they are recognized by the storage controller as having certain sizes irrespective of whether or not data compression has taken place in the SSDs. Further, the entries 251, 252 and 253 are mapped in the extent 240, and the extent 240 is mapped as part of the virtual volume 600.

Next, D1, which is a data set matching the entry 251, is stored as compressed data 801 within the SSD 210. Similarly, D2, which is a data set matching the entry 252, is stored as compressed data 802 within the SSD 220. Furthermore, D3, which is a data set matching the entry 253, is stored as compressed data 803 within the SSD 230. The compressed data 801, 802 and 803 stored in the physical address spaces of SSDs differ in size from one another on account of differences in data compression rate, which are due to differences in data pattern. In the diagram, the sizes of the quadrangles representing the compressed data 801, 802 and 803 indicate the actual data sizes, which are in a relationship of 801<802<803. This means that 801 is the highest in compression rate, and 803, the lowest in compression rate. These differences in compression rate make the free physical capacities of the SSDs 210, 220 and 230 uneven. Further, the free physical capacity of the SSD 230 is the smallest in size, and this means the highest risk of depletion. Accordingly the storage controller resolves this uneven state of the free physical capacities by capacity leveling.

More specifically, the SSD 230 with the smallest free physical capacity and the SSD 210 with the largest free physical capacity are selected as the SSDs between which data are to be shifted. Then the data 803, the largest in physical use quantity (namely the lowest in compression rate) in the SSD 230, and the data 801, the smallest in physical use quantity (namely the highest in compression rate) the SSD 210, are selected as objects of exchange, and the data are shifted (exchanged).

In specific terms, the data shifting means that the storage controller 100 reads the compressed data 801 out of the SSD 210 into a cache memory 103 and writes the read data into the SSD 230, and that the storage controller 100 reads the compressed data 803 out of the SSD 230 into the cache memory 103 and writes the read data into the SSD 210.

Strictly speaking, data transferred from an SSD to the storage controller are non-compressed data. For this reason, when reading the compressed data 801 out of the SSD 210 into a cache memory, the SSD 210 internally extends the compressed data 801, and transfers the data D1 in a non-compressed state to the storage controller. After that, the storage controller transfers the non-compressed data D1 to the SSD 230, the destination SSD. The SSD 230, having received the non-compressed data D1, after internally executing data compression to reconvert the data into the compressed data 801, stores the data in its own physical area. Similar actions are done when shifting the compressed data 803 from the SSD 230 to the SSD 210.

This processing of capacity leveling reduces the free physical capacity of the SSD 210, into which the compressed data 803 having a large physical use quantity are stored. On the other hand, the SSD 230, into which the compressed data 801 having a small physical use quantity are stored, is increased in free physical capacity. This eliminates the free physical capacity unevenness between the SSDs.

In this way, the host computer can recognize a virtual volume of a certain capacity, and issue a read/write request to the virtual volume. When capacity leveling is processed and the logical space capacity each SSD can provide has increased, the pool volume capacity is increased. This enables the host computer to continue its operation without recognizing any change in capacity.

Incidentally, when data shifting takes place between SSDs, the host computer 30 should alter the destination of access to data to the SSD having received the shifted data. However, address conversion using the virtual volume 600 enables the host computer 30 to access the shifted data at the new location without having to alter the destination of access. In other words, the association of the virtual extents 600 with the virtual address is altered by the storage controller 100 from the logical address of the entry 251, the origin of shift, to the logical address of the entry 253, the destination of shift. Therefore, the host computer 30 can process capacity leveling, by accessing the virtual volume 600, without having to alter the address of the access destination.

The use of the virtual volume for address conversion is only one example, but address conversion may be accomplished without using the virtual volume.

FIG. 10 shows an example of configuration of the cache memory 103 provided in the storage controller 100.

The cache memory 103 has a program area 12000, a table area 13000 and a data cache area 14000. The program area 12000 and the table area 13000 are areas in which programs for controlling the storage device 10 and various tables are stored. The data cache area 14000 is an area for use in temporary storage of user data.

The program area 12000 stores a write I/O program 12100, a read I/O program 12200, a capacity leveling program 12300 and an SSD information acquisition program 12400.

The write I/O program 12100 is a program for processing write requests from the host computer 30. The read I/O program 12200 is a program for processing read requests from the host computer 30. The capacity leveling program 12300 is a program for processing physical capacity leveling of SSDs. An SSD information acquisition program 12400 is a program for acquiring internal information of the SSDs 700.

The table area 13000 has a disk management table (hereinafter table will be abbreviated to TBL) 13100, an RG management TBL 13200, a pool management TBL 13300, an extent management TBL 13400, a virtual volume management TBL 13500 and an entry management TBL 13600.

The disk management TBL 13100 is a table for storing information regarding disks stored in the disk box 110. The RG management TBL 13200 is a table for storing information regarding RAID groups. The pool management TBL 13300 is a table for storing information regarding pool volumes. The extent management TBL 13400 is a table for storing information regarding extents. The virtual volume management TBL 13500 is a table for storing information regarding virtual volumes. The entry management TBL 13600 is a table for storing information regarding entries. Details of individual tables will be described afterwards.

In the data cache area 14000, user data 14100 complying with write requests and read requests from the host computer 30 are stored. The user data 14100 are data used by the host computer 30.

FIG. 11 shows an example of configuration of the disk management TBL 13100.

The disk management TBL 13100 has, for each disk, a disk #13101, a the disk type 13102, a the maximum logical capacity 13103, a usable logical capacity 13104, an in-use logical capacity 13105, a free logical capacity 13106, a maximum physical capacity 13107, an in-use physical capacity 13108, a free physical capacity 13109, a maximum compression rate 13110, an average compression rate 13111 and a compression mode 13112.

The disk #13101 is the identifier of the disk, which is a unique number. The disk type 13102 represents the type of the disk, such as SSD (SLC), SSD (MLC) or HDD. There are three different types of SSD here, including the single-level cell (SLC) type, the multi-level cell (MLC) type and the triple-level cell (TLC) type, according to the type of the NAND flash memory used. SLC is a high-speed, long-life and small-capacity flash memory, permitting block deletions in the order of several hundred thousand times to several ten thousand times. MLC, on the other hand, is a low-speed, short-life and large-capacity flash memory, permitting block deletions in the order of several ten thousand times to several thousand times. TLC is even lower in speed and shorter in life, but it is a large-capacity flash memory, permitting block deletions in the order of a few thousands to a few hundred times.

The maximum logical capacity 13103 is the upper limit of the logical capacity that can be made available by the pertinent SSD to external devices, and is equal to the maximum logical capacity 30001 shown in FIG. 1. The usable logical capacity 13104 is the logical capacity that can be made available to external devices, and is equal to the size of the usable logical space 30002 shown in FIG. 1. The in-use logical capacity 13105 is the logical capacity already used by any external device, and is equal to the size of the in-use logical space 30005 shown in FIG. 1. The free logical capacity 13106 is the logical capacity available to but not used by any external device, and is equal to the size of the free logical space 30004 shown in FIG. 1. The maximum physical capacity 13107 is the total of the capacities of physical memory media mounted on the SSD. The in-use physical capacity 13108 represents the stored volume of compressed data, and is equal to the size of the in-use physical space 30007 shown in FIG. 1. The free physical capacity 13109 is the capacity of physical spaces in which no data are stored, and is equal to the size of the free physical space 30006 shown in FIG. 1. The maximum compression rate 13110 is the maximum compression rate available from the pertinent SSD. The average compression rate 13111 is the average compression rate of the SSD, and is calculated by dividing the in-use physical capacity 13108 by the in-use logical capacity 13105. In this embodiment, the values of the maximum logical capacity 13103, the maximum physical capacity 13107 and the maximum compression rate 13110 are preset on a disk-by-disk basis. Information on other values is updated by the storage controller as will be described afterwards.

The compression mode 13112 indicates whether the compression mode of an SSD is a "synchronized" mode or a "non-synchronized" mode. The synchronized compression mode here is a mode in which compression is done after the SSD receives write data from the storage controller and before the data are stored into an FM and the data compression rate is also returned in response to the write request.

On the other hand, the non-synchronized compression mode is a mode in which compression is done when an SSD undergoes asynchronous processing, such as reclamation or refreshing. In the non-synchronized mode, write data from the storage controller are not compressed but stored as they are into an FM. In this mode, compression is done afterwards when asynchronous processing is executed at any desired timing.

The synchronized compression mode has an advantage that the storage controller can immediately acquire the result of data compression. Also, as the volume of data written into the FM is reduced, there is another advantage of life elongation. However, as processing for compression separately arises, the performance is adversely affected. On the other hand, though the non-synchronized compression mode involves a period in which data compression is ineffective, the impact on the performance can be suppressed because compression is done along with internal data shifting that accompanies reclamation and refreshing that inevitably occurs in the SSD.

To add, switching-over of the compression mode can be set in the SSD by the storage controller at any desired timing.

FIG. 12 shows an example of configuration of the RG management table 13200.

The RG management TBL 13200 has, for each RG, an RG #13201, a disk type 13202, a RAID Level 13203, an RG composition 13204, a disk #13205 and a compression mode 13206.

The RG #13201 is the identifier of the RG, which is a unique number. The disk type 13202 represents the type of the disks constituting the RG. The RG is configured of disks of the same type.

The RAID Level 13203 represents the RAID level of the RG, taking one of various values, such as RAID 1+0, 1, 3, 4, 5 and 6. The RG composition 13204 represents the number of data disks (disks storing data) making up the RAID and the number of parity disks (disks storing parities). The disk #13205 is the identifier of each of the disks making up the RAID.

The compression mode 13206 indicates the set state of the compressing function for each of the disks making up the RAID. If it is effective, "ON (synchronized)" and "ON (non-synchronized)" are stored, or if it is ineffective, "OFF" is stored.

FIG. 13 shows an example of configuration of the pool management TBL 13300.

The pool management TBL 13300 has a pool volume #13301 and an RG #13302 for each pool volume.

The pool volume #13301 is the identifier of the pool volume, which is a unique number. The RG #13302 shows the RG number of every one of the RGs making up the pool volume. Although one pool volume is shown as an example in FIG. 13, plural pool volumes may as well be managed in the storage device.

FIG. 14 shows an example of configuration of the entry management TBL 13600.

The entry management TBL 13600 has a disk #13601, an entry #13602, a size 13603, a Start-LBA 13604, a Length 13605, a status 13606, an allocation destination extent #13607 and a physically used quantity 13608 for each disk.

The disk #13601 is the identifier of the disk, which is a unique number in the storage device 10. The entry #13602 is the identifier of the entry prepared in disks, which is a unique identifier for each disk. The size 13603 represents the capacity of an entry in, for instance, Byte terms. The Start-LBA 13604 and the Length 13605 indicate "what address spaces, from what LBA till what LBA, are used to prepare the pertinent entry". To add, the entry #13602 is present in a number matching the maximum logical capacity of the SSD. Thus, in a case in which 12 MB entries are to be prepared in an SSD whose maximum logical capacity is 800 GB, 800 GB×1024÷12 MB=68266 entries are prepared in the SSD.

The status 13606 indicates the status in which the pertinent entry is, "allocated", "unallocated" or "unusable". In the "allocated" status, the pertinent entry is within the range of the in-use logical space 30005. In the "unallocated" status, the pertinent entry is within the range of the free logical space 30004. Incidentally in the first embodiment, when the storage controller is to use an entry, it gives priority to the entry whose entry #13602 is the smallest out of the entries whose status 13606 is "unallocated". Next, in the "unusable" status, the pertinent entry is within the range of the unusable logical space 30003.

An increase in usable logical space in the pertinent SSD means that "unusable" entries become "unallocated". Conversely, a decrease in usable logical space in the pertinent SSD means that "unallocated" entries become "unusable". This status management enables the storage controller to adapt to variations in logical capacity made available by the SSD. For instance, in the first embodiment, if the logical capacity made available by the SSD varies from 800 GB to 700 GB, the storage controller 100 alters the status of the entry matching an LBA space of 700 GB to 800 GB to "unusable". Or, if the logical capacity made available by the SSD is varied from 500 GB to 700 GB by the processing of capacity leveling, the storage controller 100 alters status of the entry matching an LBA space of 500 GB to 700 GB to "unallocated".

The allocation destination extent #13607 manages the destination of allocation of the pertinent entry. If the pertinent entry is allocated (the status 13606 is "allocated"), the extent # which uses that entry is stored. On the other hand, if the pertinent entry is unallocated (the status 13606 is "unallocated" or "unusable"), "N/A" indicating invalidity is stored.

The physically used quantity 13608 indicates, when data stored in the pertinent entry are compressed within an SSD, the size of the physical storage area in which the compressed data are stored, and the size is expressed in Byte terms. This value is updated on the basis of information acquired from the SSD. It may as well be expressed in percentage, such as compression rate, instead of size. To add, if pertinent entry is unallocated, "N/A" indicating invalidity is stored.

FIG. 15 shows an example of configuration of the extent management TBL 13400.

The extent management TBL 13400 has an RG #13401, an extent #13402, a size 13403, a status 13404, a stripe row #13405, a disk #13406 and an entry #13407 for each extent.

The RG #13401 is the identifier of the RG, which is a unique number. The extent #13402 is the identifier of the extent, which is a unique number. The size 13403 expresses the capacity of the extent in, for instance, in Byte terms. The status 13404 indicates whether the pertinent extent is "allocated" or "unallocated". The "allocated" status means that the pertinent extent is allocated to a virtual extent. On the other hand, the "unallocated" status means that the pertinent extent is allocated to no virtual extent.

The stripe row #13405, the disk #13406 and the entry #13407 are intended to identify the disk and the entry belonging to the stripe row of the pertinent extent.

FIG. 16 shows an example of configuration of the virtual volume management TBL 13500.

The virtual volume management TBL 13500 has a virtual volume #13501, a virtual capacity 13502, an allocated capacity 13503, a virtual extent #13504 and an allocated extent #13505 for each virtual volume.

The virtual volume #13501 is the identifier of the virtual volume, which is a unique number. The virtual capacity 13502 is the virtual capacity of the virtual volume. This virtual capacity is made available to the host computer 30. The allocated capacity 13503 is the total of the capacities of the extents actually allocated to the virtual volume. Incidentally, this value is not a physical quantity, but a logical quantity.

The virtual extent #13504 is the identifier of the virtual extents contained in the virtual volume. It is indicated that the virtual volume #0 contains virtual extents #0 through n. The allocated extent #13505 is the identifier (ID number) of the extents contained in the virtual volume. The storage controller 100 manages the status of extent allocation for each virtual extent. Thus, an extent #0 is allocated to the virtual extent #0, and an extent #100 is allocated to the virtual extent #1. It has to be noted, however, that the extent #13505 of a virtual extent to which no extent is allocated is "-". In other words, no extent that makes a physical storage area available is allocated to the virtual extent # n.

Figure 17:
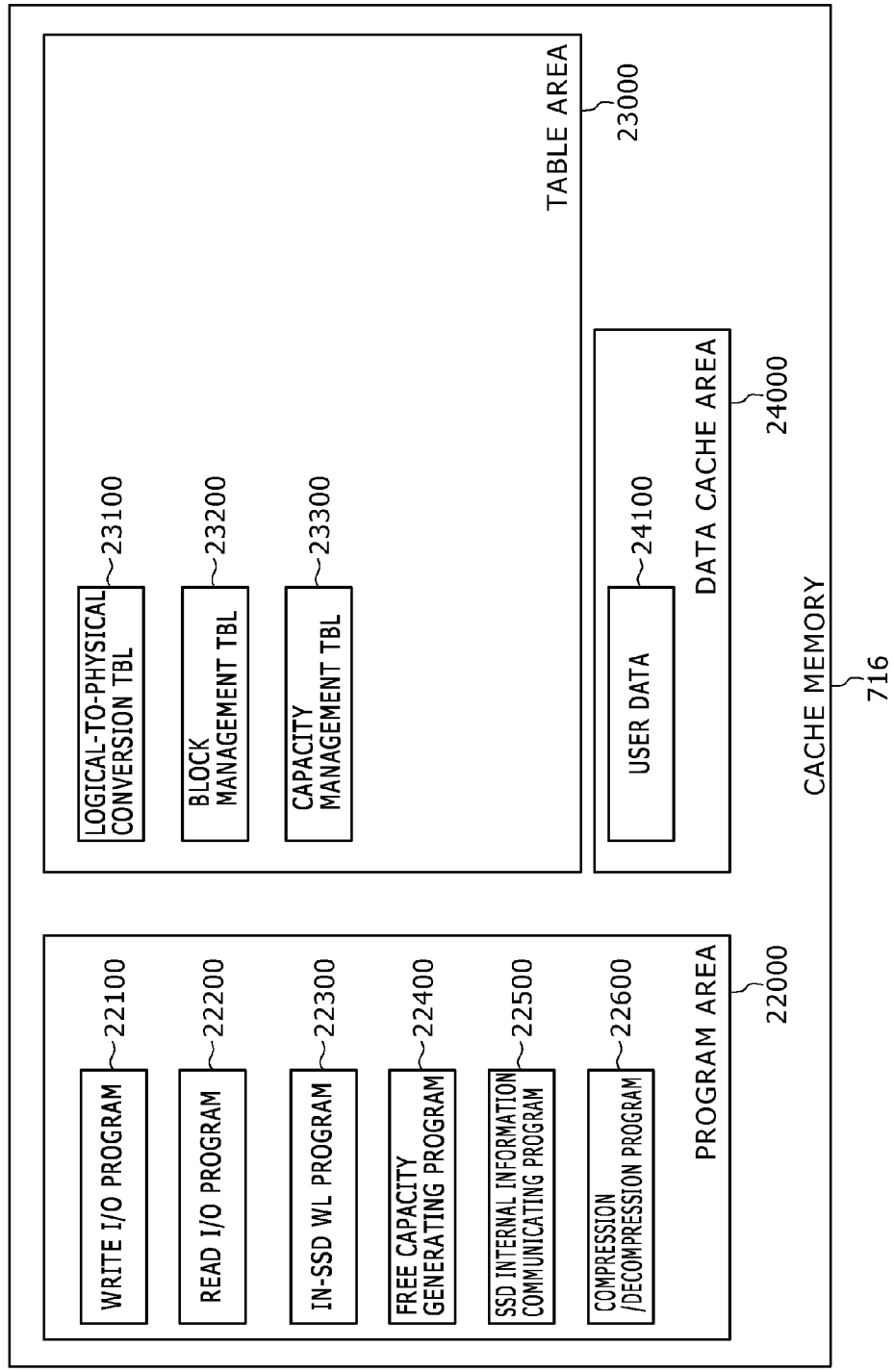
FIG. 17 shows an example of configuration of a cache memory provided in the SSD in the first embodiment.

FIG. 17 shows an example of configuration of the cache memory 716 in the SSDs 700.

The cache memory 716 has a program area 22000, a table area 23000 and a data cache area 24000.

The program area 22000 and the table area 23000 are areas in which programs for controlling the SSDs 700 and various tables are stored. The data cache area 24000 is an area used for temporarily storing user data.

The program area 22000 has a write I/O program 22100, a read I/O program 22200, an in-SSD WL program 22300, a free capacity generating program 22400, an SSD internal information communicating program 22500, and a compression/extension program 22600.

The write I/O program 22100 is a program for processing write requests from the storage controller 100. The read I/O program 22200 is a program for processing read requests from the storage controller 100. The in-SSD WL program 22300 is a program for executing WL within the SSD. The free capacity generating program 22400 is a program for processing reclamation, which is done to avoid depletion of free capacity in the SSDs 700.

The SSD internal information communicating program 22500 is a program for preparing internal information on SSDs in compliance with a request from the storage controller 100 and notifying the storage controller 100 of that SSD internal information. The compression/extension program 22600 is a program for achieving data compression and extension with software by using the processor 713.

The table area 23000 has a logical-to-physical conversion TBL 23100, a block management TBL 23200 and a capacity management TBL 23300.

The logical-to-physical conversion TBL 23100 is a table for management of matching between logical address spaces and physical address spaces of the SSDs 700. The block management TBL 23200 is a table for managing the statuses of physical blocks and pages. The capacity management table 23300 is a table for managing various capacities of the SSDs.

The data cache area 24000 has an area for storing user data 24100. The user data 24100 in this context mean data to be written into blocks and data to be read out of blocks.

FIG. 18 shows an example of configuration of the logical-to-physical conversion TBL 23100.

The logical-to-physical conversion table 23100 has an LBA 23101, a logical page #23102, a logical page size 23103, a status 23104, a block #23105, a page #23106, CW positions 23107, a physically used quantity 23108 and a notification needed-or-not flag 23109.

The LBA 23101 shows the start position of an LBA made available to the storage controller 100. Incidentally, as the I/O unit of flash memories within an SSD is page, the value of the LBA 23101 is managed in multiples of the page size. The SSD makes LBAs of consecutive numerical values available to external devices. The maximum value of the LBA is equal to the maximum logical capacity. The logical page #23102 is the serial number of logical pages. The logical page size 23103 is an expression of the logical page size in Byte terms.

The status 23104 is a field in which it is shown whether each logical page is "in-use", "unused" or "unusable". The "in-use" means that data are stored in the pertinent logical page, in other words an LBA space matching the logical page is allocated to an entry. On the other hand, the "unused" means that no data are stored in the pertinent logical page, in other words no LBA space matching the logical page is allocated to an entry. The "unusable" means that as a result of a decrease in usable logical capacity, the pertinent logical page belongs to the unusable logical space. Namely, the LBA matching the pertinent logical page is also recognized by the storage controller as being unusable.

The block #23105, the page #23106 and the CW positions 23107 indicate on the physical address space matching the logical page. In this embodiment, as the SSD has a data compressing function, there may arise a case in which data in a logical page are compressed and stored into a specific CW in the physical page. Therefore the CW positions 23107 are "1" for CWs in which data are stored and "0" in which no data are stored. Conversely, it is also possible for a logical address space containing two or more pages to be mapped to a single-page physical page.

The physically used quantity 23108 represents the data quantity in a case in which data matching the pertinent logical page are stored into a physical page. For instance, it is shown that in a logical page #0, data matching a logical page of 16 KB are compressed to 3 KB, and stored in a block #0 and CW #1 through 3 of the page #0.

The notification needed-or-not flag 23109 is a field that indicates, when the physical capacity has varied as a result of compression by non-synchronized processing, whether or not the result is made known to the storage controller. When it has to be made known, "ON" is stored or, when it is already made known or it need not be made known, "OFF" is stored. To add, where the field is "ON", it will become an object of communication by the processing of regular monitoring to be described afterwards.

Hereupon, block and page management within the SSD will be described. The unit of read and write used by the SSD is page. Further the FM is a write-once device that permits no overwriting on the same page, and has a characteristic that data should be written on a free page.

For this reason, when data need to be updated (overwritten) on a given page, the SSD manages the latest data as "valid" data and data made no longer the latest by updating as "invalid" data. As stated above, the SSD always requires a free page in which updated data are stored. This free page is generated by deleting a block. However, deletion of a block requires invalidation of all the pages in the block to be deleted. For this reason, when there is any valid page, copying to another block to invalidate that page arises within the SSD. This sequence of processing including copying valid data and block deletion to generate a free page is the processing of reclamation.

For the appending of updated data and reclamation described above, the SSD requires, in addition to a user data area for storing the latest data (user data), an area in which to append updated data (updating area). The user data area and the updating area may be physically distinguished from each other. Or, if a prescribed capacity is secured in each of the user data area and the updating area, no physical distinguishing is needed. In this embodiment, the physical space is supposed to be a space based on an area to store user data.

FIG. 19 shows an example of configuration of the block management table 23200.

The block management table 23200 has a block #23201, a page #23202, a page status 23203, a CW #23204, a CW status 23205 and a logical page #23206.

The block #23201 and the page #23202 are the identifiers of blocks and pages, respectively. The page status 23203 is a field indicating whether the pertinent page is "in-use (valid)", "in-use (invalid)" or "free".

Thus in the page status 23203, "in-use (valid)" means that valid data can be stored in the pertinent page, which can be an object of copying in reclamation, for instance, and "free" means that data have been deleted but the pertinent page is unused.

The CW #23204 and the CW status 23205 perform management as whether the pertinent CW is "valid", "invalid" or "free". Being "valid" means that valid data are stored in the pertinent CW. Being "invalid" means that no valid data are stored in the pertinent CW. Being "free" means that the pertinent CW is in an unused status.

The logical page #23206 indicates, when the status of the pertinent CW is "valid", what logical page the CW matches. When the status of the pertinent CW is "invalid", "N/a" is stored.

The page status 23203 of a page in which one or more CWs having a CW status 23205 are present is "in-use (valid)". On the other hand, the CW status 23205 of every page whose CW status 23205 is "in-use (invalid)" is "invalid". The CW status 23205 of every page whose page status 23203 is "free" is "free".

FIG. 20 shows an example of configuration of the capacity management table 23300.

The capacity management table 23330 has a maximum logical capacity 23301, a usable logical capacity 23302, an in-use logical capacity 23303, a free logical capacity 23304, a maximum physical capacity 23305, an in-use physical capacity 23306, a free physical capacity 23307, a maximum compression rate 23308 and an average compression rate 23309.

The maximum logical capacity 23301 is the upper limit of the logical capacity that the pertinent SSD can make available to external devices, and this value matches the maximum logical capacity 13103.

The usable logical capacity 23302 is a logical capacity that can be made available to external devices, and matches the usable logical capacity 13104. This value is equal to the total capacity of logical pages whose status 23104 is "in-use" or "unused".

The in-use logical capacity 23303 is a logical capacity used by an external device, and matches the in-use logical capacity 13105. This value is equal to the total capacity of logical pages whose status 23104 is "in-use".

The free logical capacity 23304 is a logical capacity used by no external device, and matches the free logical capacity 13106. This value is equal to the total capacity of logical pages whose status 23104 is "unused".

The maximum physical capacity 23306 is the total capacity of physical memory media mounted on the SSD, and matches the maximum physical capacity 13107. If the SSD has an updating area as a physical storage area, the maximum physical capacity 23306 shall be the capacity of the area used for storing user data except the updating area.

The in-use physical capacity 23306 represents the storage quantity of compressed data, and matches the in-use physical capacity 13108. This value is equal to the total capacity of CWs whose CW status 23205 is "valid". Or it may as well be the total capacity of pages whose page status 23203 is "in-use (valid)" or "in-use (invalid)".

The free physical capacity 23307 is the capacity of physical spaces in which no data are stored, and matches the free physical capacity 13109. This value is equal to the total capacity of CWs whose CW status 23205 is "free". Or it may as well be the total capacity of pages whose page status 23203 is "free".

The maximum compression rate 23308 is the upper limit of the compression rate that the pertinent SSD can make available, and matches the maximum compression rate 13110.

The average compression rate 23309 is the average of compression rates of data in the SSD, and matches the average compression rate 13111. This value is calculated by In-use physical capacity 23306÷In-use logical capacity 23303.

To add, management information and the like for the SSD's own use may be stored in the physical space in addition to data stored from external devices. The management information includes, for instance, the logical-to-physical conversion TBL 23100 and the block management TBL 23200.

Figure 21:
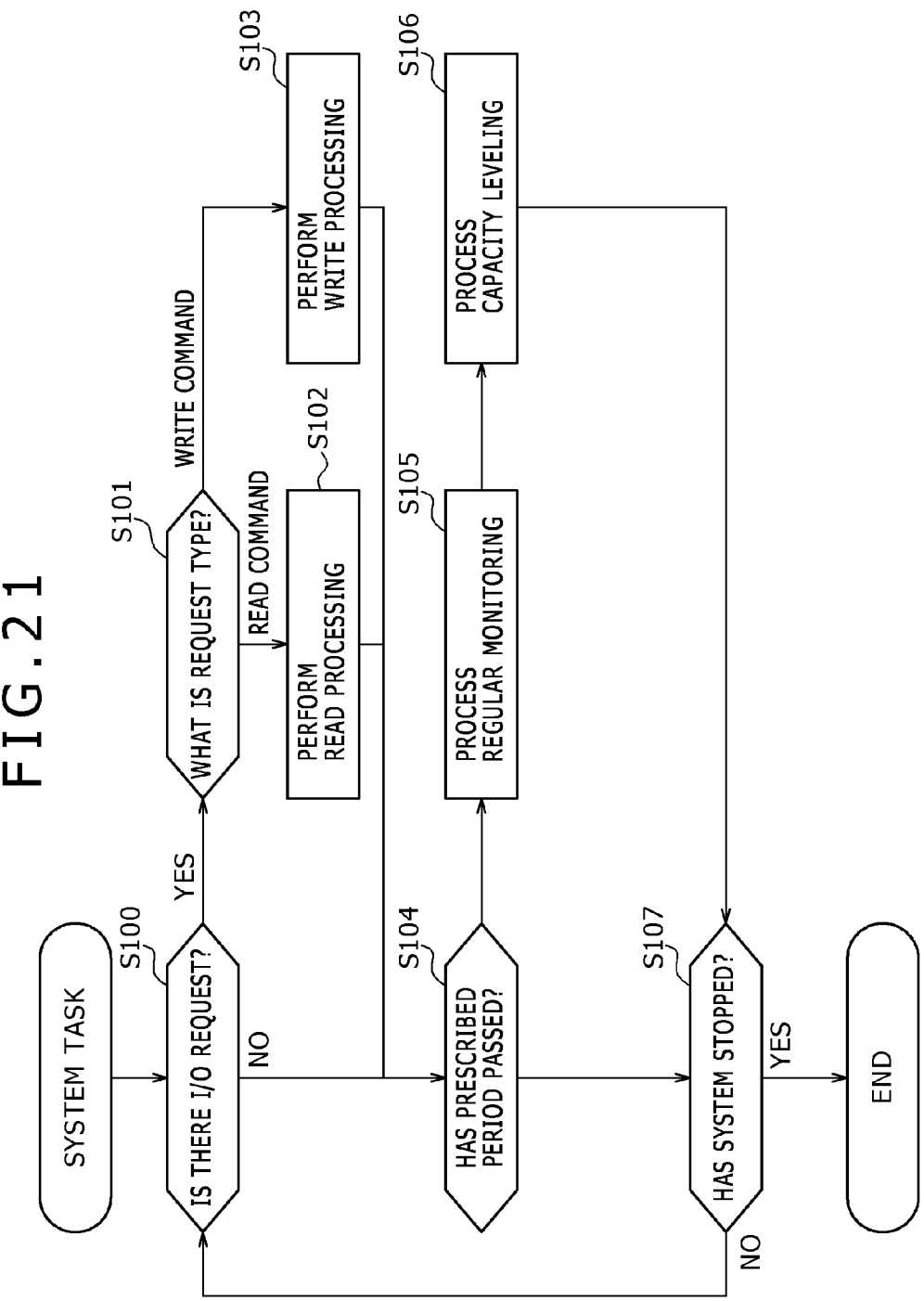
FIG. 21 is a sequence chart outlining the task of the storage controller in the first embodiment.

FIG. 21 is a sequence chart outlining the task of the storage controller 100. The storage controller 100 checks with the host I/Fs 101 whether or not there is any I/O transmitted from the host computer 30 (S100). If there is any I/O from the host computer 30 (S100: Yes), it is checked whether the processing requested is a read command or a write command (S101). If it is a read command (S101: Read command), data reading is processed (S102) (for details, see FIG. 25). The sequence then proceeds to S104. Or if the determination at S101 points to a write command (S101: Write command), the data write command is processed (S103) (for details, see FIG. 22), and the sequence then proceeds to S104.

To add, if the determination at S100 indicates no I/O request (S100: No), the sequence directly proceeds to determination at S104.

At S104, it is determined whether or not a prescribed period has passed. If the determination is affirmative (S104: Yes), regular monitoring to acquire information on the compression rate, capacity and so forth from the SSD is performed (S105) (for details, see FIG. 26). After that, capacity leveling to eliminate physical capacity unevenness between SSDs is processed (S106) (for details, see FIG. 27), and the sequence proceeds to S107. Or if the determination at S104 is negative (S104: No), the sequence directly proceeds to S107.

At S107, the storage controller 100 determines whether or not stopping of the system is instructed, and if the determination is affirmative (S107: Yes), the system is stopped. Or if the determination at S107 is negative (S107: No), the sequence returns to S100 where the presence or absence of any I/O request is checked.

Figure 22:
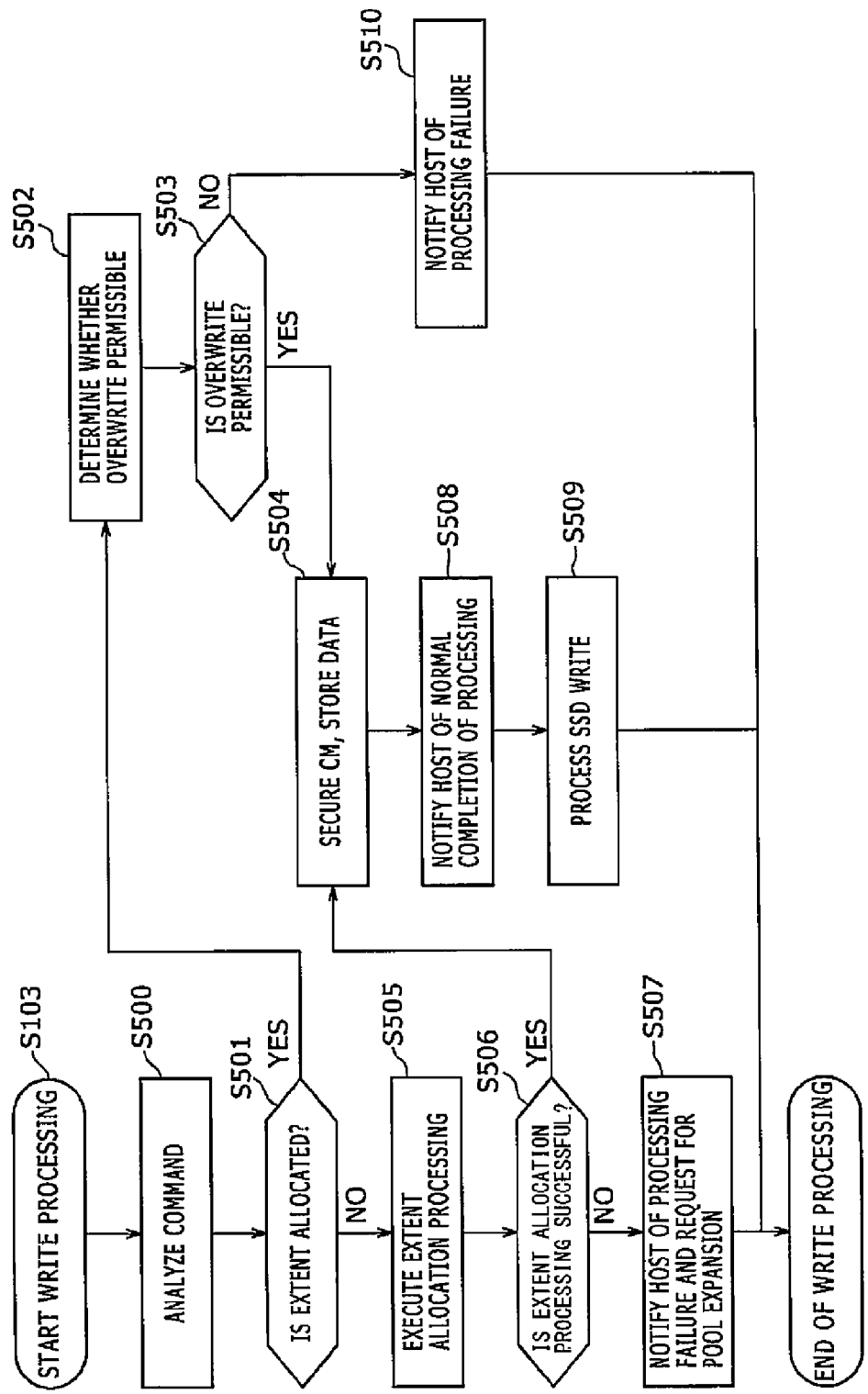
FIG. 22 is a sequence chart showing an example of data write processing by the storage controller in the first embodiment.

FIG. 22 is a sequence chart showing details of S103, which is data write processing by the storage controller 100.

The storage controller 100 analyzes the contents of a write command send from the host computer 30 (S500). Then, the storage controller determines, on the basis of address information contained in the command, whether or not any extent is allocated in the range in which the address of the virtual volume of the write destination by referencing, among others, information in the virtual volume management TBL 13500 and the extent management TBL 13400 (S501). If the determination at S501 is affirmative (S501: Yes), the storage controller determines that processing of overwrite updating of the allocated extent is requested, and checks whether or not overwrite is permissible (S502). At S502, the SSD into which the overwrite data are to be stored (hereinafter, the write destination SSD) is identified by referencing the extent management TBL among others, and it is checked whether or not there is a sufficient free space in the physical capacity of the write destination SSD by referencing the free physical capacity 13109 of the disk management table. More specifically, it is checked whether or not there is a larger free capacity than the size of the overwrite data in the write destination SSD, because, as SSDs in this embodiment have a compressing function and a lower level capacity virtualizing function, problems like what is stated below can occur. For instance, suppose that a data updating request is received in a status of free physical capacity depletion, and that the data to be updated are already compressed. If then the compression rate of the data to be updated worsens (takes on a data pattern not readily permitting compression), the physical capacity required for data storage after the updating will change (increase) from before the updating. The worst increment would mean complete impossibility of data compression, namely a case in which uncompressed data have to be written. Therefore, unless a minimum physical capacity to permit storage of uncompressed data can be secured in the write destination SSD, even a request for data updating (overwrite) cannot be accepted. Therefore, if the determination at S503 is negative, namely if no sufficient free physical capacity is available in the write destination SSD (S503: No), the storage controller notifies the host computer of the processing failure, and ends the processing sequence (S510).

Or if the determination at S503 is affirmative (S503: Yes), the storage controller determines that data overwriting is possible, temporarily stores the data sent from the host computer 30 into the data cache area 24000 of the cache memory 716 (S504), and notifies the host computer of the normal ending of the processing (S508). The storage controller 100 processes writing of data into the write destination SSD at any desired timing (S509) (for details, see FIG. 24) to end the processing sequence. Incidentally, reporting of the normal completion of processing to the host (S508) may as well follow the SSD write processing (S509).

Or if the determination at S501 is negative (S501: No), the storage controller determines that processing to write data into an area in which no extent is allocated to the virtual volume, and executes new extent allocation processing (S505) (for details, see FIG. 23). It is checked whether or not the extent allocation processing at S505 has been successful and, if successful, proceeds to data storage processing at S504. Or if the determination at S506 is negative (S506: No), the storage controller notifies the host computer of the processing failure, determines that the remaining capacity of the pool volume 500 is insufficient, and requests the user via control software installed in the host computer 30 for expansion of the pool volume (installation of an additional disk). After that, the processing sequence is ended.

Figure 23:
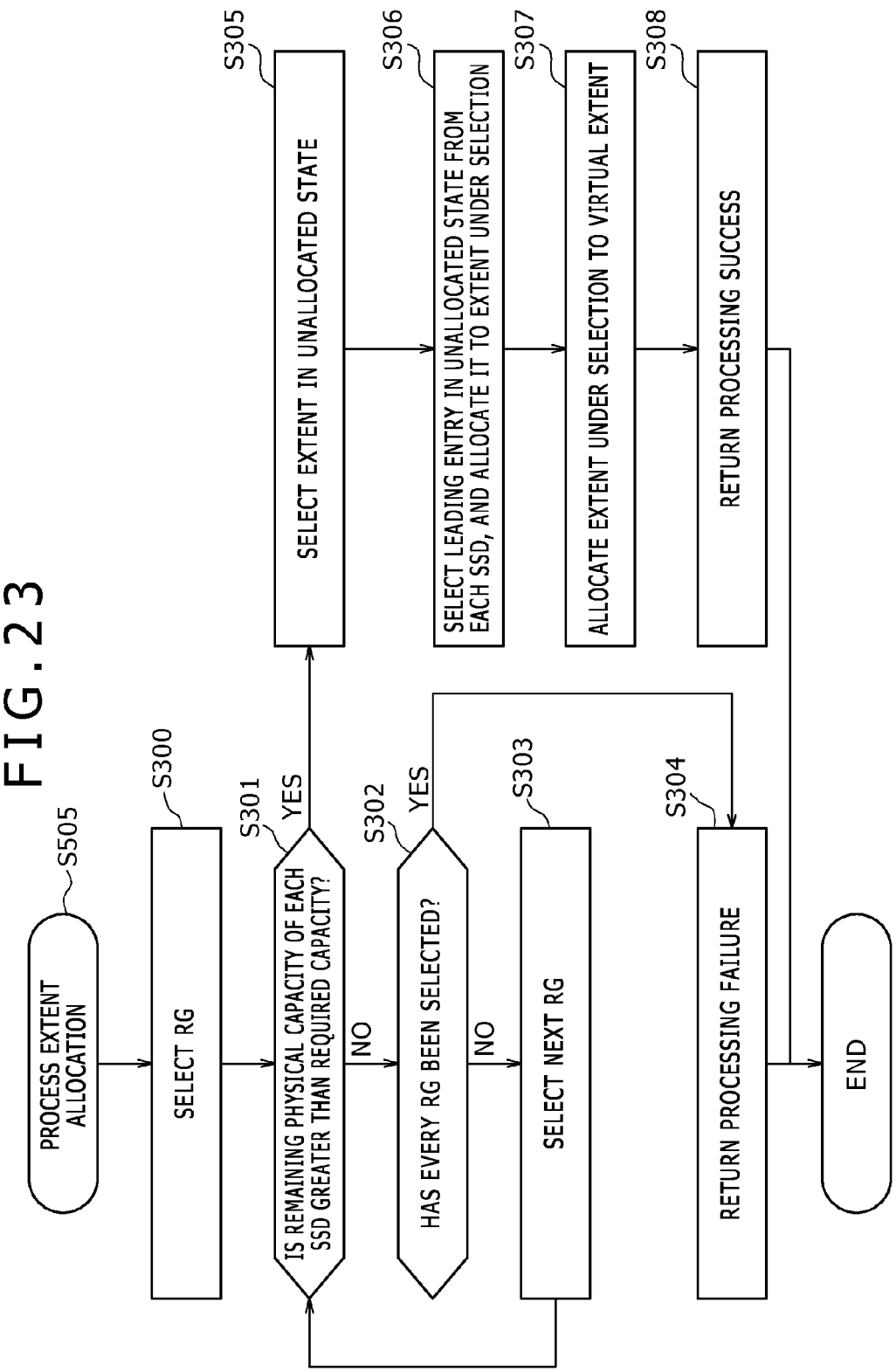
FIG. 23 is a sequence chart showing an example of extent allocation processing in the first embodiment.

FIG. 23 is a sequence chart showing details of the extent allocation processing S505.

The storage controller selects the RG to be worked on (S300). Next, it checks whether not the free physical capacity of each SSD is larger than the capacity needed for extent preparation (S301). If the result is affirmative (S301: Yes), the storage controller references the extent management TBL 13400, and selects extents in an unallocated status (S305). Next, the storage controller selects the leading entries in an unallocated status from the SSDs, and allocates them to the selected extents. More specifically, these entries are those having the smallest value of the entry #13602 among the entries whose status 13606 is "unallocated (usable)" in the entry management TBL 13600 (S306). Next, the storage controller allocates the selected extents to virtual extents (S307). After that, it returns a notice of successful processing (S308).

Or if the determination at S301 is negative (S301: No), it is checked whether or not all the RGs have been selected. If the checkup result is negative (S302: No), the next RG is selected (S303), followed by a return to S301. Or if the checkup result is affirmative (S302: Yes), a notice of processing failure is returned (S304).

Figure 24:
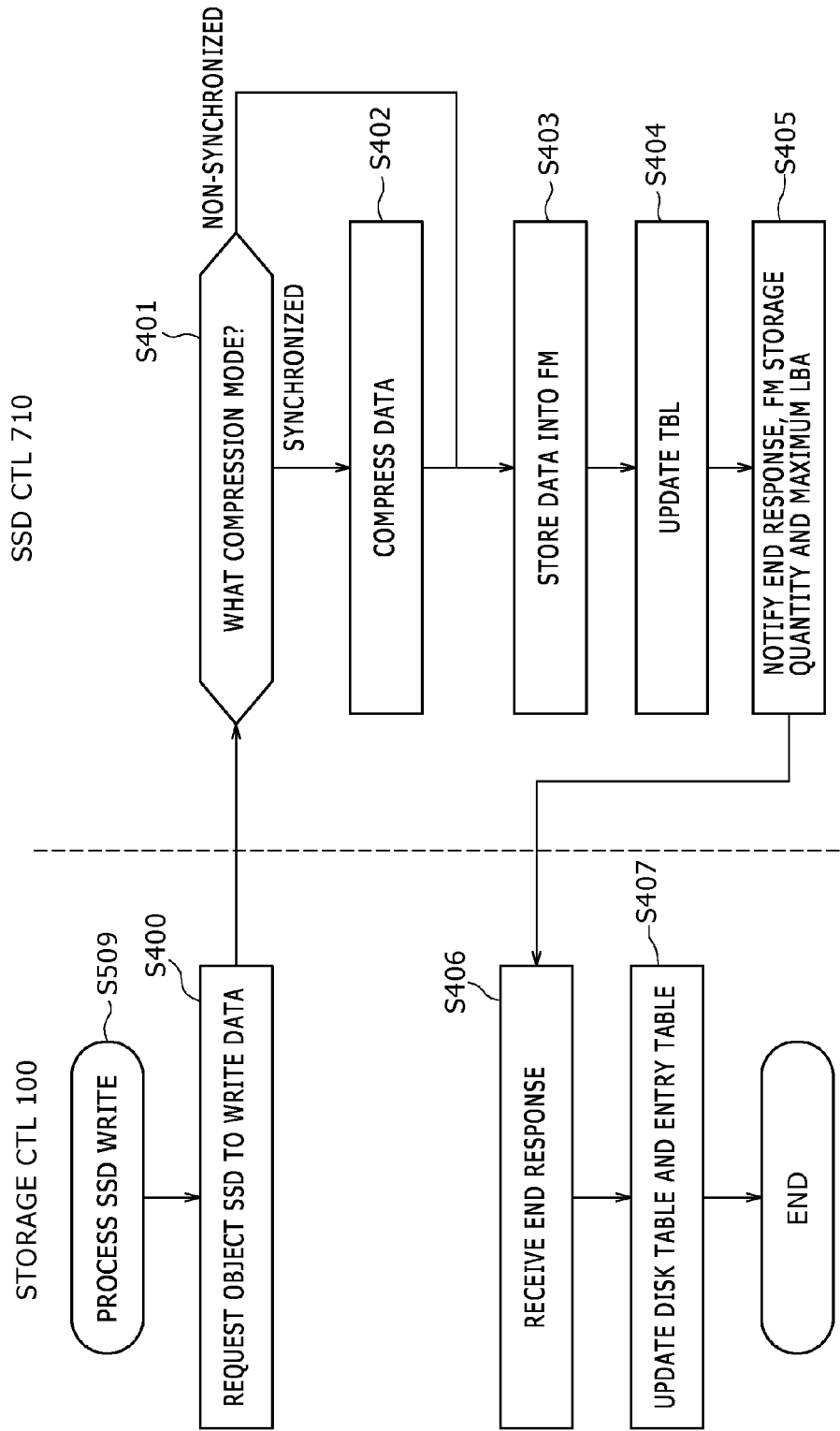
FIG. 24 is a sequence chart showing an example of SSD write processing in the first embodiment.

FIG. 24 is a sequence chart showing details of the SSD write processing S509.

The storage controller transmits a data write request command to the object SSD (S400). The SSD controller having received the write request command references the compression mode (S401), compresses the data if in the synchronized compression mode (S402), and stores the compressed data into an FM (S403). Or if the non-synchronized compression mode is identified at S401 (S401: non-synchronized), no data compression or the like is done, but the received data are stored as they are into the FM (S403). Incidentally, the compression mode of the SSD may be set in advance at the time the storage device actuates the SSD or, a field for notifying whether the compression mode is synchronized or non-synchronized may be provided in the write request command, and the mode may be designated for each write request command. The SSD controller, having stored the data into the FM updates various tables including the logical-to-physical conversion table into which the data have been stored, the block management TBL and the capacity management table (S404). After that, upon response to ending, the data quantity written into the FM (FM write quantity) is notified to the storage controller (S405). The FM write quantity may be notified by providing a field for the notifying purpose in part of a response command. Alternatively, another dedicated command may be prepared for the purpose and sent. The contents to be notified include the data quantity received as the write request command (write-requested quantity) and the data quantity actually written into the FM (FM write quantity). For instance in the synchronized compression mode, the FM write quantity ought to be equal to or smaller than the write-requested quantity. Or in the non-synchronized compression mode, the same values are returned as the FM write quantity and the write-requested quantity.

The storage controller receives the response from the SSD controller (S406), and later updates its own tables (S407). More specifically, it updates the entry management TBL 13600 and the disk management table 13100. In updating the entry management TBL 13600, the storage controller updates a physically used quantity 13808. In this way, the storage controller can manage the data size of each entry after compression. To add, when in the non-synchronized compression mode, the controller acquires information on the situation of compression by the processing of regular monitoring to be described afterwards.

Next in updating the disk management table 13100, the storage controller, on the basis of the FM write quantity notified by the SSD, updates various physical capacities including the in-use physical capacity 13108 (by adding the FM write quantity to the current value) and the free physical capacity 13109 (by subtracting the FM write quantity from the current value), updates the average compression rate 13111, and updates various logical capacities including the free logical capacity 13106 (Free physical capacity 13109÷Maximum compression rate 13110), the in-use logical capacity 13105 (by adding the write-requested quantity to the current value) and the usable logical capacity (In-use logical capacity 13105+Free logical capacity 13106). By this sequence of update processing, the storage controller can keep track of the latest values of the capacities of the SSD by estimation. It has to be noted, however, that the value of the disk management table 13100 is ultimately updated to the latest value acquired by the SSD by the processing of regular monitoring to be described afterwards.

Figure 25:
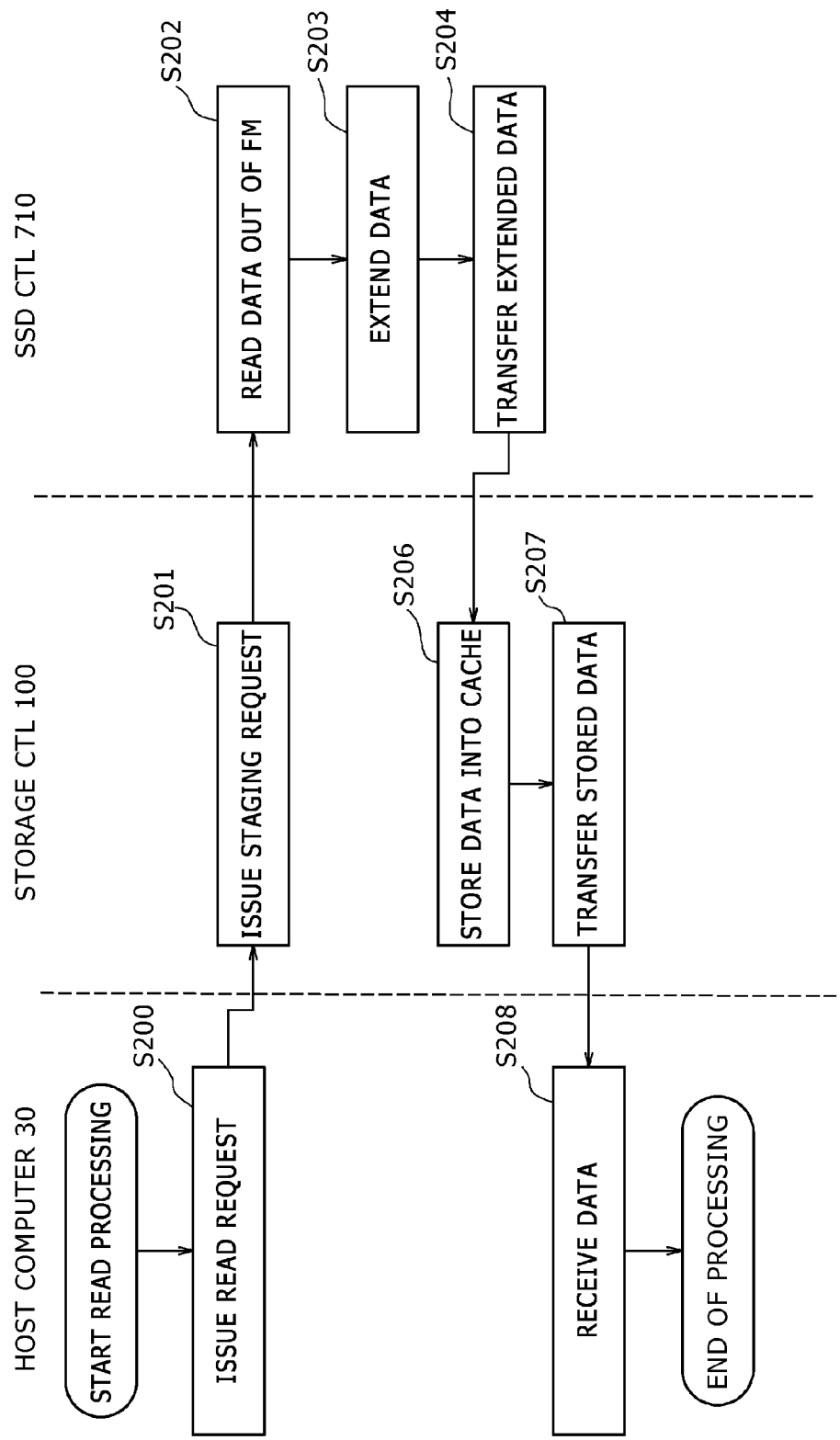
FIG. 25 is a sequence chart showing an example of read request processing in the first embodiment.

FIG. 25 is a sequence chart showing an example of the flow of processing from the time a read request is transmitted from the host computer 30 until processing is completed.

The host computer 30 transmits a data read request to the storage controller 100 (S200).

The storage controller 100 receives the data read request, identifies the SSD constituting the basis of the extent allocated to the read source range according to the read request (address range of the virtual volume), and transmits the data read request to the SSD controller 710 of the specified SSD (also known as staging request) (S201).

The SSD controller 710 receives the data read request, identifies the physical address range matching the logical address range according to the read request on the basis of the logical-to-physical conversion TBL 23100, and reads data out of that physical address range (one or more pages) (S202). Next, the controller extends the data (S203), and transmits the extended data to the storage controller 100 (S204).

The storage controller 100, in response to the read request transmitted at S201, receives data from the SSD controller 710, stores (stages) the received data into the cache memory (S206), and transmits the data stored at S206 to the host computer 30 (S207).

The host computer 30, in response to the read request transmitted at S200, receives data from the storage controller 100 to end the sequence of processing (S208).

Figure 26:
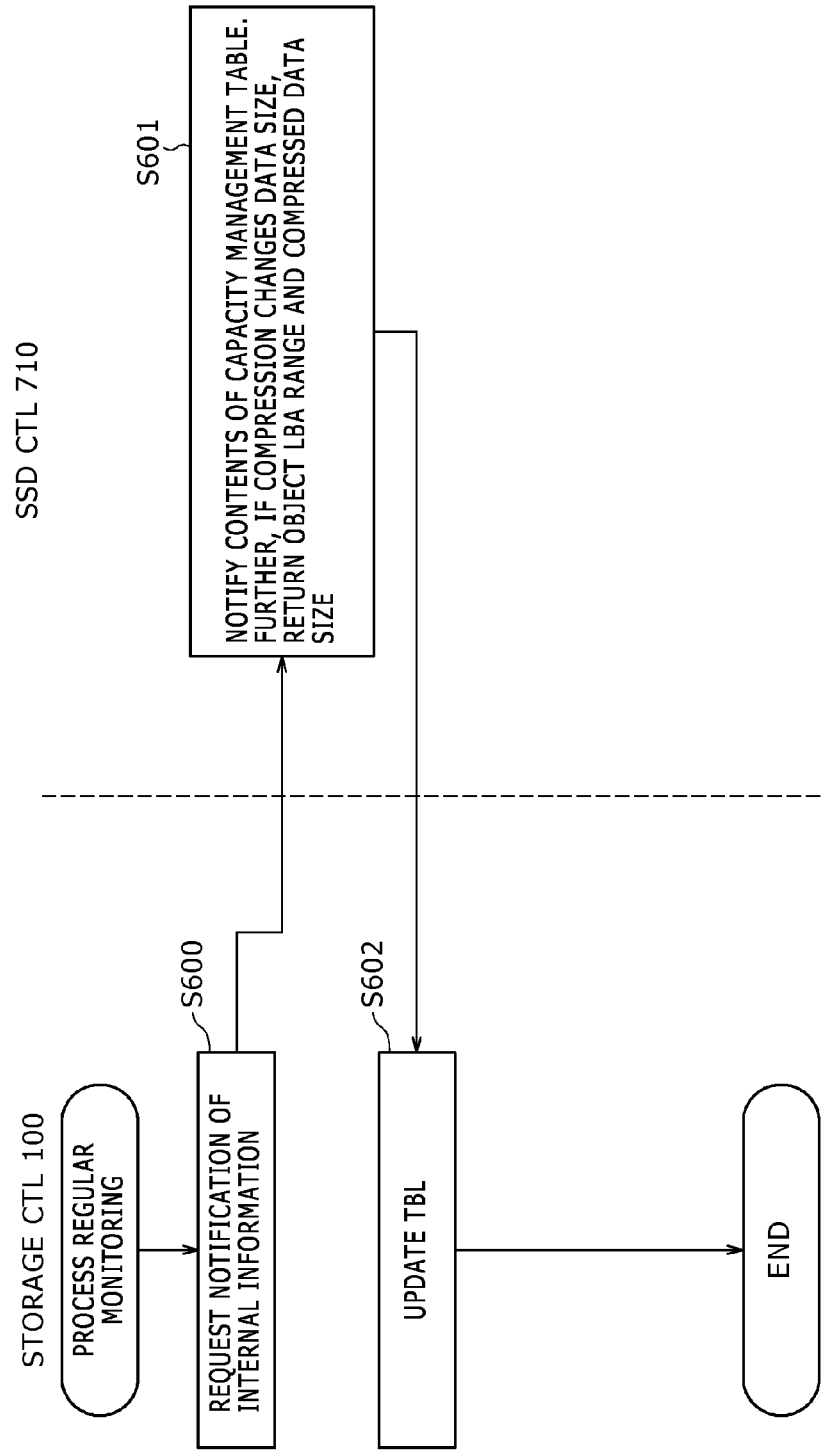
FIG. 26 is a sequence chart showing details of processing of regular monitoring in the first embodiment.

FIG. 26 is a sequence chart showing details of the processing of regular monitoring at S105.

The storage controller 100 requests the object SSD controller to notify internal information (S600). The internal information includes various items of information stored in the capacity management table 23330, such as the logically used quantity and the physically used quantity. The SSD controller having received the request returns various items of information in the capacity management table 23300 in response. Regarding what has changed in physical size as a result of compression in the non-synchronized compression mode, such as compression processing after the write response shown at S405, its LBA range and data size after compression may as well be returned. More specific examples include the LBA range and the physically used quantity 23108 of the logical-to-physical conversion table 23100 whose notification needed-or-not flag 23109 is ON.

Having received the response at S601, the storage controller updates various tables on the basis of the information thereby acquired (S602). More specifically, it updates the disk management table 13100 and the entry management TBL 13600 among others.

The storage controller 100, when it receives internal information, updates the physically used quantity of the entry management TBL 13600. As the physically used quantity is managed in the SSD for each LBA range (e.g. 16 KB) of the logical-to-physical conversion TBL 23100, internal information is notified for each of these LBA ranges. The storage controller updates the total of the LBA ranges (e.g. 12 MB) making up the entries as the physically used quantity 13608. Then, the storage controller 100 calculates for each disk the total of physically used quantities according to the entry management TBL 13600, and updates the in-use physical capacity 13108 of the disk management TBL 13100. It also calculates the free physical capacity 13109 from the difference between the maximum physical capacity 13107 and the in-use physical capacity 13108 of each disk. The free logical capacity 13106 is updated according to the quotient of division of the free physical capacity 13109 by the maximum compression rate 13110 that is calculated. The free logical capacity 13106 may as well be calculated from the total size of the entries "unallocated (usable)" in status in the entry management TBL 13600.

Also, the average compression rate 13111 is calculated from the ratio between the in-use logical capacity 13105 and the in-use physical capacity 13108, and pertinent parts in the table are updated. The in-use logical capacity 13105 is the total size of the entries whose status 13606 is "allocated" in the entry management TBL 13600. The in-use logical capacity 13105 is updated in response to, for instance, the allocation of entries to extents.

Figure 27:
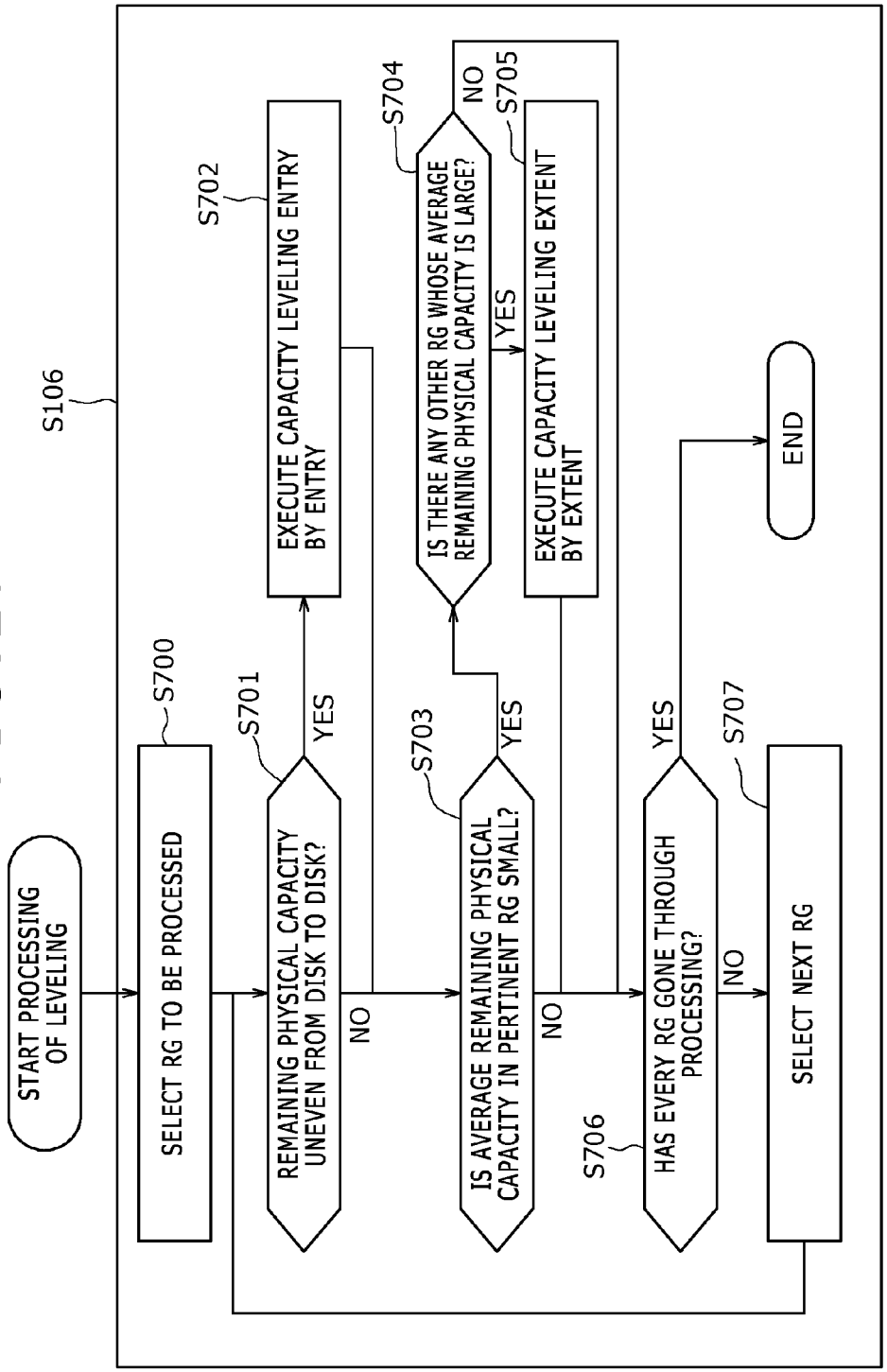
FIG. 27 is a sequence chart showing details of processing of capacity leveling at S106 in the first embodiment.

FIG. 27 is a sequence chart showing details of the processing of capacity leveling at S106.

The storage controller selects the RG to be processed (S700). It checks whether or not the residual physical capacity in the RG is uneven from disk to disk (S701). More specifically, with reference to the RG management table 13200 and the disk management table 13100, the unevenness means, for instance, (1) the maximum and the minimum of the free physical capacity 13109 of SSDs making up the pertinent RG surpasses a threshold, (2) the difference between the maximum of the free physical capacity 13109 in the pertinent RG and the average of the free physical capacities 13109 in the pertinent RG surpasses a threshold, or (3) the difference between the average of the free physical capacities 13109 in the pertinent RG and the minimum of the free physical capacity 13109 in the pertinent RG surpasses a threshold. Or the unevenness may mean (4) the free physical capacity 13109 of a specific disk is extremely small (or smaller than a threshold) or the like. Incidentally, the logical capacity may be used instead of the physical capacity as the criterion of unevenness. Furthermore, the thresholds and other numerical values used in the evaluation may be altered to any desired values by the administrator or the user of the storage device according to the purpose of use. The alteration can be accomplished by using control software installed in the host computer.

If the result of checkup at S701 is affirmative (S701: Yes), the storage controller determines that capacity leveling should be done because of the physically used quantities of disks in the pertinent RG are uneven, and processes capacity leveling on an entry-by-entry basis (S702) (for details, see FIG. 28 through FIG. 30). Then, the processing moves ahead to S703 to check whether or not the average of free physical capacities in the pertinent RG is small. More specifically, with reference to the RG management table 13200 and the disk management table 13100, it is determined whether or not the average of the free physical capacities 13109 in the pertinent RG is below a threshold (S703). Incidentally, at S703, the logical capacity may be used instead of the physical capacity as the criterion of unevenness.

If the result at S703 is affirmative (S703: Yes), the storage controller determines that the physical capacity of the pertinent RG may be depleted, and proceeds to S704 at which determination for the processing of inter-RG capacity leveling is done. At S704, it is checked whether or not there is another RG having a sufficient residual physical capacity. More specifically, the RG management table 13200 and the disk management table 13100 are referenced, and it is determined whether or not there is any free physical capacity 13109 whose average is above a determination threshold (S704). If the determination at S704 is affirmative (S704: Yes), inter-RG capacity leveling can be accomplished, and extent-by-extent capacity leveling is processed (S705) (for details, see FIGS. 30 and 31). The processing of extent-by-extent capacity leveling increases the physical capacity of the RG whose physical capacity may be depleted. This enables the stopping of I/O processing due to physical capacity depletion to be avoided. After that, it is checked whether or not every RG has gone through processing (S706), and if the result is negative (S706: No), the next object RG is selected (S707), followed by a return to checkup processing at S701.

Or if the result of checkup at S701 is negative (S701: No), the storage controller moves on to processing at S703.

Or if the result of checkup at S703 is negative (S703: No) or if the determination at S704 is negative (S704: No), the storage controller determines that inter-RG capacity leveling cannot be processed, and moves on to S706.

Or if the result of checkup at S706 is affirmative (S707: Yes), the processing is ended.

To add, the user or the administrator may change the thresholds for determination at S703 and S704 to any desired values according to the purpose of use. Further, the storage device may display the contents of the disk management table 13100 and the RG management TBL 13200 to the user or the administrator via control software installed in the host, and the user or the administrator may select the object of leveling according to the result revealed by this displaying.

When the SSD free logical capacity has increased, the "unusable" of the status 13606 of the entry management TBL 13600 is altered to "unallocated (usable)". This management enables the storage controller 100 to expand the logical space usable as a storage device.

Figure 28:
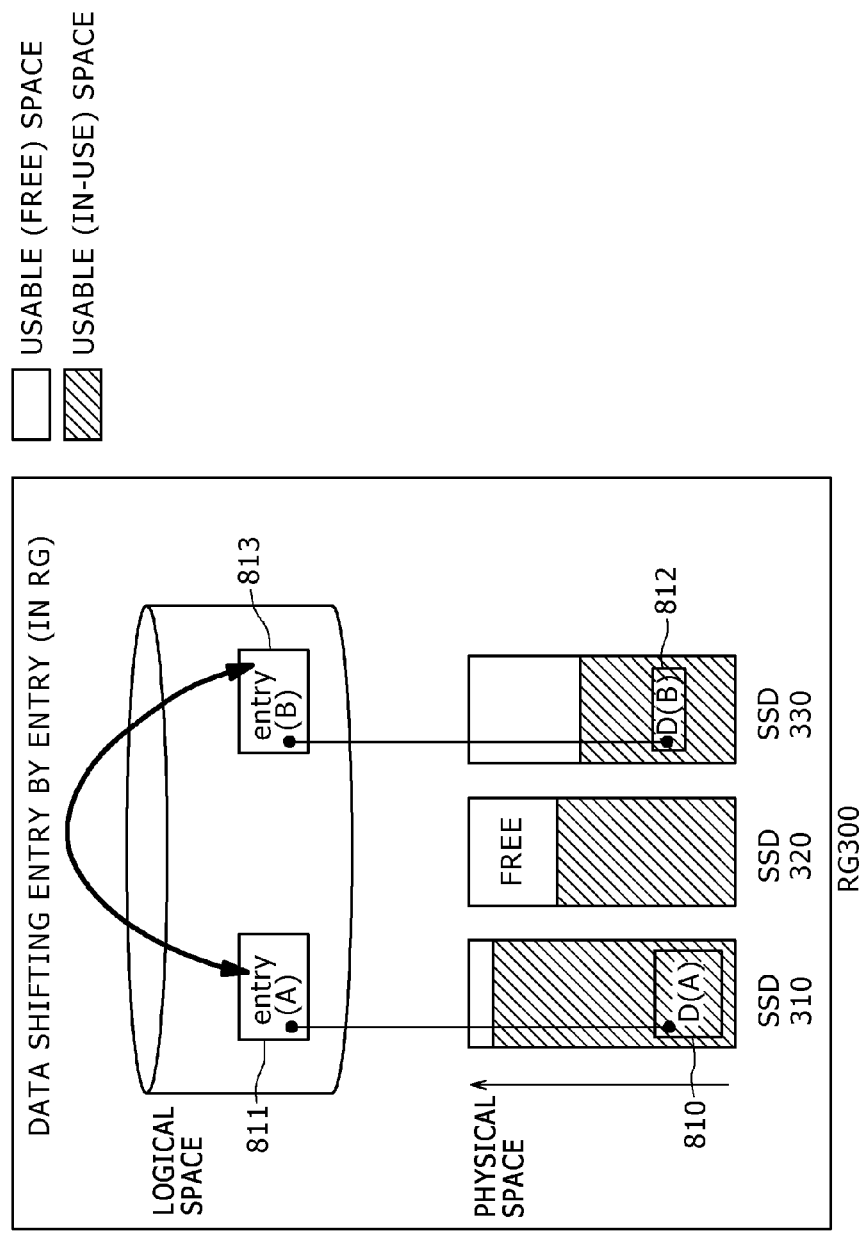
FIG. 28 shows an outline of in-RG data shifting, which is one example of entry-by-entry processing of capacity leveling, in the first embodiment.

FIG. 28 shows an outline of in-RG data shifting, which is one example of entry-by-entry processing of capacity leveling. The diagonal line-shaded parts of the physical space as shown in FIG. 28 are areas in which data are already stored, and blank parts, free areas.

An SSD 310, an SSD 320 and an SSD 330 make up the RG 300. Now, the free physical capacity of the SSD 310 is extremely smaller than those of the other SSDs. Thus, the free physical capacities in the RG are uneven. Along with that, though not shown, the free logical capacities are also uneven.

Now, an entry (A) 811 is prepared in a logical space made available by the SSD 310, and D(A), its data, are stored in the SSD 310 as compressed data 810. Also, an entry (B) 813 is prepared in a logical space made available by the SSD 330, and D(B), its data, are stored in the SSD 330 as compressed data 812. Incidentally, the entry (A) 811 and the entry (B) 813 are equal in size, but the compressed data 810 are larger in size than the compressed data 812.

Thus, in the SSD 310 whose free physical capacity is smaller, the compressed data 810 having a larger physically used quantity are stored, while the compressed data 812 smaller in physically used quantity are stored in the SSD 330 having a larger free physical capacity.

Therefore, the storage controller exchanges the compressed data 810 with the compressed data 812 between the SSD 310 and the SSD 330. The resultant storage of the compressed data 812 smaller in physically used quantity into the SSD 310 smaller in free physical capacity expands the free physical capacity of the SSD 310. On the other hand, the storage of the compressed data 810 larger in physically used quantity into the SSD 330 larger in free physical capacity compresses the free physical capacity of the SSD 330. The processing so far described achieves free physical capacity leveling between the SSDs.

Figure 29:
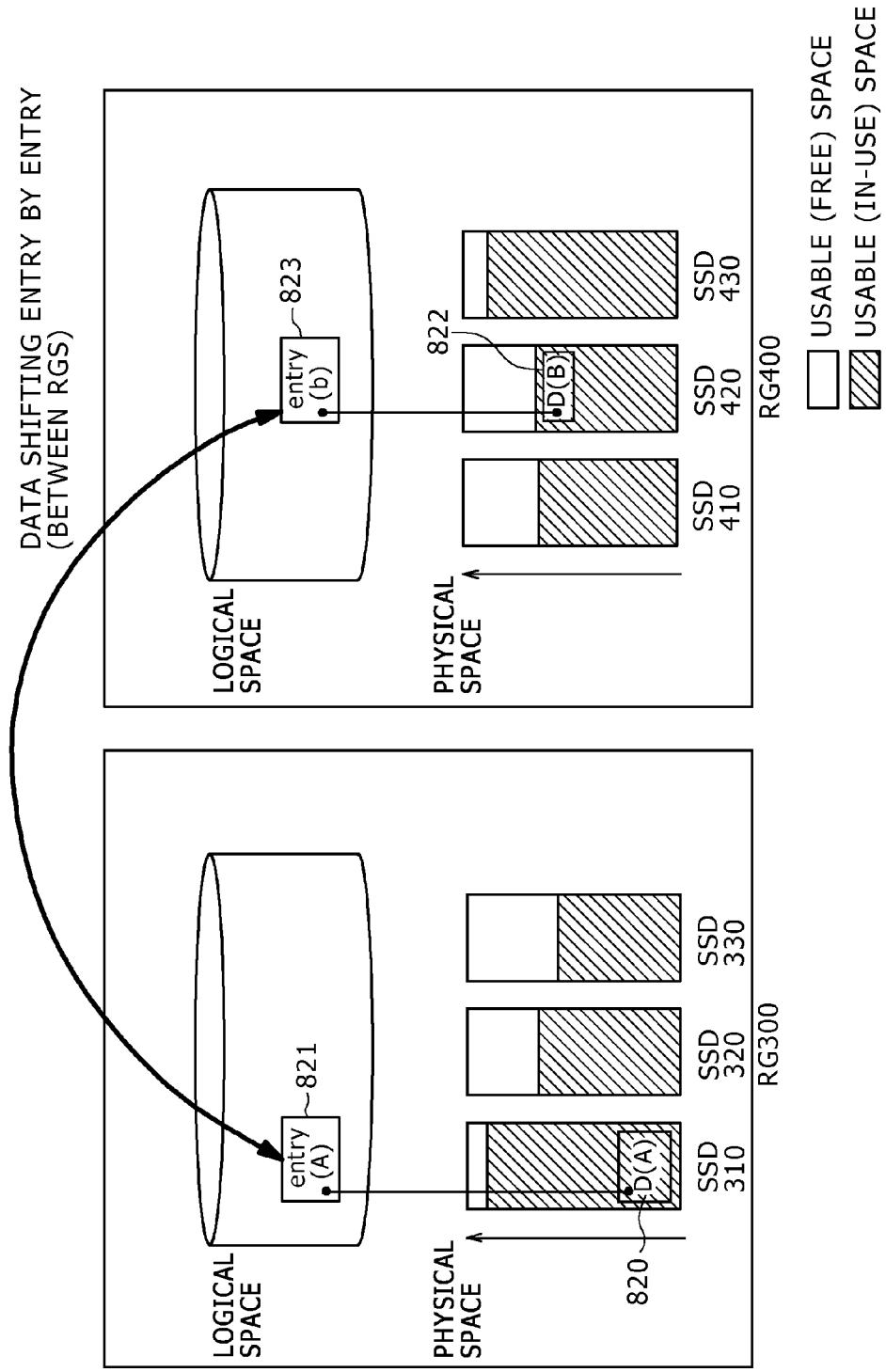
FIG. 29 shows an outline of inter-RG data shifting, which is another example of entry-by-entry processing of capacity leveling, in the first embodiment.

FIG. 29 shows an outline of inter-RG data shifting, which is another example of entry-by-entry processing of capacity leveling.

The SSD 310, the SSD 320 and the SSD 330 make up the RG 300. Now, the free physical capacity of the SSD 310 is extremely smaller than those of the other SSDs. Namely, free physical capacities are uneven in the pertinent RG. Along with that, though not shown, the free logical capacities are also uneven.

On the other hand, an SSD 410, an SSD 420 and an SSD 430 make up an RG 400.

Now, an entry (A) 821 is prepared in a logical space made available by the SSD 310, and D(A), its data, are stored in the SSD 310 as compressed data 820. Also, an entry (B) 823 is prepared in a logical space made available by the SSD 420, and D(B), its data, are stored in the SSD 420 as compressed data 822. Incidentally, the entry (A) 821 and the entry (B) 823 are equal in size, but the compressed data 820 are larger in size than the compressed data 822.

Thus, in the SSD 310 whose free physical capacity is smaller, the compressed data 820 having a larger physically used quantity are stored, while the compressed data 822 smaller in physically used quantity are stored in the SSD 420 having a larger free physical capacity.

Therefore, the storage controller exchanges the compressed data 820 with the compressed data 822 between the SSD 310 and the SSD 420. The resultant storage of the compressed data 822 smaller in physically used quantity into the SSD 420 smaller in free physical capacity expands the free physical capacity of the SSD 310. On the other hand, the storage of the compressed data 820 larger in physically used quantity into the SSD 330 larger in free physical capacity compresses the free physical capacity of the SSD 420.

The processing so far described achieves free physical capacity leveling between the SSDs of the RG 300.

Figure 30:
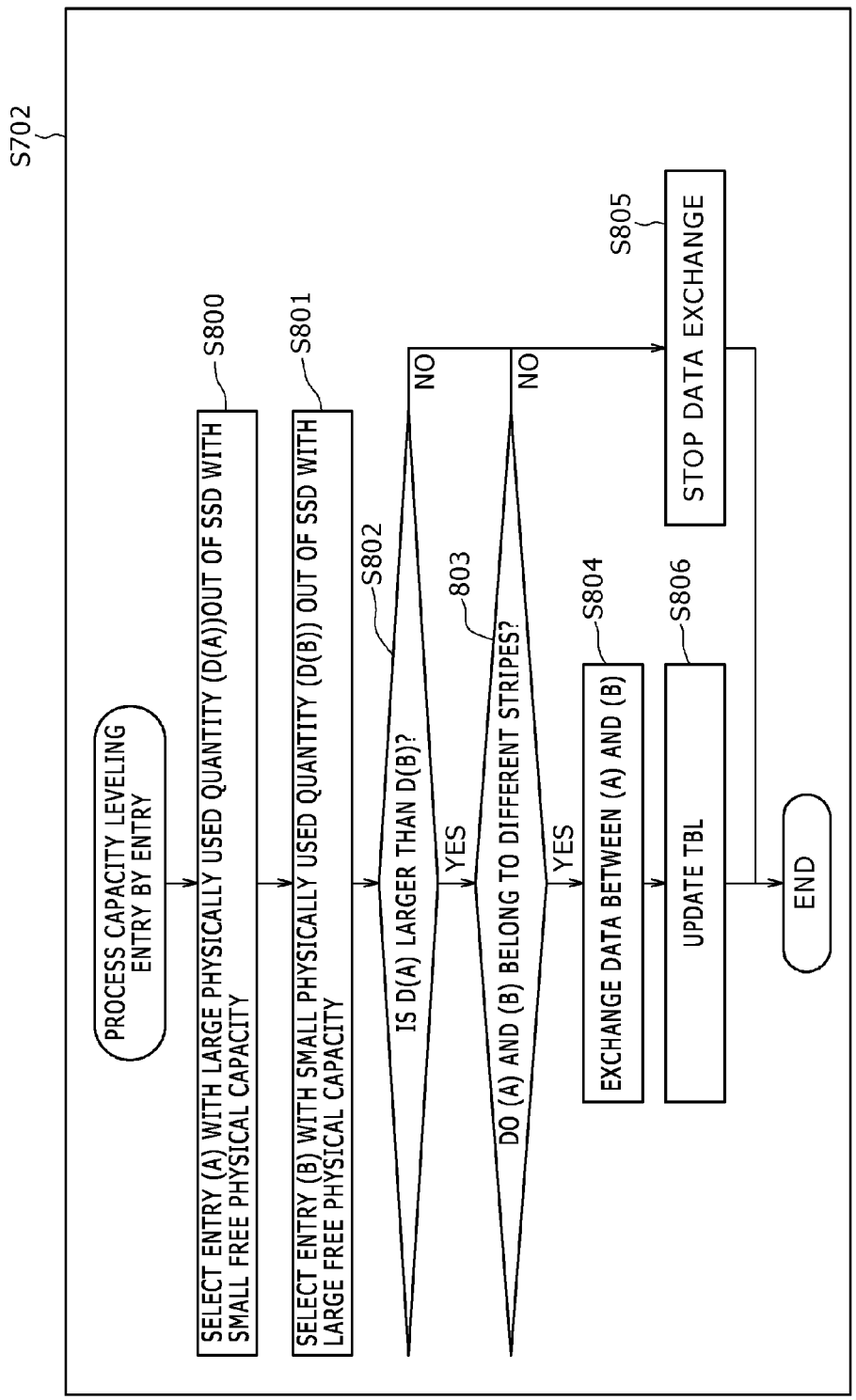
FIG. 30 is a sequence chart showing another example of entry-by-entry processing of capacity leveling in the first embodiment.

FIG. 30 is a sequence chart showing another example of entry-by-entry processing of capacity leveling at S702. In the entry-by-entry processing of capacity leveling, the data are shifted entry by entry.

The storage controller selects an SSD having a smaller free physical capacity. The SSD having a smaller free physical capacity is the SSD whose free physical capacity 13109, for instance, has the smallest value in the pertinent RG. Next, the entry management TBL 13600 is referenced, and an entry (A) whose physically used quantity 13608 is selected out of the pertinent SSD (S800). At S800, an SSD whose in-use physical capacity 13108 is larger may as well be selected.

Next, the storage controller selects an SSD having a larger free physical capacity, and selects out of that SSD an entry (B) having a smaller physically used quantity (S801). At S801, an SSD having a smaller in-use physical capacity 13109 may as well be selected.

D(A) and D(B), which respectively are the physically used quantities of the entry (A) and the entry (B) are compared to check whether or not D(A) is larger than D(B) (S802). If the result is affirmative (S802: Yes), the storage controller determines whether or not the entry (A) and the entry (B) belong to different stripes on the basis of the extent management TBL 13400 (S803). If the result is affirmative (S803: Yes), the controller exchanges data between the entry (A) and the entry (B) (S804) and updates various tables in connection with the exchange (S806) to end the sequence of processing. The updating of tables includes updating of entry allocation to extents in the extent management TBL 13400, and updating of the status 13606, the physically used quantity 13608 and so forth in each entry in the entry management TBL 13600. When the SSD free logical capacity has increased, the "unusable" of the status 13606 of the entry management TBL 13600 is altered to "unallocated (usable)". This management enables the storage controller 100 to expand the logical space usable as a storage device.

By this processing of capacity leveling, free physical capacities of SSDs in the pertinent RG are leveled. As, along with that, the free logical capacities of the SSDs in the RG are also leveled, eventually the capacity permitting extent preparation in the RG is expanded. Incidentally, in the processing of leveling, there is no need to strictly equalize free physical capacities among the SSDs in the RG, but it is sufficient to reduce free physical capacity differences among the SSDs. A reduction in free physical capacity differences serves to reduce free logical capacity differences, enabling the number of extents that can be prepared to be increased.

Or if the result of determination at S802 is negative (S802: No), the storage controller suspends the data exchange (S805), because a continued data exchange would be unable to expand the free physical capacities of SSDS with smaller free physical capacities.

Or if the result of determination at S803 is negative (S803: No), the storage controller determines that data shifting would reduce the redundancy of the RAID and suspends the data exchange.

Incidentally, reducing the free logical capacity differences among the SSDs of the RG does not always require S802 and S803. Further, even if the TBL is not updated at S806, a reduction of the free logical capacity differences among the SSDs of the RG can still be accomplished.

Figure 31:
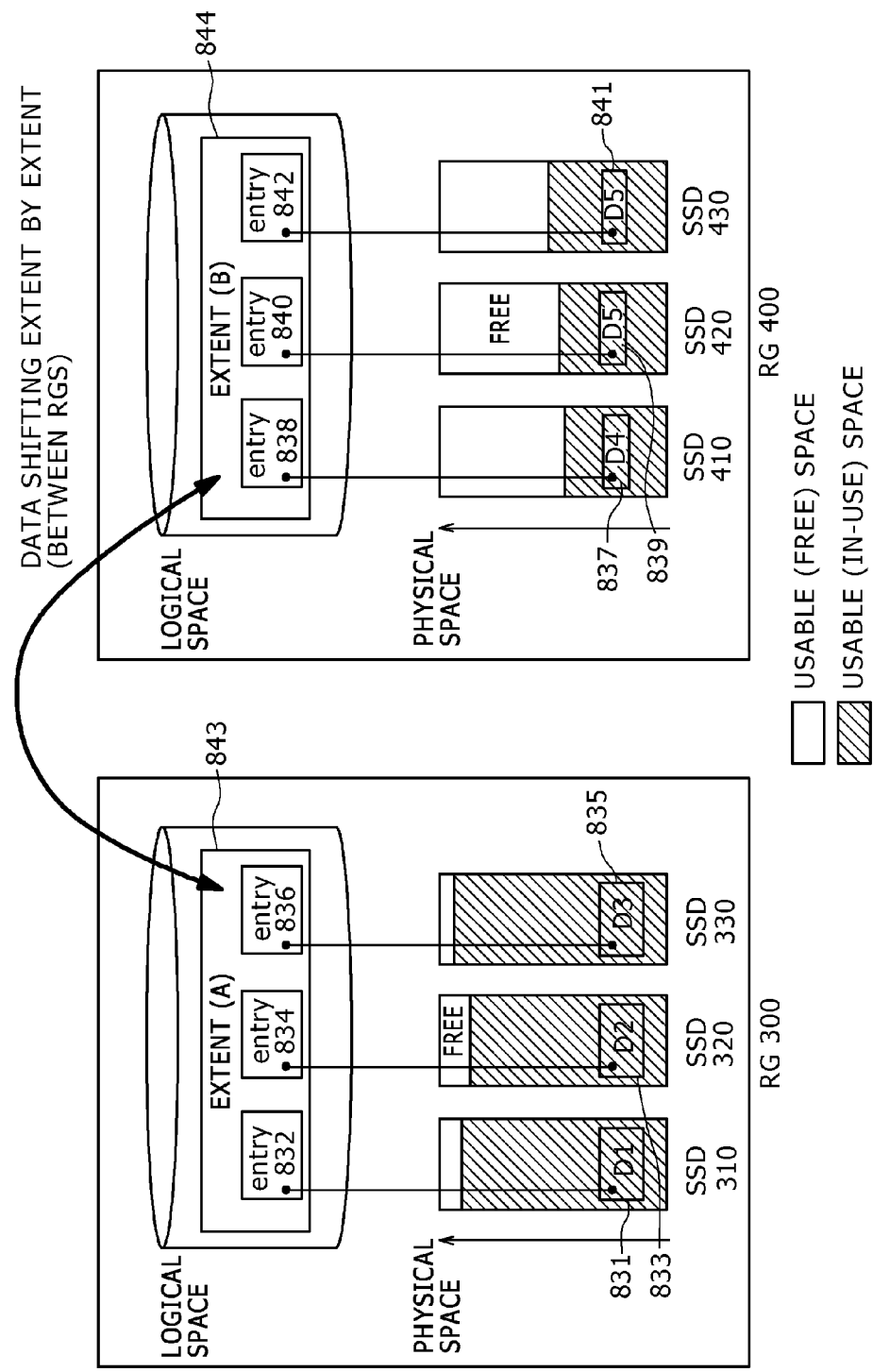
FIG. 31 shows an outline of inter-RG data shifting, which is one example of extent-by-extent processing of capacity leveling, in the first embodiment.

FIG. 31 shows an outline of inter-RG data shifting, which is one example of extent-by-extent processing of capacity leveling.

The SSD 310, the SSD 320 and the SSD 330 make up the RG 300. Further, the free physical capacities of the SSD 310, the SSD 320 and the SSD 330 are so small as to involve the risk of depletion.

On the other hand, the SSD 410, the SSD 420 and the SSD 430 make up the RG 400. Further, the free physical capacities of the SSD 410, the SSD 420 and the SSD 430 are sufficiently large.

Namely, there are in the system the RG 300 whose physical capacities involve the risk of depletion and the RG 400 whose physical capacities are sufficiently large.

Now, an extent (A) 843 is architected in the RG 300. Further, the extent (A) 843 is built up of an entry 832 prepared in a logical space made available by the SSD 310, an entry 834 prepared in a logical space made available by the SSD 320, and an entry 835 prepared in a logical space made available by the SSD 330. Further, compressed data 831 matching the entry 832 are stored in the SSD 310, compressed data 833 matching the entry 834, in the SSD 320, and compressed data 835 matching the entry 836, in the SSD 330.

On the other hand, an extent (B) 844 is architected in the RG 400. Further, the extent (B) 844 is built up of an entry 838 prepared in a logical space made available by the SSD 410, an entry 840 prepared in a logical space made available by the SSD 420, and an entry 842 prepared in a logical space made available by the SSD 430. Further, compressed data 837 matching the entry 838 is stored in the SSD 410, compressed data 839 matching the entry 840, in the SSD 420, and compressed data 841 matching the entry 842, in the SSD 430.

Further, the compressed data 831, the compressed data 833 and the compressed data 835 are larger in size than the compressed data 837, the compressed data 839 and the compressed data 841. Namely, the extent (A) 843 having a larger physically used quantity is stored in the RG 300 with a smaller free capacity, and the extent (B) 844 having a smaller physically used quantity is stored in the RG 400 with a larger free capacity.

Therefore, the storage controller exchanges data of the extent (A) and the extent (B) between the RG 300 and the RG 400. As a result, the compressed data 837 are stored into the SSD 310, the compressed data 839 into the SSD 320, and the compressed data 841 into the SSD 330. On the other hand, the compressed data 831 are stored into the SSD 410, the compressed data 833, into the SSD 420, and the compressed data 835, into the SSD 430. As the compressed data smaller in physically used quantity than now are stored into the SSDs of the RG 300 with smaller free physical capacities in this way, the free physical capacities of all the SSDs making up the RG 300 can be expanded.

As this enables the stopping of I/O processing due to physical capacity depletion in the RAID group to be avoided, the storage device can continue to operate stably.

Figure 32:
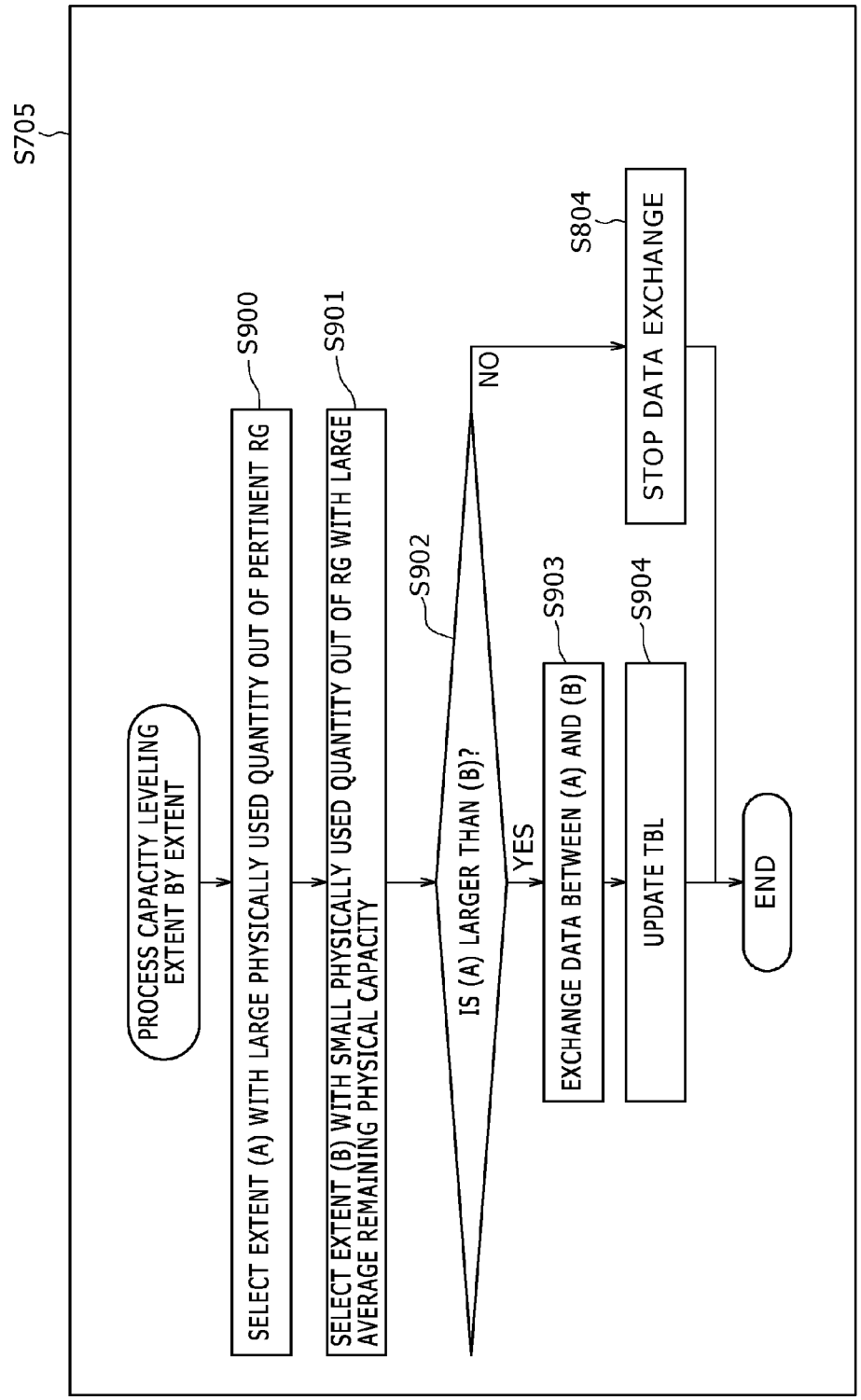
FIG. 32 is a sequence chart showing another example of extent-by-extent processing of capacity leveling in the first embodiment.

FIG. 32 is a sequence chart showing details of extent-by-extent processing of capacity leveling at S705. In the extent-by-extent processing of capacity leveling, data are shifted on an extent-by-extent basis.

The storage controller selects the extent (A) larger in physically used quantity in the pertinent RG (S900). Next, the controller selects, out of RGs larger in average residual physical capacity, the extent (B) smaller in physically used quantity (S901).

Next, it is determined whether or not the physically used quantity of data stored in the selected extent (A) is larger than the physically used quantity of the data stored in the extent (B) (S902). If the result is affirmative (S902: Yes), data are exchanged (S903), followed by updating of various tables (S903), and the sequence of processing is ended.

This processing of capacity leveling results in free physical capacity expansion of all the SSDs in the pertinent RG. As the free logical capacities of the SSDs also expand along with that, the capacity that can prepare extents in the RG expands eventually.

Or if the determination at S802 is negative (S802: No), the storage controller suspends the data exchange (S805).

Or if the determination at S902 is negative (S902: No), the data exchange is suspended (S904).

Thus in the extent-by-extent processing of capacity leveling at S705 as charted in FIG. 27, it was presupposed that the free physical capacities of the SSDs in the pertinent RG were already leveled in order to execute in advance S702, which is entry-by-entry processing of capacity leveling. It has to be noted, however, that in the sequence charted in FIG. 27, the relative order of executing S704, which is extent-by-extent processing of capacity leveling, and S702, which is entry-by-entry processing of capacity leveling, may be reversed.

Figure 33:
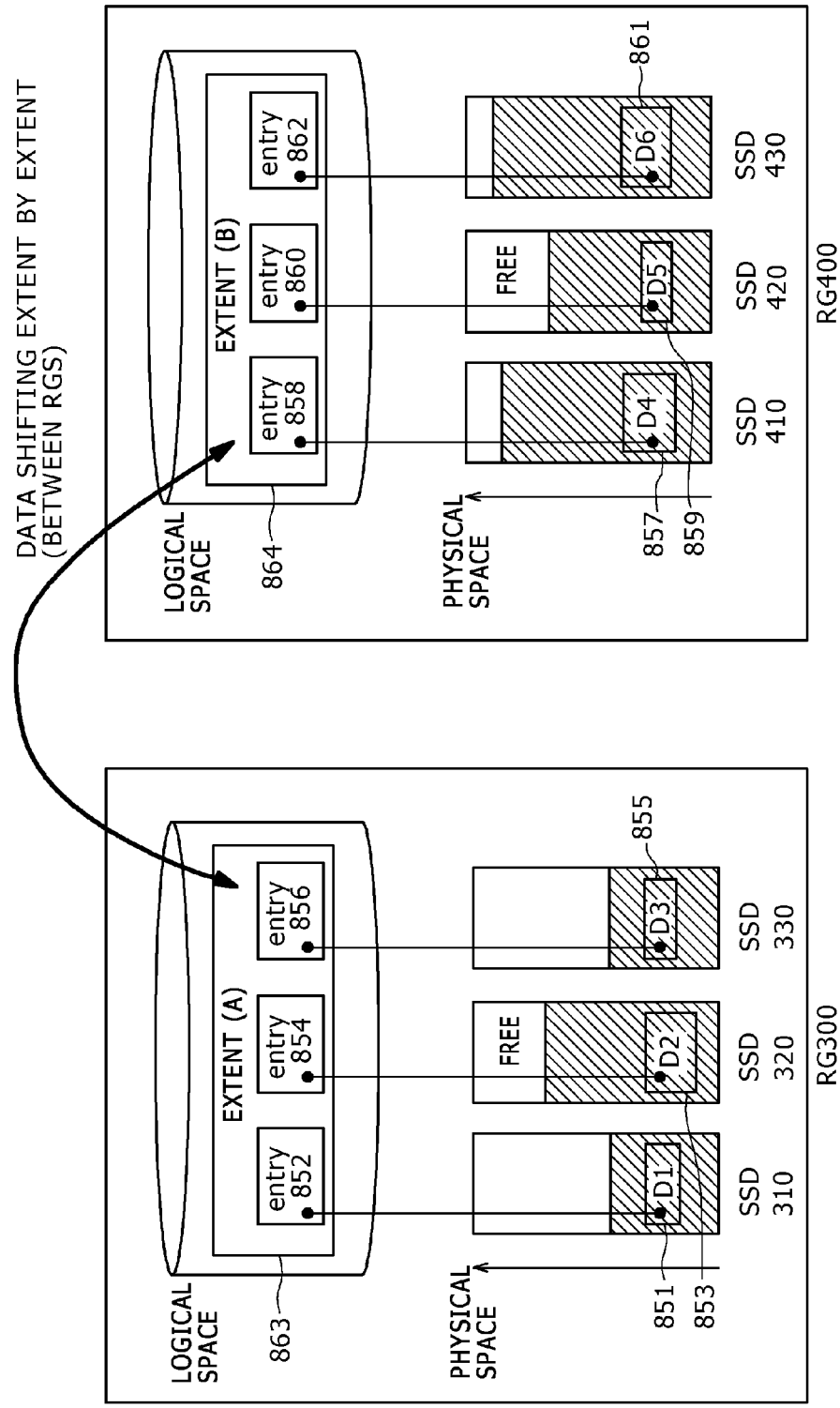
FIG. 33 is a sequence chart showing still another example of extent-by-extent processing of capacity leveling in the first embodiment.

Further, when the extent-by-extent processing of capacity leveling can also achieve the advantageous effect of entry-by-entry processing of capacity leveling as shown in FIG. 33, only the extent-by-extent processing of capacity leveling may be performed.

FIG. 33 is a sequence chart outlining still another example of extent-by-extent processing of capacity leveling.

The SSD 310, the SSD 320 and the SSD 330 make up the RG 300. Further, the free physical capacities of the SSD 310, the SSD 320 and the SSD 330 are uneven, manifesting a trough-shaped pattern, in which that of only the SSD 320 is small.

On the other hand, the SSD 410, the SSD 420 and the SSD 430 make up the RG 400. Further, the free physical capacities of the SSD 410, the SSD 420 and the SSD 430 are uneven, manifesting a peak-shaped pattern, in which that of only the SSD 420 is large.

Namely, the RG 300 and the RG 400 are in an uneven state of free physical capacity, manifesting a mutually contradictory relationship in which the RG 300 is peak-shaped while the RG 400 is trough-shaped.

Next, an extent (A) 863 is architected in the RG 300. The extent (A) 863 is made up of an entry 852 prepared in a logical space made available by the SSD 310, an entry 854 prepared in a logical space made available by the SSD 320, and an entry 856 prepared in a logical space made available by the SSD 330. Further, compressed data 851 matching the entry 852 are stored in the SSD 310, compressed data 853 matching the entry 854, in the SSD 320, and compressed data 855 matching the entry 856, in the SSD 330.

In the RG 300, the compressed data 851 smaller in physically used quantity are stored in the SSD 310 larger in free physical capacity, the compressed data 853 larger in physically used quantity are stored in the SSD 320 smaller in free physical capacity, and the compressed data 855 smaller in physically used quantity are stored in the SSD 330 larger in free physical capacity.

Namely, the compressed data stored in the extent (A) 863 manifest a peak-shaped pattern, in which the compressed data 853 are larger than the compressed data 851 and the compressed data 855.

On the other hand, the extent (B) 864 is architected in the RG 400. The extent (B) 864 is architected of an entry 858 prepared in a logical space made available by the SSD 410, an entry 860 prepared in a logical space made available by the SSD 420, and an entry 862 prepared in a logical space made available by the SSD 430. Further, compressed data 857 matching the entry 858 are stored in the SSD 410, compressed data 859 matching the entry 860, in the SSD 420, and compressed data 861 matching the entry 862, in the SSD 430.

In the RG 400, the compressed data 857 larger in physically used quantity are stored in the SSD 410 smaller in free physical capacity, the compressed data 859 smaller in physically used quantity, in the SSD 420 larger in free physical capacity, and compressed data 861 larger in physically used quantity, in the SSD 430 smaller in free physical capacity.

Namely, the compressed data stored in the extent (B) 864 manifest a trough-shaped pattern, in which the compressed data 859 are smaller than the compressed data 857 and the compressed data 861.

Therefore, the storage controller shifts data between the extent (A) 863 and the extent (B) 864 to eliminate the uneven state between the two RGs. As this causes the compressed data 857 larger in physically used quantity to be stored into the SSD 310 larger in free physical capacity, the free physical capacity of the SSD 310 decreases. As the compressed data 859 smaller in physically used quantity are stored into the SSD 320 smaller in free physical capacity, the free physical capacity of the SSD 320 is expanded. As the compressed data 861 larger in physically used quantity are stored into the SSD 330 larger in free physical capacity, the free physical capacity of the SSD 330 decreases. Namely in the RG 300, there can be achieved an advantageous effect that the free physical capacities of the SSDs are leveled.

On the other hand in the RG 400, as the compressed data 851 smaller in physically used quantity are stored into the SSD 410 smaller in free physical capacity, the free physical capacity of the SSD 410 is expanded. As the compressed data 853 larger in physically used quantity are stored into the SSD 420 larger in free physical capacity, the free physical capacity of the SSD 420 is reduced. As the compressed data 855 smaller in physically used quantity are stored into the SSD 430 smaller in free physical capacity, the free physical capacity of the SSD 430 is expanded. Namely, in the RG 400 as in the RG 300, there can be achieved an advantageous effect that the free physical capacities of the SSDs are leveled.

To sum up the foregoing, the storage controller can so process capacity leveling as to satisfy the following conditions.

Store data larger in physically used quantity into an SSD larger in free physical capacity.

Store data smaller in physically used quantity into an SSD smaller in free physical capacity.

In this way, the free physical capacities of SSDs constituting an RG can be leveled. Further, the leveling of free physical capacities also serves to level free logical capacities. As a result, extent acceptable spaces in the RG can be expanded or maximized.

To add, though the free physical capacity and the free logical capacity are used in this embodiment as criteria for detecting unevenness and evaluating the effect of leveling to ease unevenness, the in-use physical capacity and the in-use logical capacity may as well be used instead.

Also, even when unevenness of free logical capacity has been invited by storing SSDs' own internal information in addition to data written from an external device into FMs in SSDs, free logical capacity leveling by the shifting of data in entries may be applied.

Second Embodiment

In the first embodiment, the logical address space that can be made available to external devices by SSDs varies with the status of data compression. More specifically in the first embodiment, when the maximum logical capacity of SSDs is 800 GB and the usable logical capacity is 650 GB, the available logical address space is confined to an LBA range from LBA 0 (i.e. 0 GB) to 650 GB (FIG. 1). To make a supplementary remark, the storage controller can recognize the maximum value of the logical address space available from SSDs at a given point of time to be the usable logical capacity of SSDs at that point of time. Unlike this, in SSDs of the second embodiment, the available logical capacity varies. More specifically, the logical space available from the SSDs here remains in the address range of 0 GB through 800 GB all the time when the maximum logical capacity is 800 GB. Further details will be described with reference to FIG. 34.

Figure 34:
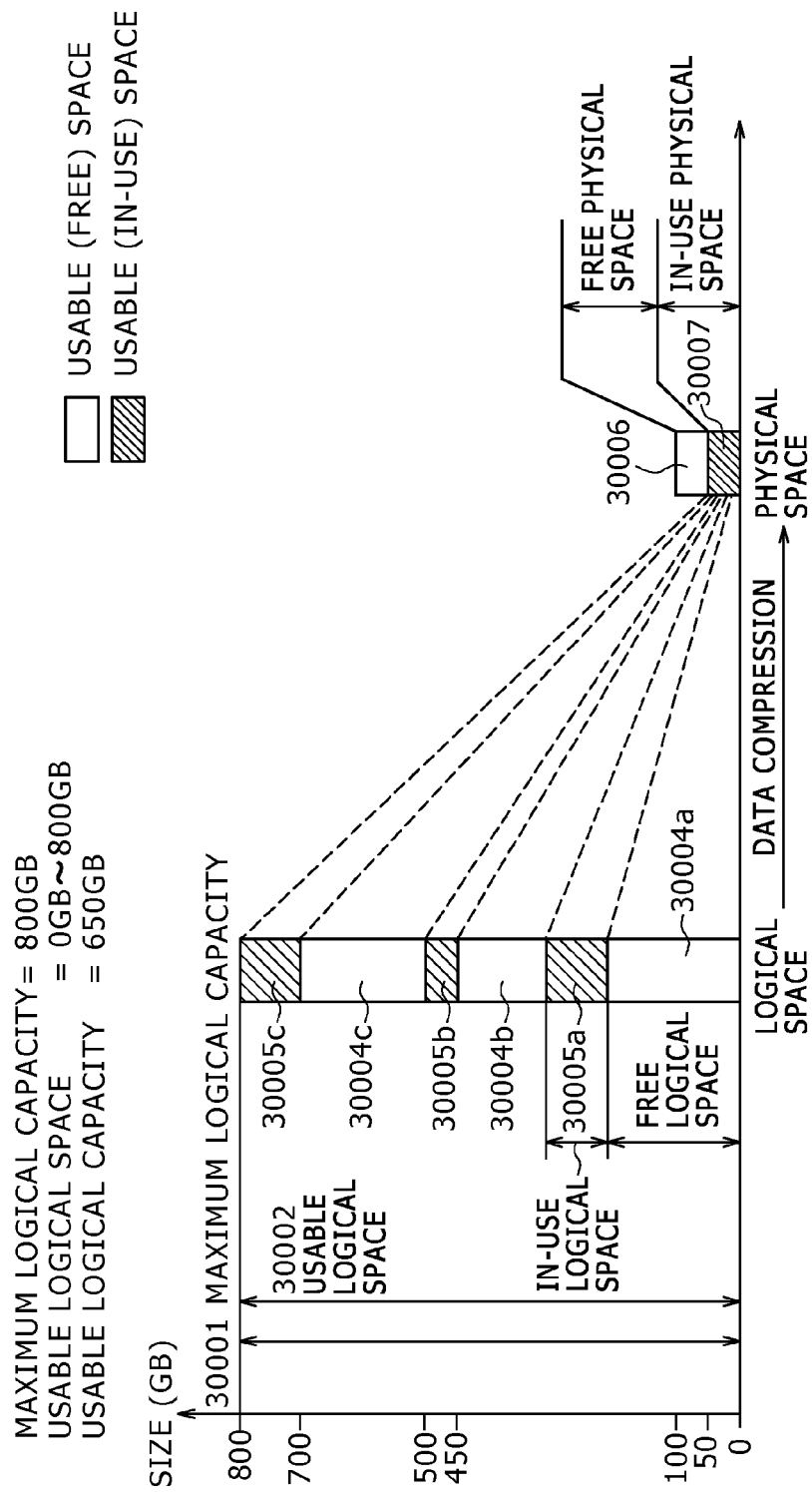
FIG. 34 shows an outline of address space of an SSD in a second embodiment.

FIG. 34 shows an outline of address space of an SSD in the second embodiment.

Differences from the first embodiment are that the sizes of both the maximum logical capacity 30001 and of the usable logical space 30002 are 800 GB and the size of the usable logical space 30002 is fixed irrespective of the status of data compression. In this connection, the unusable logical space 30003, present in the SSDs of the first embodiment, is absent here. Furthermore, as the storage controller can freely use the logical address space of 800 GB, there are present plural in-use logical spaces including in-use logical spaces 30005a, 30005b and 30005c. Further, other address spaces than the in-use logical spaces, like the free logical spaces 30004a, 30004b and 30004c, are made available to the storage controller as free logical spaces. It has to be noted, however, that the storage controller is separately notified that the usable logical capacity is 650 GB. For this reason, the storage controller so performs control that the logically used quantity of SSDs may not surpass 650 GB.

Other differences from the first embodiment will be described. As the SSDs of the second embodiment have no unusable logical capacity, the value of the status 13606 in the entry management TBL 13600 can take one of only two, "allocated" and "unallocated (usable)". Further in the logical-to-physical conversion table 23100, too, the value of the status 23104 can take one of only two, "in-use" and "unused".

Figure 35:
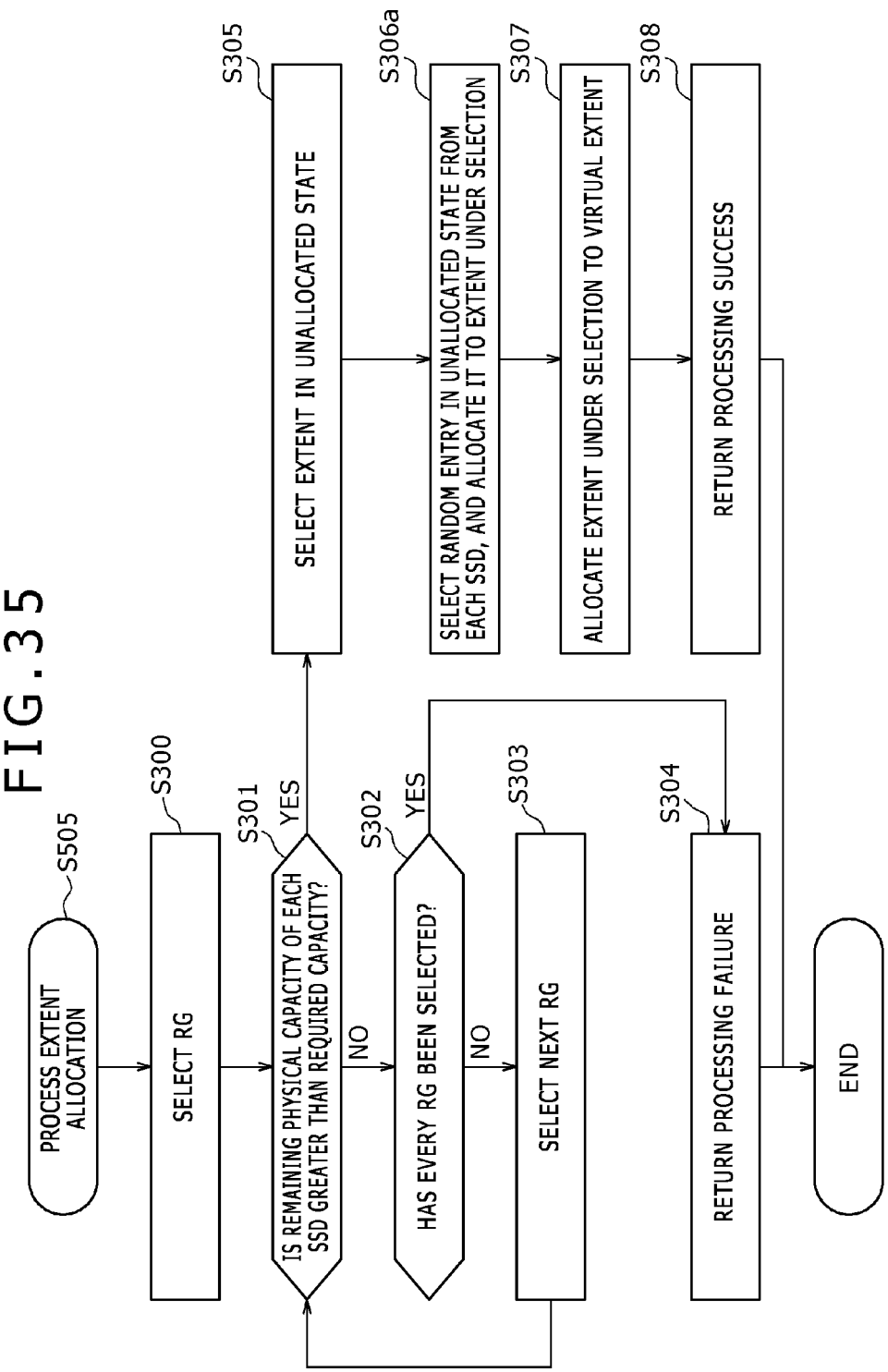
FIG. 35 is a sequence chart showing details of extent allocation processing S505 in the second embodiment.

FIG. 35 is a sequence chart showing details of extent allocation processing at S505 in the second embodiment.

The difference from the first embodiment lies in that S306a, a step of selecting any desired entry in an unallocated status from each SSD and allocating it to a selected extent is provided in place of S306, is provided. Other steps are the same as the respectively corresponding ones charted in FIG. 23.

As so far described, even SSDs of which only the available logical capacity varies can provide the same functions as the first embodiment by working together with the storage controller.

Third Embodiment

Regarding the third embodiment, a case in which the storage controller has a hierarchy rearranging function will be described. The hierarchy rearranging function means a function performed by the storage controller, when plural memory media differing in cost-effectiveness are mounted within a storage device, to rearrange data according to the data access frequency and the type of the memory media. This function will be described with reference to FIG. 36.

Figure 36:
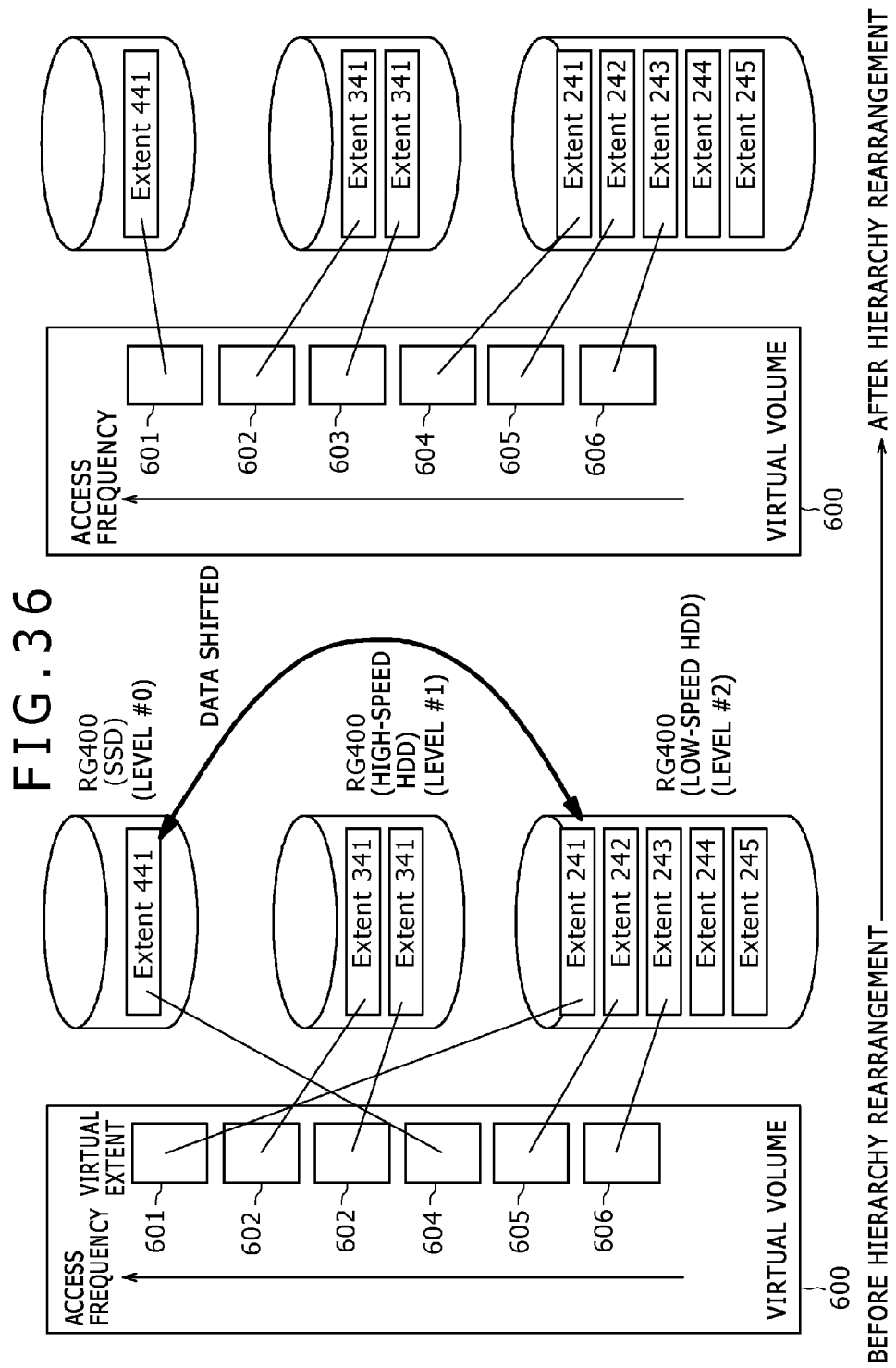
FIG. 36 illustrates an outline of a hierarchy rearranging function in a third embodiment.

FIG. 36 illustrates an outline of the hierarchy rearranging function in the third embodiment.

Within a storage device, the RG 200 configured of low-speed HDDs, the RG 300 configured of high-speed HDDs, and the RG 400 configured of SSDs are present. Each RG is under hierarchy management according to the type of the memory medium. The RG 400 belongs to a level #0, the RG 300 to a level #1, and the RG 200 to a level #2. The level numbers are assigned in the ascending order of access performance. Incidentally, as the capacity tends to be lower and the price to be higher as the operating speed of the device rises, common storage devices tend to be smaller in mounting capacity with a rise in hierarchical level. The drawing shows that the capacity of the SSD-formed level #0, the highest level, is the smallest, and that of the low-speed HDD-formed level #2, the lowest level, is the largest. For this reason, though only one extent is structured in the RG 400 of level #0, two extents are built up in the RG 300 of level #1 and five extents in the RG 200 of level #2. In such an environment, it is desired for data more frequently accessed to be stored in memory media of a higher level. Incidentally, each level may contain plural RGs. Or, one pool volume may contain plural RGs made up of different hierarchical levels. In this case, the pool volume would have extents configured on the basis of the multi-level RG in a blended configuration.

Each extent is allocated to one or another of the virtual extents of the virtual volume 600. Now, the virtual extent 601 is allocated to the extent 241, the virtual extent 602 to an extent 341, the virtual extent 603 to the extent 341, the virtual extent 604 to the extent 441, the virtual extent 605 to the extent 242, and a virtual extent 606 to an extent 243. Incidentally, the access frequencies of the virtual extents are supposed to be sequentially higher from 601 to 606. The access frequency can be expressed in TOPS, which is the number of data read or data write actions per unit length of time, or MB/s, which is the quantity of data transferred per unit length of time.

As data of the virtual extent 604 lower in access frequency are stored in the extent 441 of the higher level RG 400, there is a fear of failing to fully utilize performance capabilities of SSDs. On the other hand, data of the frequently accessed virtual extent 601 are stored in the extent 241 of the lower level RG 200, and further the extents 242 and 243 in the RG 200 store data of other virtual extents. This implies that the HDD may pose a performance bottleneck of the RG 200.

To address this problem, the storage controller optimizes data storage positions by executing "hierarchy rearrangement" of replacing data in the extent 441 and the extent 241 with each other. The left part of FIG. 36 shows the state before hierarchy rearrangement, and the right part, the state after hierarchy rearrangement. After hierarchy rearrangement, frequently accessed data are stored at higher hierarchical levels in due sequence. This enables the system performance to be optimized.

To add, as SSDs according to the invention has a function to expand capacity by compression, the storage device can enjoy the benefit of a capacity increase at higher levels. As this advantage is expected to help save costs by reducing the number of SSDs and HDDs to be mounted, for instance, it is desirable to store as large a quantity of data as practicable in SSDs of higher levels. Therefore in the third embodiment, SSDs are subjected to capacity leveling before the storage controller implements hierarchy rearrangement to enable a larger quantity of data to be stored in SSDs of higher levels. In the following paragraphs, differences of this embodiment from the First and second embodiments will be described.

FIG. 37 shows an example of configuration of the RG management table 13200 in the third embodiment.

As illustrated in FIG. 37, a level #13207 for managing the level number of each RG is newly added. The level # is assigned according to the type of memory media constituting the RG. For instance, "0" is assigned to an SSD, "1" to a high-speed HDD, and "2" to a low-speed HDD.

FIG. 38 shows an example of configuration of the virtual volume management TBL 13500 in the third embodiment.

The configuration shown in FIG. 38 includes the addition of an RD IOPS 13506 and a WR IOPS 13507 for managing the frequencies of accessing the virtual extents. The RD IOPS 13506 is the number of data read request commands having arisen per unit length of time. The WR IOPS 13507 is the number of data write request commands having arisen per unit length of time. The higher these values, the higher the frequencies of access. Incidentally, instead of IUOPS, RD MB/s and WR MB/s, which are data transfer quantities per unit length of time, the cumulative number of commands or data transfers may as well be recorded.

Figure 39:
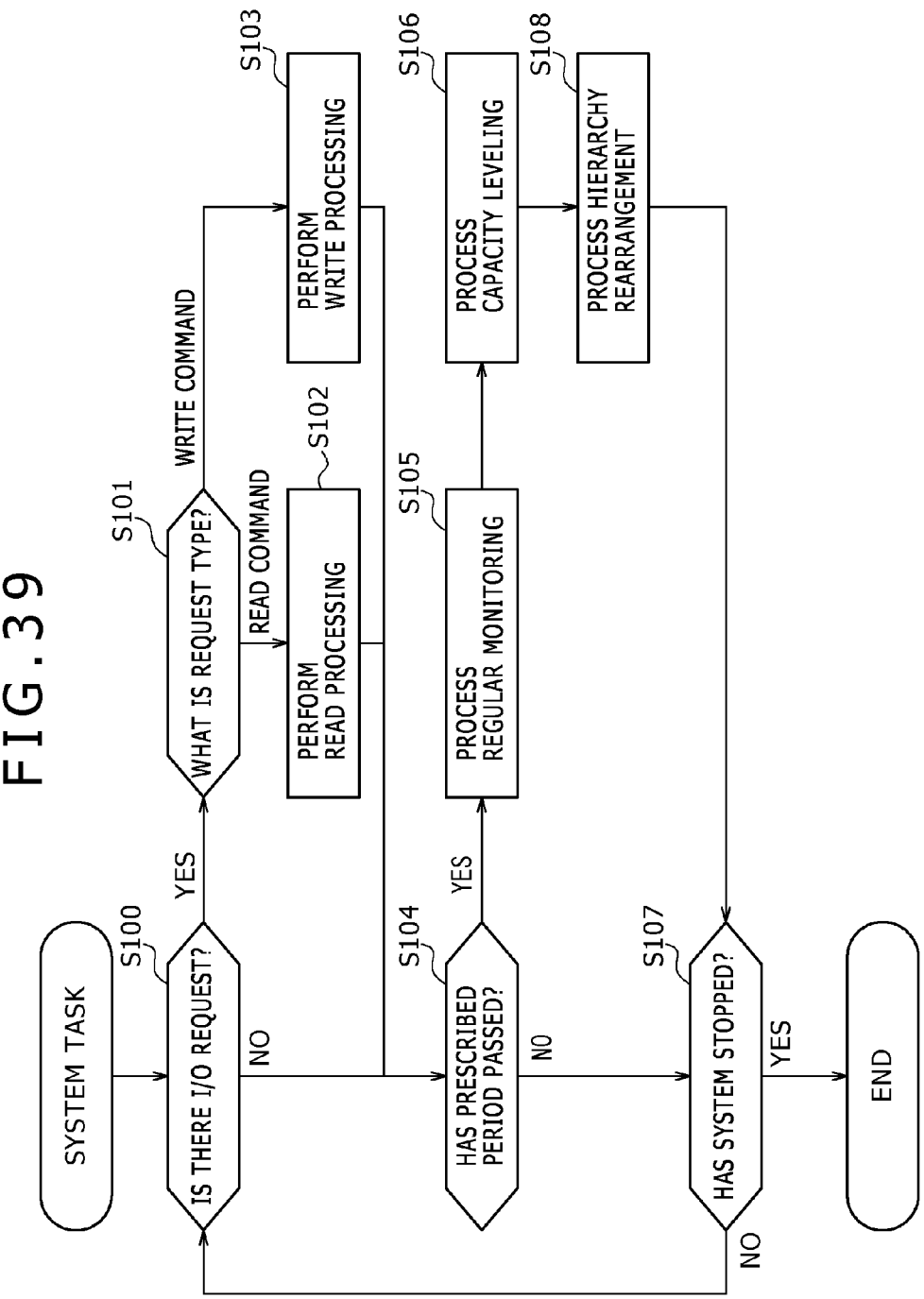
FIG. 39 is a sequence chart showing an outline of the task of a storage controller in the third embodiment.

FIG. 39 is a sequence chart showing an outline of the task of a storage controller in the third embodiment.

In the sequence charted in FIG. 39, hierarchy rearrangement processing S108 is added after S106, at which capacity leveling is processed. Details of the hierarchy rearrangement processing S108 will be described with reference to FIG. 40. In the third embodiment, the storage controller has to monitor the frequency of accessing each virtual extent. For this reason, the storage controller adds 1 to the count of the RD IOPS 13506 every time read processing S102 is performed, and also adds 1 to the WR IOPS 13507 every time read processing S103 is performed.

Figure 40:
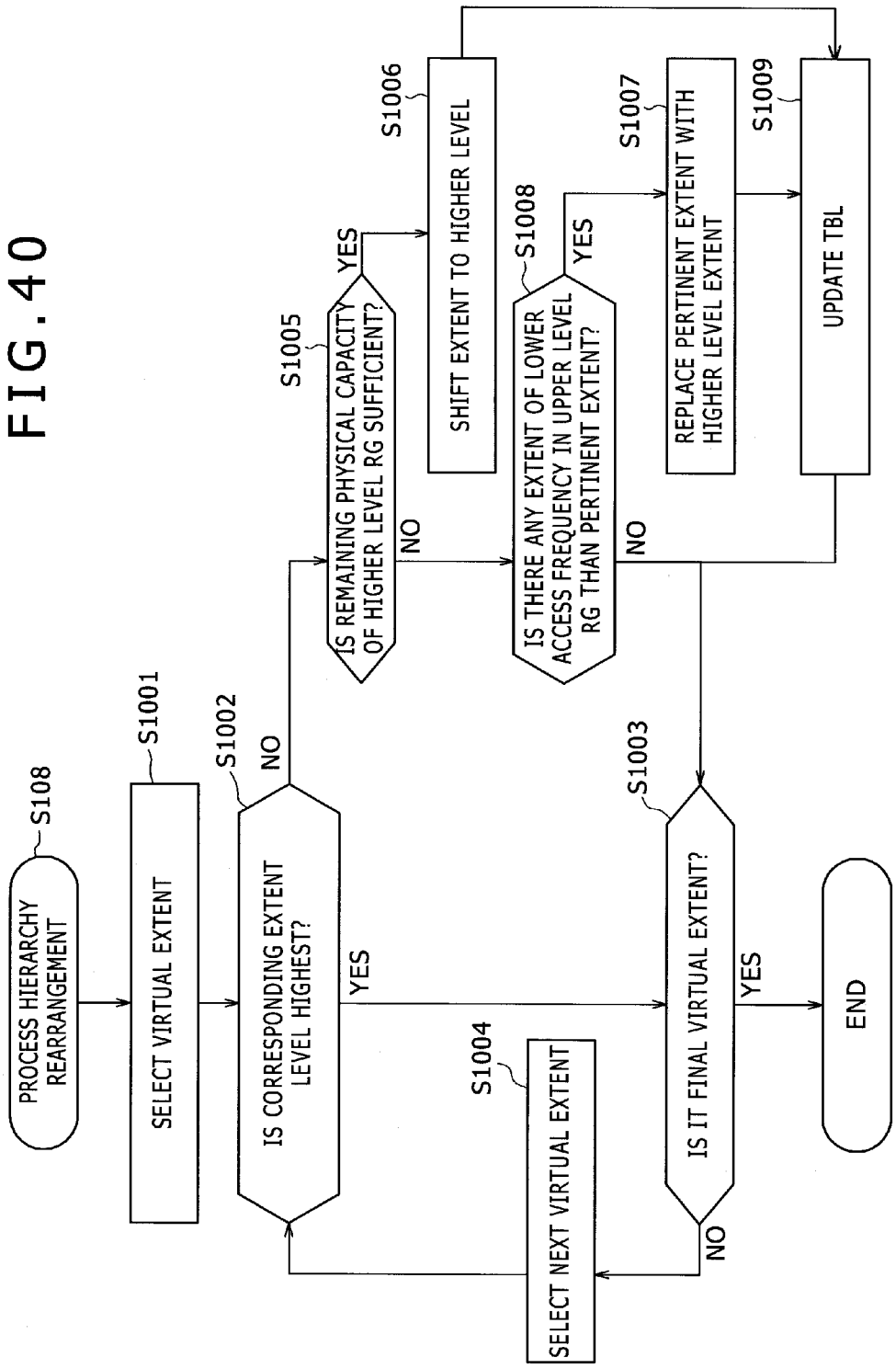
FIG. 40 is a sequence chart showing an example of hierarchy rearrangement processing in the third embodiment.

FIG. 40 is a sequence chart showing an example of hierarchy rearrangement processing in the third embodiment.

The storage controller selects the virtual extent to be processed (S1001). Next, the storage controller checks whether or not the level of the extent allocated to the virtual extent is the highest level by referencing the RG management TBL 13200 (S1002). If the result is affirmative (S1002: Yes), the storage controller finds no need for hierarchy rearrangement, and checks whether or not the pertinent virtual extent is final (S1003). If the result is affirmative (S1003: Yes), the storage controller ends this processing. Or if the result of S1003 is negative (S1003: No), the storage controller sets the next virtual extent as the object of processing (S1004), and moves on to the processing at S1002.

To add, if the result of S1002 is negative (S1002: No), the storage controller checks whether or not the residual physical capacity of the higher level RG is sufficient by referencing the RG management TBL 13200 and the disk management table 13100 (S1005). Incidentally, that the residual physical capacity is sufficient is virtually the same as stating that the size of the free physical capacity is larger than the size of the extent. Or it may as well mean than an unallocated extent is present in a higher level RG. If the result at S1005 is affirmative, the storage controller determines that data can be shifted as they are because the upper level RG has a free space, and shifts the data of the pertinent extent to the upper level RG. After that, it updates various tables (S1009) and shifts to S1003. Or if the result at S1005 is negative (S1005: No), the storage controller determines that data replacement is needed because the upper level RG has no sufficient free space, and checks whether or not there is in the upper level RG any less frequently accessed extent than the pertinent extent by referencing the virtual volume management TBL 13500, the RG management table 13200 and the like (S1008). If the result is affirmative (S1008: Yes), the storage controller replaces the data of the pertinent extent with the data of the selected higher level extent (S1007). After that, it updates various tables (S1009) and shifts to S1003. Or if the result at S1008 is negative (S1008: No), the storage controller shifts to S1003.

As the storage controller is thus able to perform hierarchy rearrangement processing after expanding or maximizing the free capacity of the SSD ahead of processing capacity leveling, it is made possible to store data of more extents into the higher level SSD. As this results in an increase in the data quantity that can be stored into the high performance SSD, the performance of the storage device can be enhanced.

Although the foregoing description of various items of information used the expression "xxx table", the information may as well be expressed in a different data structure than tables. To make sure that no data structure is depended upon, "xxx table" may instead be referred to as "xxx information".

Also, though the foregoing description used numbers as information to identify elements (e.g. extent), some other kind of identifying information (e.g. name or identifier) may be used instead.

Further, when "program" is used as the grammatical subject in describing the processing, the subject may be "controller" or "processor" because any program is implemented by a processor (e.g. central processing unit (CPU)) contained in a controller (storage controller or SSD controller) while appropriately using a memory resource (e.g. memory) and/or a communication interface device (e.g. communication port). Further, the controller may include a hardware circuit to perform the whole or part of processing. The computer program may be installed from a program source. The program source may be, for instance, a program distribution server or a computer-readable memory medium.

Further in the foregoing description, a physical memory unit was sometimes referred to as a "disk" for the sake of convenience, but this denomination does not necessarily mean that the physical memory unit has a disk-shaped memory medium. For instance, the term "disk" may sometimes denote an SSD having a nonvolatile semiconductor memory as the memory medium. When an SSD uses a flash memory as the memory medium, the SSD may be referred to as a flash memory drive or a flash memory package.

Further in the foregoing description there no limitation to the unit of denoting a period or a length of time. For instance, the unit for this purpose may be one of year, month, day, hour, minute and second, or a combination of two or more of them.

To add, the memory unit used in the description of embodiments has two functions, including the data compressing function and the lower level capacity virtualizing function, and is an SSD whose virtual logical capacity made available to an external device (storage controller) varies with the data compression rate. However, if any HDD or some other memory unit has similar functions, it can be applied to the present invention.

What is claimed is:

1. A storage device comprising:
    a plurality of semiconductor memory units each having a plurality of nonvolatile semiconductor memory chips and a memory controller that compresses data and stores the compressed data into the nonvolatile semiconductor memory chips; and
    a storage controller that controls a plurality of RAID groups including a prescribed number of semiconductor memory units contained in the semiconductor memory units, and controls data writing and reading into and out of the semiconductor memory units,
    wherein the memory controller is configured to associate a plurality of memory areas of the nonvolatile semiconductor memory chips with a plurality of logical memory areas and makes the logical memory areas available to the storage controller, and to provide information on a physically used quantity which is an amount of the memory areas of the nonvolatile semiconductor memory chips used for storing the data, to the storage controller, and
    wherein the storage controller is configured to:
    divide the logical memory areas made available by each of the semiconductor memory units into a plurality of entries, each of which is a logical memory area of a prescribed size,
    manage, for each of the semiconductor memory units, a data storage quantity which is an amount of the memory areas of the nonvolatile semiconductor memory chips storing write data,
    structure, for each of the RAID groups, a plurality of extents each containing one of the entries belonging to the semiconductor memory units included in each RAID group,
    select, on the basis of the data storage quantity, a first RAID group and a second RAID group out of the RAID groups, and
    exchange, on the basis of the data storage quantity, data of a first extent out of the extents belonging to the first RAID group with data of a second extent out of the extents belonging to the second RAID group.

2. The storage device according to claim 1, wherein the nonvolatile semiconductor memory chips are flash memory chips.

3. The storage device according to claim 1, wherein the memory controller is further configured to make the logical memory areas having a capacity greater than the capacity of memory areas of the nonvolatile semiconductor memory chips available to the storage controller.

4. The storage device according to claim 3, wherein the storage controller is further configured to:
    make a virtual volume for which a prescribed capacity is set available to a computer,
    allocate in response to a write request from the computer one of the extents to the virtual volume,
    manage, as a pool volume, the capacity of the logical memory areas made available by the semiconductor memory units, and vary, when a range in which data can be stored out of the logical memory areas has varied, the capacity of the pool volume.

5. The storage device according to claim 4, wherein the memory controller is further configured to compress, in response to a write request from the storage controller, data accompanying the write request, and write the compressed data into the nonvolatile semiconductor memory chips.

6. The storage device according to claim 4, wherein the memory controller is further configured to transmit, in response to a request for acquisition of internal information from the storage controller, the information on the physically used quantity to the storage controller.

7. The storage device according to claim 4, wherein the memory controller is further configured to:
    store, in response to a write request from the storage controller, data accompanying the write request into the nonvolatile semiconductor memory chips, and
    read, in reclamation processing, data out of the nonvolatile semiconductor memory chips, compress the read-out data, and write the compressed data into the nonvolatile semiconductor memory chips.

8. The storage device according to claim 4, wherein the memory controller is further configured to transmit to the storage controller the information on the physically used quantity along with a report on completion of compliance with the write request.

9. The storage device according to claim 4, further comprising:
    a plurality of hard disk drives,
    wherein the storage controller is configured to:
    control the hard disk drives as a third RAID group,
    structure a plurality of extents on the basis of a plurality of memory areas of the third RAID group,
    measure an access frequency for each of the extents allocated to the virtual volume, and
    exchange, after completion of processing the data exchange, data of one of the extents belonging to the third RAID group with one of the extents lower in access frequency than that of the extents belonging to the third RAID group out of the extents belonging to the RAID groups configured from the semiconductor memory units.

* * * * *